(12) United States Patent
Igarashi et al.

(10) Patent No.: US 10,904,603 B2
(45) Date of Patent: Jan. 26, 2021

(54) TRANSMISSION APPARATUS, RECEPTION APPARATUS, AND DATA PROCESSING METHOD

(71) Applicant: Saturn Licensing LLC, New York, NY (US)

(72) Inventors: Tatsuya Igarashi, Tokyo (JP); Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/743,943

(22) PCT Filed: Sep. 5, 2016

(86) PCT No.: PCT/JP2016/076051
§ 371 (c)(1),
(2) Date: Jan. 11, 2018

(87) PCT Pub. No.: WO2017/047433
PCT Pub. Date: Mar. 23, 2017

(65) Prior Publication Data
US 2018/0213272 A1    Jul. 26, 2018

(30) Foreign Application Priority Data

Sep. 18, 2015    (JP) .................. 2015-186008

(51) Int. Cl.
*H04N 21/2668*    (2011.01)
*G06F 13/00*    (2006.01)
(Continued)

(52) U.S. Cl.
CPC ......... *H04N 21/2668* (2013.01); *G06F 13/00* (2013.01); *H04N 21/26241* (2013.01);
(Continued)

(58) Field of Classification Search
CPC ....... H04N 21/23424; H04N 21/26241; H04N 21/454; H04N 21/2668; H04N 21/26258;
(Continued)

(56) References Cited

U.S. PATENT DOCUMENTS

| | | | |
|---|---|---|---|
| 2002/0194585 A1* | 12/2002 | Connelly | H04N 5/44543 725/9 |
| 2007/0016931 A1* | 1/2007 | Ichioka | H04N 5/445 725/46 |

(Continued)

FOREIGN PATENT DOCUMENTS

| | | |
|---|---|---|
| EP | 2528324 A2 | 11/2012 |
| JP | 2011-87103 A | 4/2011 |

(Continued)

OTHER PUBLICATIONS

International Search Report dated Nov. 22, 2016 in PCT/JP2016/076051 filed Sep. 5, 2016.

(Continued)

*Primary Examiner* — James R Sheleheda
*Assistant Examiner* — Franklin S Andramuno
(74) *Attorney, Agent, or Firm* — Oblon, McClelland, Maier & Neustadt, L.L.P.

(57) ABSTRACT

A configuration is realized that receives advertisements highly likely to be viewed and ensures enhanced likelihood for reproduction on a reception apparatus by controlling a transmission order of advertisements that can be selected and output. A transmission apparatus determines a transmission order of a plurality of pieces of advertisement content that can be selected and output during an advertisement output time of a given duration on a reception apparatus and sends the pieces of content. The transmission apparatus arranges the transmission time of content highly likely to be viewed closest to the advertisement output time and arranges (Continued)

the transmission time of content unlikely to be viewed before the transmission time of content highly likely to be viewed. Further, the transmission apparatus sends delivery priority information (Delivery Priority) specified for each of the plurality of pieces of advertisement content to the reception apparatus so that the reception apparatus can decide whether caching is required based on priority information.

17 Claims, 37 Drawing Sheets

(51) Int. Cl.

| | | |
|---|---|---|
| H04N 21/45 | (2011.01) | |
| H04N 21/845 | (2011.01) | |
| H04N 21/262 | (2011.01) | |
| H04N 21/462 | (2011.01) | |
| H04N 21/433 | (2011.01) | |
| H04N 21/458 | (2011.01) | |
| H04N 21/81 | (2011.01) | |
| H04N 21/475 | (2011.01) | |

(52) U.S. Cl.
CPC ... *H04N 21/26258* (2013.01); *H04N 21/4331* (2013.01); *H04N 21/458* (2013.01); *H04N 21/4532* (2013.01); *H04N 21/4621* (2013.01); *H04N 21/4622* (2013.01); *H04N 21/812* (2013.01); *H04N 21/8456* (2013.01); *H04N 21/26216* (2013.01); *H04N 21/4751* (2013.01); *H04N 21/4753* (2013.01); *H04N 21/4755* (2013.01)

(58) Field of Classification Search
CPC .......... H04N 21/4621; H04N 21/4622; H04N 21/26216; H04N 21/4751; H04N 21/4753; H04N 21/4755
USPC ..................................... 725/36, 42
See application file for complete search history.

(56) References Cited

U.S. PATENT DOCUMENTS

| | | | |
|---|---|---|---|
| 2007/0150342 A1* | 6/2007 | Law | G06Q 30/02 705/14.52 |
| 2008/0127246 A1 | 5/2008 | Sylvain | |
| 2009/0113019 A1* | 4/2009 | Yue | H04L 12/189 709/217 |
| 2009/0327077 A1* | 12/2009 | Kim | G06Q 30/02 705/14.53 |
| 2010/0138870 A1 | 6/2010 | Anthru et al. | |
| 2010/0138871 A1 | 6/2010 | Anthru et al. | |
| 2010/0191886 A1* | 7/2010 | Saarikivi | H04H 20/42 710/264 |
| 2010/0299702 A1 | 11/2010 | Lo et al. | |
| 2011/0239253 A1* | 9/2011 | West | H04N 21/234363 725/46 |
| 2012/0042335 A1* | 2/2012 | Hwang | H04N 21/41407 725/32 |
| 2012/0309515 A1* | 12/2012 | Chung | H04N 21/274 463/31 |
| 2013/0347033 A1* | 12/2013 | Grab | H04N 21/458 725/34 |
| 2014/0109123 A1 | 4/2014 | Balakrishnan et al. | |
| 2014/0173665 A1 | 6/2014 | Kitazato et al. | |
| 2014/0379463 A1* | 12/2014 | Sega | G06Q 30/0247 705/14.46 |
| 2015/0007209 A1 | 1/2015 | Balakrishnan et al. | |
| 2015/0078264 A1 | 3/2015 | Han et al. | |
| 2015/0078335 A1 | 3/2015 | Sivanesan et al. | |
| 2015/0081851 A1 | 3/2015 | Oyman et al. | |
| 2015/0149287 A1* | 5/2015 | Brown | G06Q 30/0261 705/14.58 |
| 2015/0195750 A1 | 7/2015 | Sivanesan et al. | |
| 2015/0245105 A1* | 8/2015 | Wickenkamp | G06F 16/70 725/44 |
| 2015/0326905 A1 | 11/2015 | Balakrishnan et al. | |
| 2016/0260123 A1* | 9/2016 | Mishra | G06Q 30/0244 |
| 2017/0132659 A1* | 5/2017 | Dirks | G06Q 30/0247 |
| 2017/0134771 A1* | 5/2017 | Barton | H04N 21/8547 |
| 2017/0272983 A1 | 9/2017 | Oyman et al. | |
| 2017/0311020 A1 | 10/2017 | Balakrishnan et al. | |

FOREIGN PATENT DOCUMENTS

| | | |
|---|---|---|
| JP | 2012-95149 A | 5/2012 |
| JP | 2014-57227 A | 3/2014 |
| JP | 2015-100112 A | 5/2015 |
| WO | 2015/042106 A1 | 3/2015 |

OTHER PUBLICATIONS

Extended European Search Report dated Feb. 18, 2019 in Application No. 16846304.0.

"Guideline for Implementation: DASH-IF Interoperability Points v3.0", DASH Industry Forum, Apr. 7, 2015, pp. 1-154.

* cited by examiner

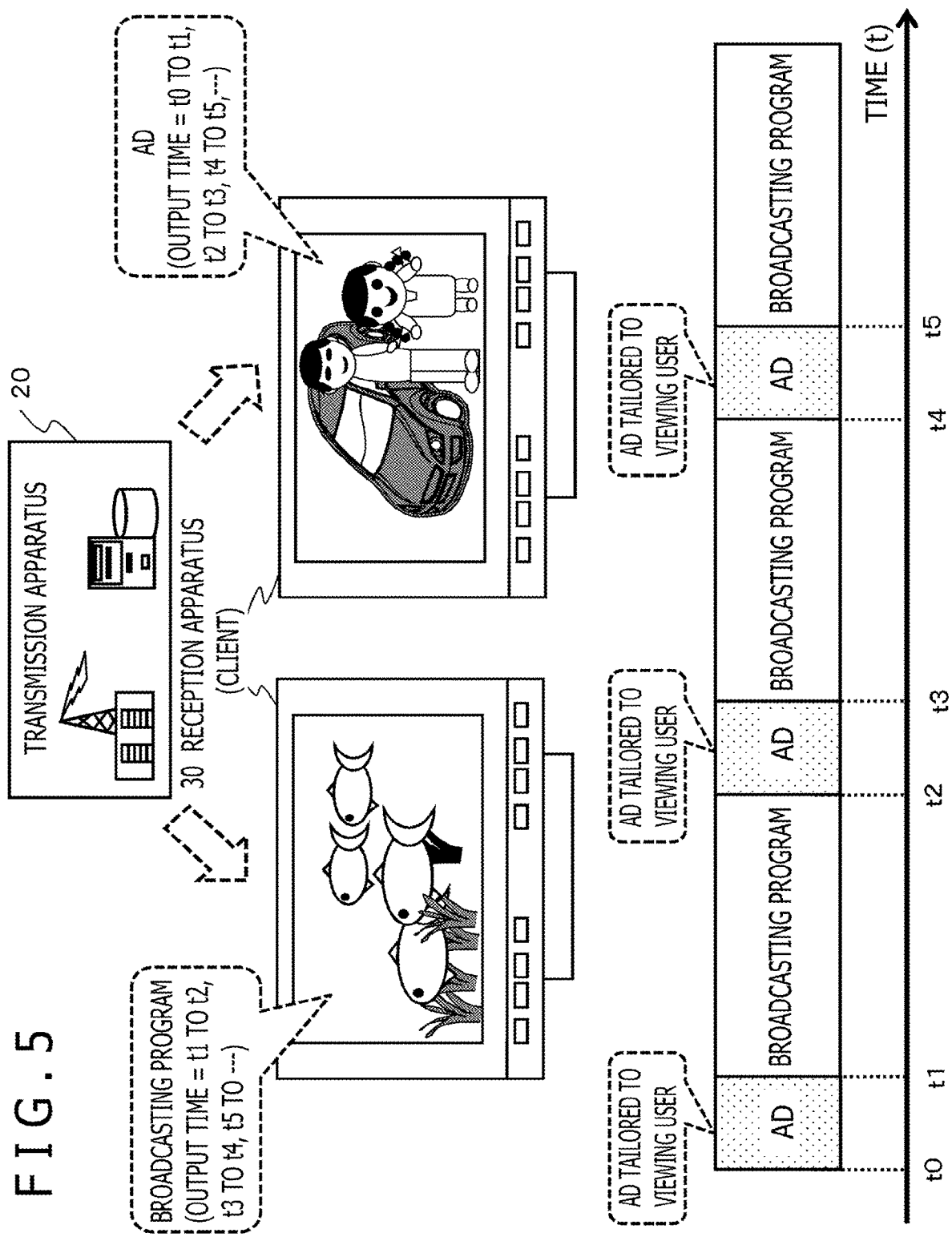

F I G. 6

(A) AD SETTING EXAMPLES BY AGE

| AGE (age) = 20 OR OLDER | AD OF ALCOHOLIC BEVERAGES (LIQUOR) |
|---|---|
| AGE (age) = 15 OR YOUNGER | AD OF TOYS |

(B) AD SETTING EXAMPLES BY RESIDENCE

| LOCATION (Location) = ALASKA | AD OF HEATING APPLIANCES |
|---|---|
| LOCATION (Location) = HAWAII | AD OF AIR-CONDITIONING APPLIANCES |

(C) AD SETTING EXAMPLES BY AGE AND RESIDENCE

| AGE (age) = 18 OR OLDER | LOCATION (Location) = NEW YORK | AD OF RESTAURANTS IN NEW YORK |
|---|---|---|
| AGE (age) = 15 OR YOUNGER | LOCATION (Location) = CALIFORNIA | AD OF TOY STORES IN CALIFORNIA |

FIG. 7
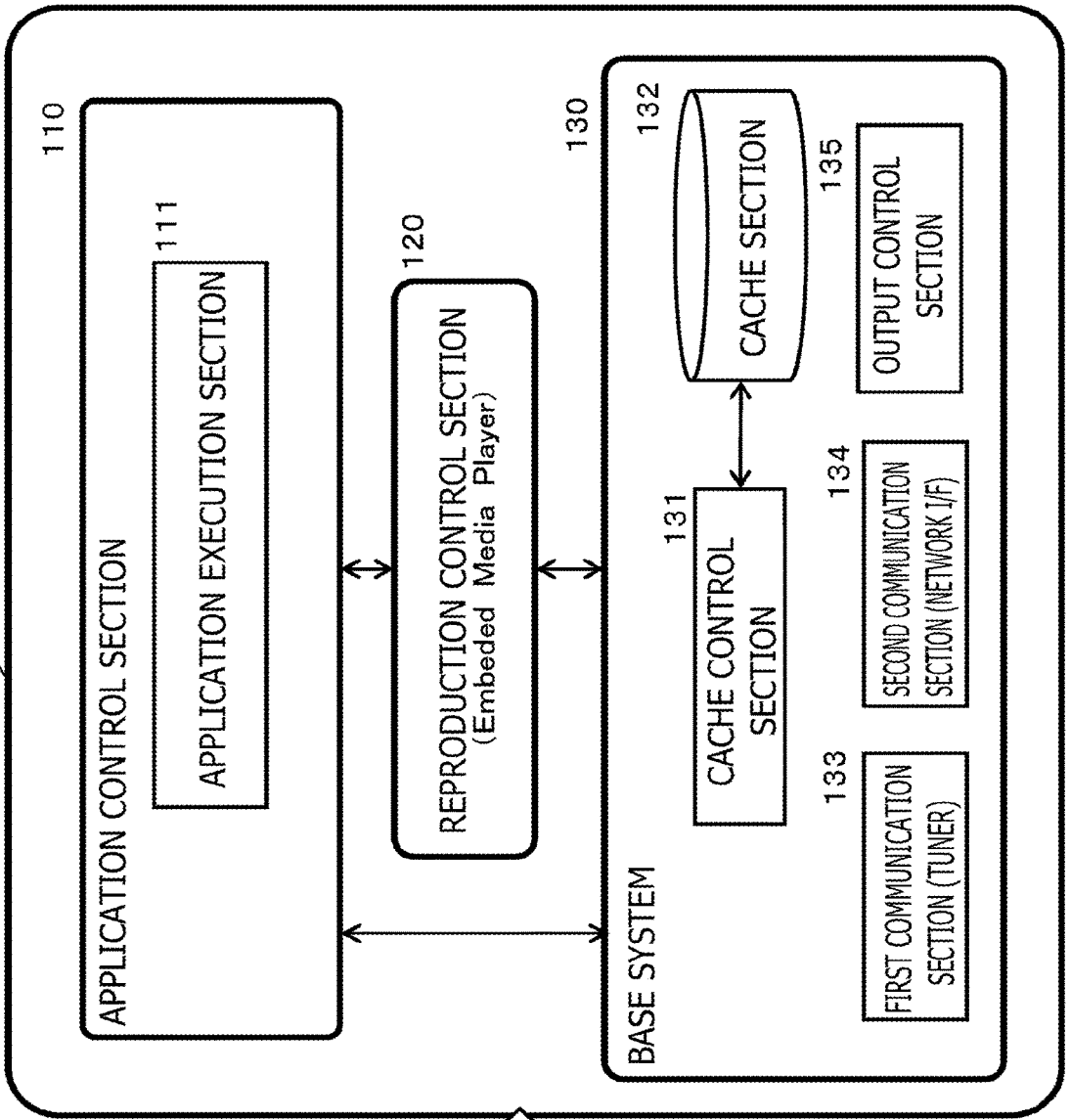
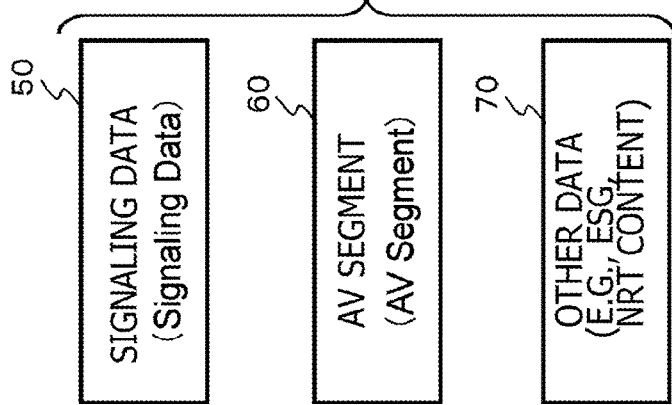

FIG. 17
(a) AD-BY-AD USER VIEWING DISTRIBUTION ESTIMATION DATA
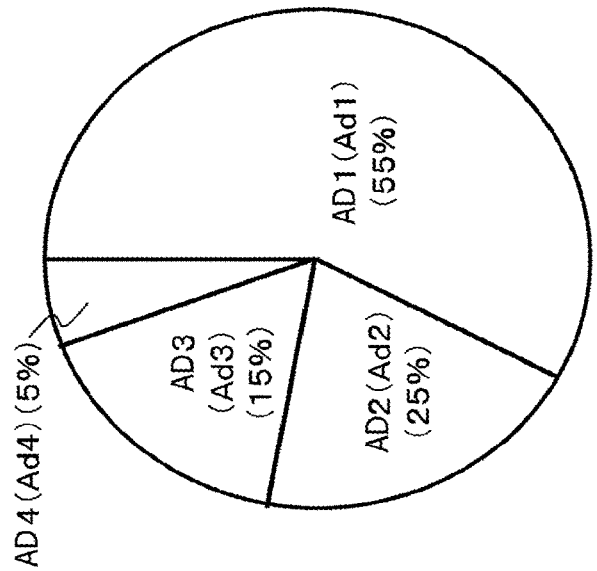
(b) EXAMPLE OF SETTING AD TRANSMISSION ORDER AND DELIVERY PRIORITY INFORMATION (Delivery Priority)
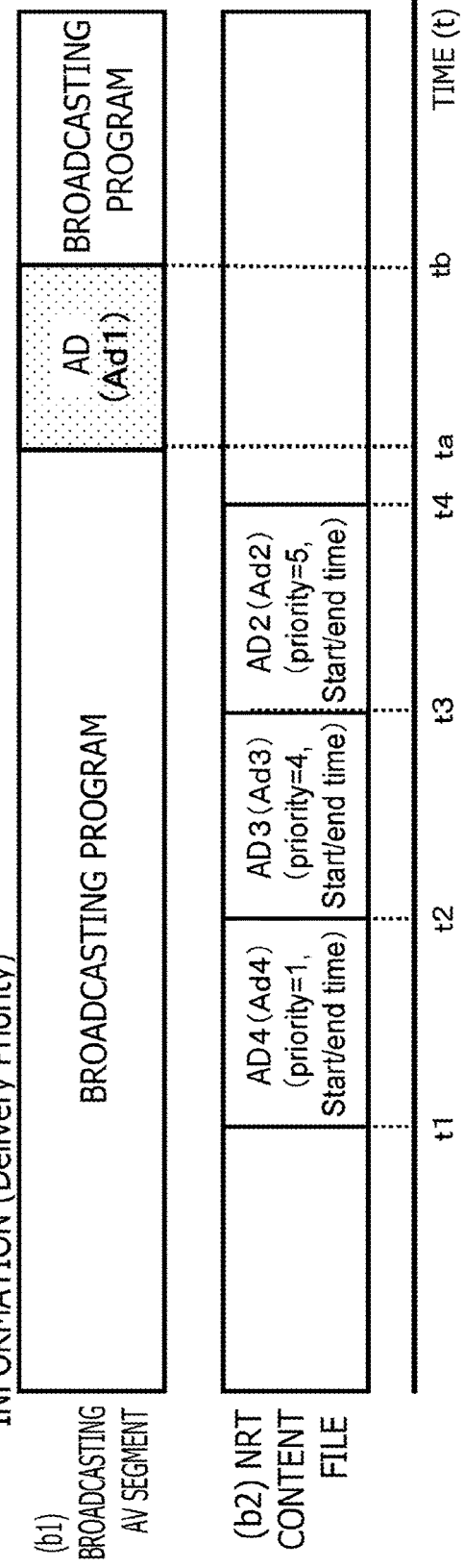

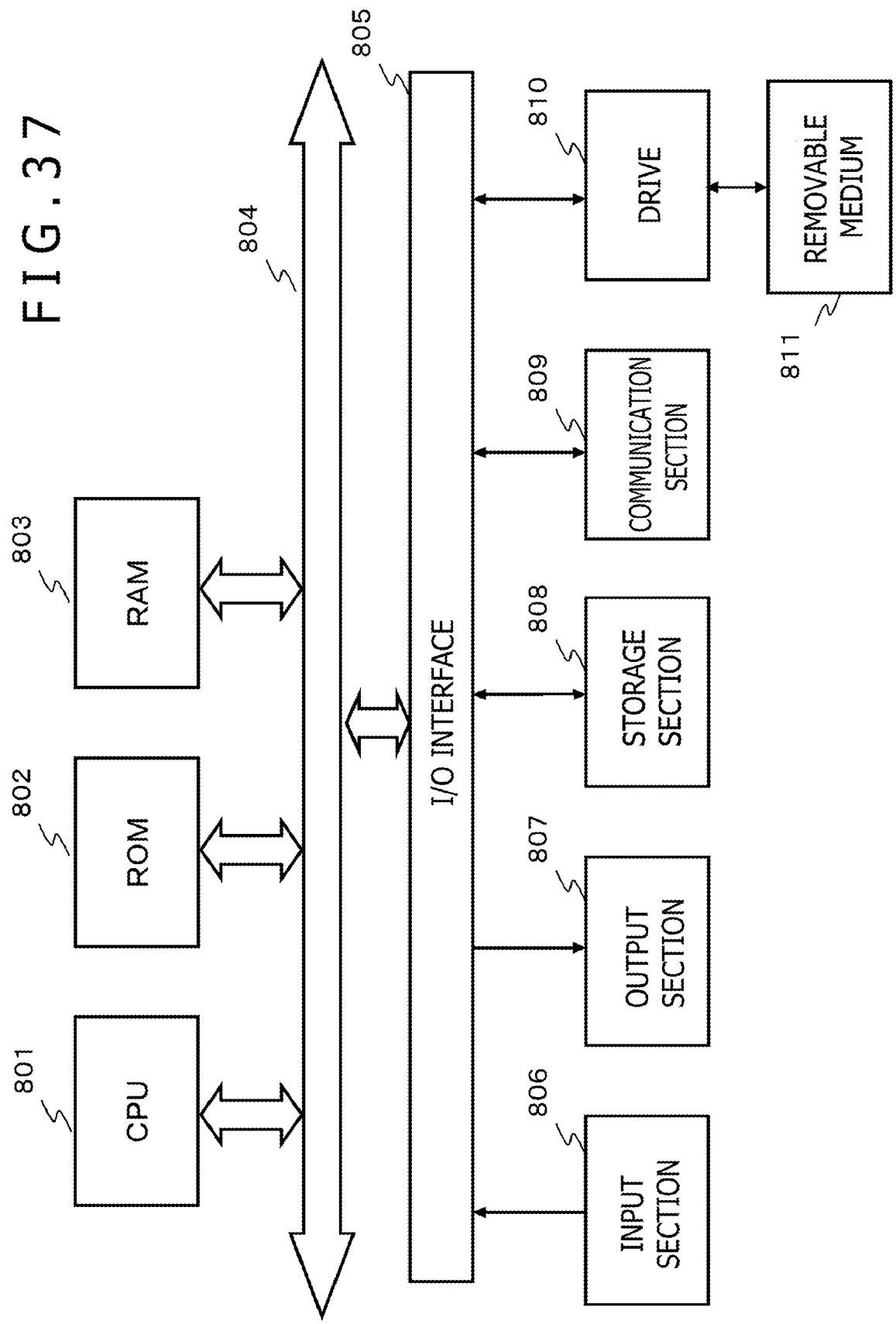

TRANSMISSION APPARATUS, RECEPTION APPARATUS, AND DATA PROCESSING METHOD

TECHNICAL FIELD

The present disclosure relates to a transmission apparatus, a reception apparatus, and a data processing method. In more detail, the present disclosure relates to transmission and reception apparatuses for carrying out transmission or reception of data, for example, via broadcasting wave or networks, and to a data processing method for communication data.

BACKGROUND ART

OTT (Over The Top) is available as a data delivery scheme that permits delivery of content such as video and audio data regardless of forms of services of each telecommunications carrier. Content delivered by OTT is referred to as OTT content, and a video data delivery service using OTT is referred to as OTT video or OTT-V (Over The Top Video).

DASH (Dynamic Adaptive Streaming overHTTP) is available as a data streaming delivery standard that complies with OTT-V. DASH is a standard on adaptive streaming delivery using HTTP (HyperText Transfer Protocol)-based streaming protocol.

In adaptive streaming, in order to allow content reproduction by a variety of clients, data delivery destinations, a content delivery server such as broadcasting station creates fragmented files of video content having a plurality of bitrates and a manifest file that describes attribute information and URLs (Uniform Resource Locators) thereof and provides these files to these clients.

The clients acquire the manifest file from the server, select the content having the best suited bitrate to match the size of the display section and the available communication band of their own apparatus, and receive and reproduction the selected content. It is also possible to dynamically change the bitrate in accordance with the change in network band. As a result, the client side can switch from one piece of content to another to receive the best suited content to match the circumstances, thereby realizing video reproduction with reduced occurrences of video interruptions. It should be noted that adaptive streaming is described, for example, in PTL 1 (JP 2011-87103A).

Today, efforts are in full swing to develop and standardize one-way communication from transmission apparatuses such as broadcasting stations and other content servers to reception apparatuses such as TVs, PCs, and mobile terminals by using broadcasting wave and so on or two-way communication via a network such as the Internet, and systems that send and receive broadcasting programs and other content by using one-way communication.

It should be noted that PTL 2 (JP 2014-057227A) is among prior arts that disclose technologies for realizing data delivery via broadcasting wave and networks.

The standardization of ATSC (Advanced Television Systems Committee) 3.0, a standard on data delivery systems via broadcasting wave and network, is underway at present.

ATSC 3.0 considers a configuration that receives signaling data including ATSC broadcasting control information to accomplish various types of control based on signaling data by implementing middleware for handling ATSC 3.0 broadcasting reception and other processes on a broadcasting delivery device (reception apparatus) that has an ATSC 3.0-supporting physical layer (ATSC-PHY) implemented therein.

Specifically, for example, the configuration under study allows for a broadcasting program output process using so-called client applications, application programs used on the Internet and so on, in an 'as-is' fashion and data processing using a variety of applications provided by broadcasting wave and so on.

For example, an ATSC 3.0-supporting physical layer (ATSC-PHY) and ATSC 3.0 broadcasting reception middleware are implemented in servers (e.g., not only dedicated servers but also PCs, TVs, tablets, and smartphones) that are installed in households or at hotspots to receive broadcasting services.

These servers temporarily receive ATSC 3.0 broadcasting services and then transport received broadcasting data to user apparatuses (e.g., PCs, TVs, tablets, and smartphones) via a network (e.g., LAN/WiFi such as home networks and hotspots).

The user apparatuses that have input the received broadcasting data transported via the server can reproduction broadcasting content and execute a variety of applications delivered through broadcasting by using an application that runs on a reproduction control section or an application control section of the user apparatus (e.g., ATSC 3.0 DASH client application).

Further, 3GPP (Third Generation Partnership Project), an international standard specification development organization and DASH-IF, a standardization organization of the MPEG-DASH standard, a standard on adaptive streaming technology, are working toward standardizing delivery and reproduction configuration of advertisement content.

Specifically, for example, they are working toward standardizing a configuration for dynamically changing advertisements to be output to each reception apparatus to suit each user on the reception apparatus side.

It should be noted, however, that a configuration for realizing this configuration has yet to be materialized as of now.

CITATION LIST

Patent Literature

[PTL 1]
JP 2011-87103A
[PTL 2]
JP 2014-057227A

SUMMARY

Technical Problem

The present disclosure has been devised, for example, in light of the above problem, and it is an object of the present disclosure to provide a transmission apparatus, a reception apparatus, and a data processing method for allowing selective output of user-tailored content such as advertisements tailored to a user of a reception apparatus on the reception apparatus that receives and reproduces broadcasting programs and so on.

Solution to Problem

A first aspect of the present disclosure is a transmission apparatus that includes a communication section and a data processing section. The communication section sends a plurality of pieces of content that can be selected and output during a content output time of a given duration on a reception apparatus. The data processing section determines a transmission order of the plurality of pieces of content. The data processing section further performs a transmission order determination process of arranging a transmission time of content highly likely to be viewed closest to a content output time and arranging a transmission time of content unlikely to be viewed before the transmission time of content highly likely to be viewed.

Further, a second aspect of the present disclosure is a reception apparatus that includes a data processing section. The data processing section receives a plurality of pieces of content that can be selected and output during a content output time of a given duration and stores the pieces of content in a cache section. The data processing section acquires delivery priority information (Delivery Priority) specified for each of the plurality of pieces of content, preferentially receives the pieces of content with high delivery priority information (Delivery Priority) settings in accordance with the acquired delivery priority information (Delivery Priority), and stores these pieces of content in a cache section.

Still further, a third aspect of the present disclosure is a data processing method carried out by a transmission apparatus. In the data processing method, a data processing section performs a process of determining a transmission order of a plurality of pieces of content that can be selected and output during a content output time of a given duration on a reception apparatus and sending the content, and the data processing section performs a transmission order determination process of arranging a transmission time of content highly likely to be viewed closest to the content output time and arranging a transmission time of content unlikely to be viewed before the transmission time of content highly likely to be viewed.

Still further, a fourth aspect of the present disclosure is a data processing method carried out by a reception apparatus. A data processing section to perform a process of receiving a plurality of pieces of content that can be selected and output during a content output time of a given duration and storing the pieces of content in a cache section. The data processing section acquires delivery priority information (Delivery Priority) specified for each of the plurality of pieces of content, preferentially receives the pieces of content with high delivery priority information (Delivery Priority) settings, and stores these pieces of content in a cache section.

Still further, a fifth aspect of the present disclosure is an application control method carried out by a reception apparatus. An application control section has an API (Application Programing Interface) that gives an instruction as to whether to store delivered content in a cache section and an instruction as to whether to output content stored in the cache during a given time period. The application control section makes a final decision as to whether to output advertisement content not only based on delivery priority information but also based on an application judgment.

Still other objects, features, and advantages of the present disclosure will become apparent from a more detailed description based on the embodiment of the present disclosure which will be described later and the attached drawings. It should be noted that the system in the present specification has a configuration that includes a logical set of a plurality of apparatuses and that the apparatuses, each serving as a component, need not necessarily be accommodated in the same housing.

Advantageous Effect of Invention

According to a configuration of an embodiment of the present disclosure, a configuration is realized that ensures enhanced likelihood for reproduction of advertisement content by a specific user by controlling a transmission order of advertisements that can be selected and output, receiving advertisements highly likely to be viewed, and storing the advertisements in a cache on a reception apparatus even with a limited capacity of a cache storage section.

Specifically, a transmission apparatus determines a transmission order of a plurality of pieces of advertisement content that can be selected and output during a content output time of a given duration on a reception apparatus and sends the pieces of content. The transmission apparatus arranges the transmission time of content highly likely to be viewed closest to the content output time and arranges the transmission time of content unlikely to be viewed before the transmission time of content highly likely to be viewed. Further, the transmission apparatus sends delivery priority information (Delivery Priority) specified for each of the plurality of pieces of advertisement content to the reception apparatus so that the reception apparatus can decide whether caching is required based on priority information.

The present configuration realizes a configuration that allows for controlling of a transmission order of advertisements that can be selected and output, reception of advertisements highly likely to be viewed, and storage of the advertisements in a cache storage section and ensures enhanced likelihood for reproduction of advertisements by users in broadcast regions.

It should be noted that the effect described in the present specification is merely illustrative and is not limited and that there may be additional effects.

BRIEF DESCRIPTION OF DRAWINGS

FIG. 5 is a diagram describing a data output example in a reception apparatus (client) 30.

FIG. 6 is a diagram describing an example of selecting an advertisement to be output using various user information.

FIG. 7 is a diagram describing a configuration example of a reception apparatus.

FIG. 17 is a diagram describing an example of setting a delivery order of a plurality of advertisements.

FIG. 37 is a diagram describing hardware configuration examples of transmission and reception apparatuses, communication apparatuses.

DESCRIPTION OF EMBODIMENTS

A detailed description will be given below of a transmission apparatus, a reception apparatus, and a data processing method of the present disclosure with reference to drawings. It should be noted that the description will be given in accordance with the following items.

1. Configuration Example of the Communication System
2. Data Communication Protocols FLUTE and ROUTE
3. Communication Processes Carried Out by the Transmission and Reception Apparatuses
4. Example of Data Output on the Reception Apparatus
5. Configuration Example and Processing Example of the Reception Apparatus
6. Period-by-Period Signaling Data Using MPD
7. Specific Configuration Example for Carrying Out an Advertisement Provision Process to Match User Information
8. Configuration for Controlling the Delivery Order of Advertisement Content
9. Processing Example Based on Delivery Priority Information (Delivery Priority)
10. Processes to Which Service Selection Priority Information (Service Selection Priority) Is Applied
11. Configuration Example for Recording Each Piece of Priority Information
12. Configuration Examples of the Transmission and the Reception Apparatuses
13. Conclusion of the Configuration of the Present Disclosure

[1. Configuration Example of the Communication System]

A description will be given first of a configuration example of a communication system that carries out processes of the present disclosure with reference to FIG. 1.

Figure 1:
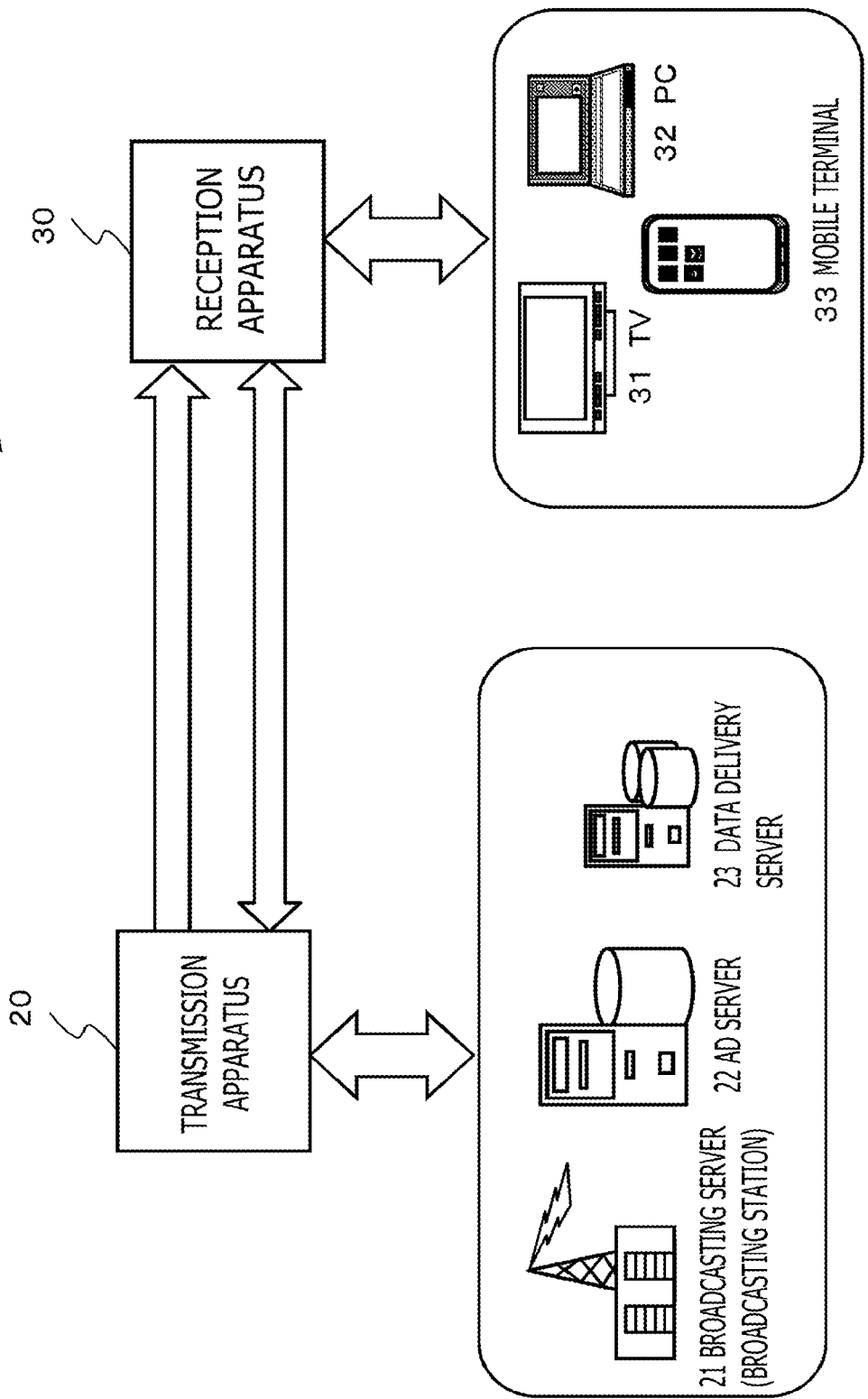
FIG. 1 is a diagram describing a configuration example of a communication system for performing processes of the present disclosure.

As illustrated in FIG. 1, a communication system 10 includes a transmission apparatus 20 and a reception apparatus 30. The transmission apparatus 20 is a communication apparatus that sends content such as video and audio data. The reception apparatus 30 is a communication apparatus that receives content sent by the transmission apparatus 20.

The transmission apparatus 20 is, specifically, for example, an apparatus that provides various content (broadcasting programs, advertisements, and other data) such as a broadcasting server (broadcasting station) 21 that mainly sends TV programs and so on, an advertisement server 22 that mainly sends advertisement data, and a data delivery server 23 that sends a variety of data.

On the other hand, the reception apparatus 30 is a client apparatus of an ordinary user and specifically includes a TV 31, a PC 32, a mobile terminal 33, and so on.

It should be noted that although the broadcasting server (broadcasting station) 21, the advertisement server 22, and the data delivery server 23 are depicted as separate servers as an example of the transmission apparatus 20 in FIG. 1, a single server may be configured to send all of broadcasting programs, advertisements, and other data.

Data communication between the transmission apparatus 20 and the reception apparatus 30 takes place as at least one of two-way communication via a network such as the Internet, one-way communication, and one-way communication using broadcasting wave, or communication using both.

Content transmission from the transmission apparatus 20 to the reception apparatus 30 is carried out, for example, in accordance with the MPEG-DASH standard, a standard for adaptive streaming technology.

The MPEG-DASH standard includes the following two standards:
(a) Standard on manifest file (MPD: Media Presentation Description) for describing metadata, video and audio file management data
(b) Standard on file format (segment format) for transporting video content The transmission apparatus 20 carries out content delivery to the reception apparatus 30 in accordance with the above MPEG-DASH standard.

The transmission apparatus 20 encodes content data and creates a data file that includes encoded data and metadata of the encoded data. The encoding process is conducted, for example, in accordance with the MP4 file format defined in MPEG. It should be noted that when the transmission apparatus 20 creates a data file in MP4 format, the encoded data file is called, for example, "mdat," and the metadata is called, for example, "moon" or "moof."

A variety of data is provided by the transmission apparatus 20 to the reception apparatus 30 as content including, for example, video data such as music data, movies, TV programs, videos, photographs, documents, paintings, and figures and tables, and games, and software.

A description will be given of transmission data of the transmission apparatus 20 with reference to FIG. 2.

Figure 2:
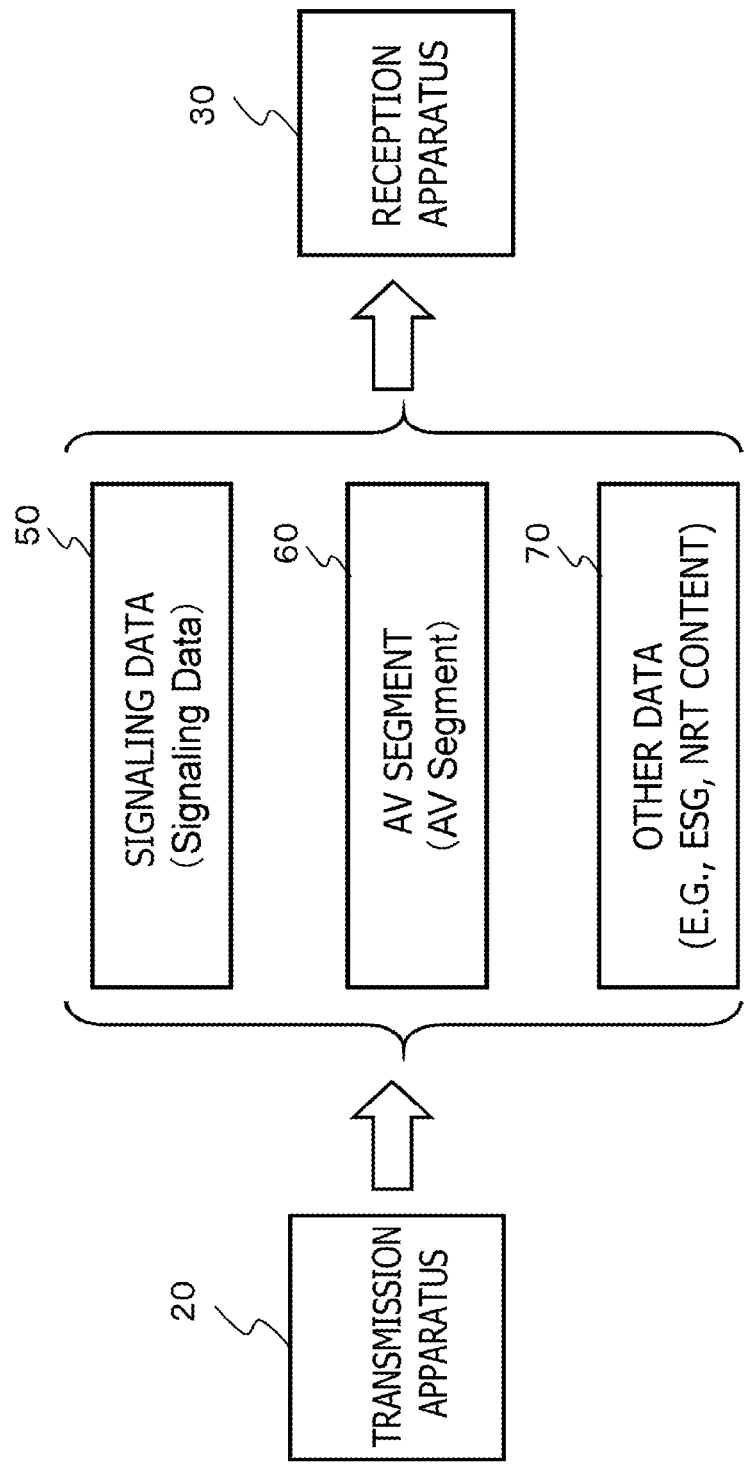
FIG. 2 is a diagram describing transmission data of a transmission apparatus.

The transmission apparatus 20 that carries out data transmission in accordance with the MPEG-DASH standard sends a plurality of types of data that are broadly classified as follows as illustrated in FIG. 2:
(a) Signaling data 50
(b) AV segment 60
(c) Other data (e.g., ESG, NRT content) 70

The AV segment 60 includes video and audio data to be reproduced by the reception apparatus, i.e., for example, program content provided by a broadcasting station. For example, the AV segment 60 includes MP4 encoded data (mdat) and metadata (moov, moof) described above. It should be noted that an AV segment is also referred to as a DASH segment.

On the other hand, the signaling data 50 includes not only program schedule information such as program listings and address information (e.g., URL (Uniform Resource Locator)) required to acquire programs but also further various control information including guidance information made up of information required for content reproduction process such as codec information (e.g., coding scheme) and application control information.

It is necessary for the reception apparatus 30 to receive this signaling data 50 ahead of the AV segment 60 that stores program content to be reproduced.

This signaling data 50 is sent from the transmission apparatus 20, for example, as data in XML (Extensible Markup Language) format.

Signaling data is sent repeatedly at all times, and it is sent repeatedly on a frequent basis such as every 100 millisecond.

This is designed to allow the reception apparatus (client) to acquire signaling data immediately at any time.

It is possible for the reception apparatus (client) to carry out, without delay, the processes required to receive and reproduction program content such as acquisition of the access address of necessary program content and codec setup process based on signaling data that can be acquired at all times.

The other data 70 includes, for example, ESG (Electronic Service Guide), NRT content, and so on.

ESG is an Electronic Service Guide and is, for example, guide information such as program listings.

NRT content is non-realtime content.

NRT content includes, for example, various applications executed on the browser of the reception apparatus 30, a client, and data files such as videos and still images, and so on.

It should be noted that the schedule such as NRT content delivery time and presentation time is described in the ESG.

The following data depicted in FIG. 2, that is,
(a) Signaling data 50
(b) AV segment 60
(c) Other data (e.g., ESG, NRT content) 70
is sent, for example, in accordance with FLUTE (File Delivery over Uni-directional Transport), a data communication protocol.

[2. Data Communication Protocols FLUTE and ROUTE]

The data communication protocol FLUTE (File Delivery over Uni-directional Transport) is a protocol that manages sessions of content transported by multicast.

For example, files (identified by URL and version) created by the server side, a transmission apparatus, is sent to reception apparatuses, clients, in accordance with the FLUTE protocol.

The reception apparatus (client) 30 accumulates the received files in association with their URLs and versions, for example, in a storage section (client cache).

The reception apparatus 30 considers that a file having the same URL but a different version contains updated content. The FLUTE protocol is designed to control only one-way file transport and does not have a selective file filtering function. However, selective filtering is achieved by selecting files whose transport is controlled by FLUTE on the client side using metadata associated with the files, thereby making it possible to configure a local cache that reflects users' preferences and manage its updates.

It should be noted that metadata can be extended and incorporated into the FLUTE protocol. Alternatively, metadata can be described separately in a protocol such as ESG (Electronic Service Guide).

It should be noted that FLUTE has been initially made into a specification as a multicast file transfer protocol. FLUTE includes FDT and a scalable multicast protocol for file objects called ALC, and specifically, it includes a combination of LCT and FEC components, building blocks of ALC.

The conventional FLUTE has been developed primarily for use in asynchronous file transfer. Today, ATSC (Advanced Television Systems Committee), a standardization organization on data delivery systems via broadcasting wave and networks, is working on its extension for easy application to broadcast live streaming, as well. The extended specification of this FLUTE is called ROUTE (Real-Time Object Delivery over Unidirectional Transport).

ATSC (Advanced Television Systems Committee) 3.0 is a standard on data delivery systems via broadcasting wave and network, and the standardization thereof is underway at present. This ATSC 3.0 defines a stack configuration that employs the conventional FLUTE protocol rather than ROUTE to send signaling data, ESG, or asynchronous files, synchronous streams and so on.

[3. Communication Processes Carried Out by the Transmission and Reception Apparatuses]

A description will be given next of an example of communication processes carried out by the transmission and reception apparatuses.

Figure 3:
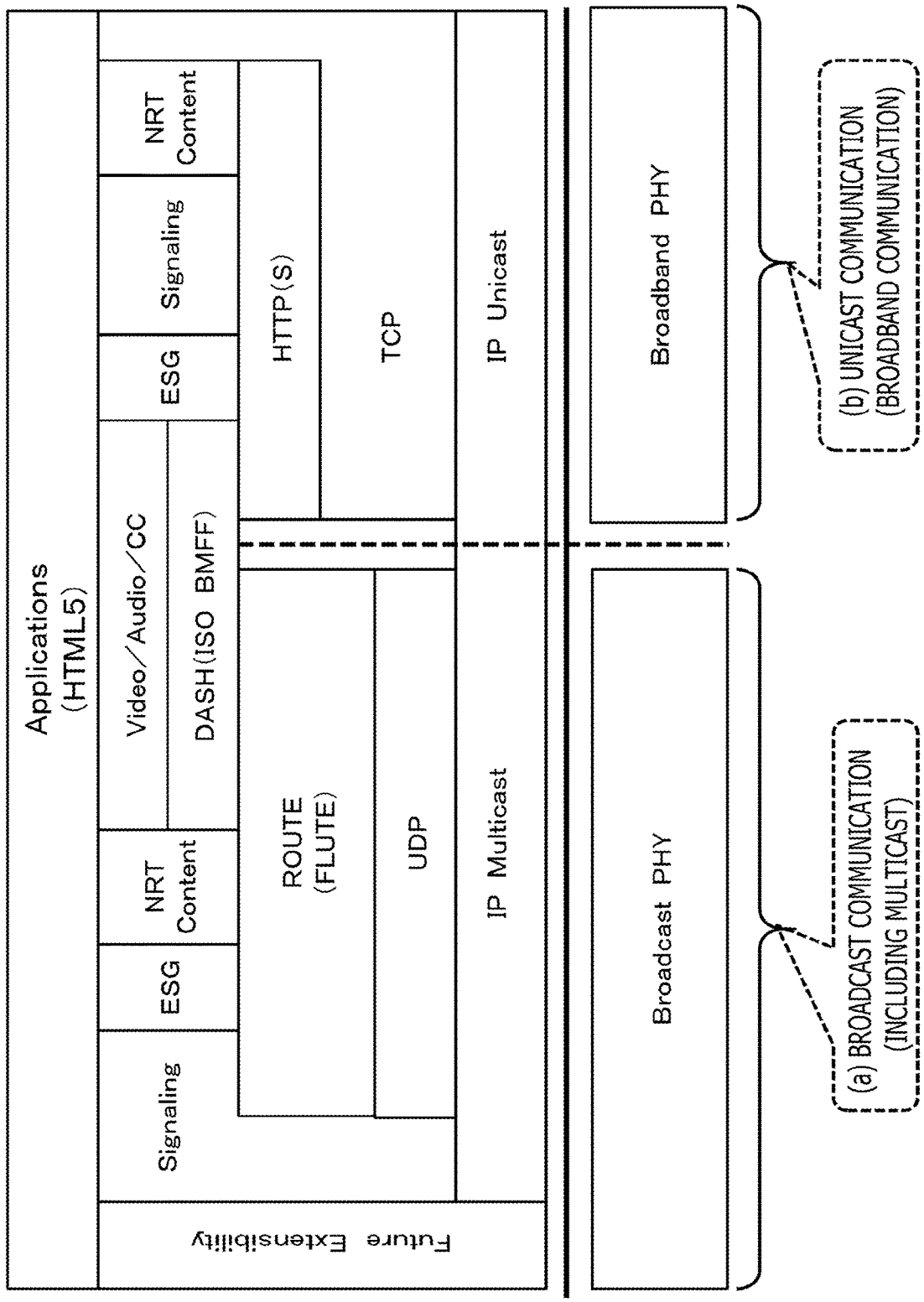
FIG. 3 is a diagram illustrating examples of protocol stacks of transmission and reception apparatuses.

FIG. 3 is a diagram illustrating examples of protocol stacks of the transmission and reception apparatuses.

The example depicted in FIG. 3 has two protocol stacks for processing the following two pieces of communication data:
(a) Broadcast (including multicast) communication (e.g., broadcast-type data delivery)
(b) Unicast (broadband) communication (e.g., HTTP-type P2P communication)

Depicted on the left in FIG. 3 is a protocol stack for broadcast communication (e.g., broadcast-type data delivery).

Depicted on the right in FIG. 3 is a protocol stack for unicast (broadband) communication (e.g., HTTP-type P2P communication).

The protocol stack for (a) broadcast communication (e.g., broadcast-type data delivery) depicted on the left in FIG. 3 has the following layers in order from the bottom layer:
(1) Broadcast physical layer (Broadcast PHY)
(2) IP multicast layer (IP Multicast)
(3) UDP layer
(4) ROUTE (=extended FLUTE) layer
(5) ESG, NRT content, DASH (ISO BMFF), and Video/Audio/CC
(6) Application layer (Applications (HTML5))

It should be noted that a signaling (Signaling) layer is set as an upper layer of (2) IP multicast layer (IP Multicast).

The signaling layer is a layer applied for transmission and reception of the signaling data 50 described earlier with reference to FIG. 2. Signaling data includes program schedule information such as program listings and address information (e.g., URL) required to acquire programs and further various control information including guidance information made up of information required for content reproduction process such as codec information (e.g., coding scheme) and control information.

Signaling data is data that includes access information of an AV segment received and reproduced by the reception apparatus (client) and guidance information and control information required for processes after reception such as decoding process, and signaling data is sent from the transmission apparatus repeatedly at all times.

There are various types of signaling data to suit information. Specifically, USD (User Service Description) is available as service-by-service signaling data.

USD includes a variety of types of control information. Typical among such control information is MPD (Media Presentation Description), signaling data having a manifest file that stores various guidance information and control information for content (AV segment).

Each of various pieces of signaling data is required for the reception apparatus (client) to perform the processes of receiving, reproducing, and controlling the AV segment and the application (application program) sent from the transmission apparatus, and is set, for example, as an individual file by category and sent from the transmission apparatus.

It should be noted that a layer that permits use of a new protocol in the future (Future Extensibility) is set as an upper layer of (1) broadcast physical layer (Broadcast PHY).

(1) Broadcast physical layer (Broadcast PHY) is a physical layer that includes, for example, a communication section that controls a broadcasting-based communication section for carrying out broadcast communication.

(2) IP multicast layer (IP Multicast) is a layer that carries out data transmission and reception processes in accordance with IP multicast.

(3) UDP layer is a layer that handles UDP packet creation and analysis processes.

(4) ROUTE layer is a layer that stores and extracts transported data in accordance with the ROUTE protocol, an extended FLUTE protocol.

As with FLUTE, ROUTE is a scalable multicast protocol for file objects called ALC, and specifically, it includes a combination of LCT and FEC components, building blocks of ALC.

Figure 4:
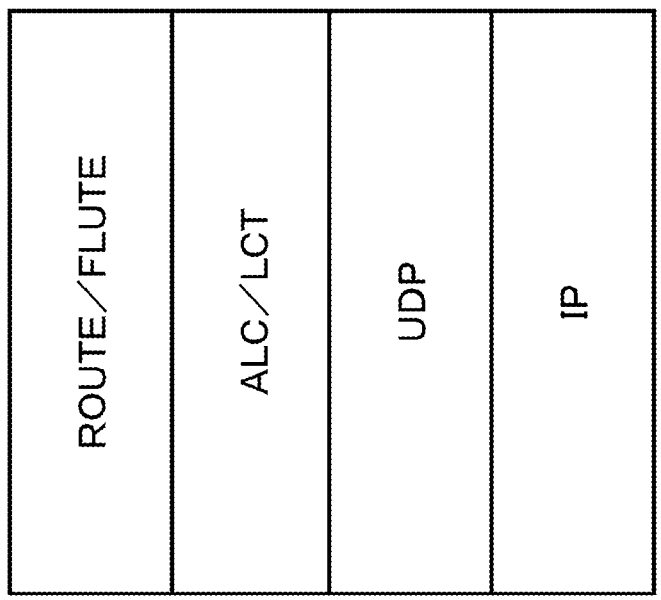
FIG. 4 is a diagram illustrating protocol stacks related to ROUTE and FLUTE.

FIG. 4 illustrates protocol stacks related to ROUTE and FLUTE.

(5) ESG, NRT content, DASH (ISO BMFF), and Video/Audio/CC are data transported in accordance with the ROUTE protocol.

Broadcast-type delivery service that complies with the DASH standard is called MBMS (Multimedia Broadcast Multicast Service). eMBMS is available as a scheme for efficiently implementing this MBMS in LTE.

MBMS and eMBMS are broadcast-type delivery services that deliver the same data such as movie content at once to a plurality of user terminals (UEs), reception apparatuses located within a specific area, over a common bearer. Broadcast delivery that complies with MBMS or eMBMS makes it possible to provide the same content to a number of reception apparatuses such as smartphones, PCs, or TVs located in the area covered by the delivery service.

MBMS and eMBMS define processes of downloading files that comply with the 3GPP file format (ISO-BMFF file and MP4 file) in accordance with the transfer protocol ROUTE or FLUTE.

Much of the following data described earlier with reference to FIG. 2 is sent in accordance with the ROUTE or FLUTE protocol:
(a) Signaling data 50
(b) AV segment 60
(c) Other data (e.g., ESG, NRT content) 70

(5) ESG, NRT content, DASH (ISO BMFF), and Video/Audio/CC is data transported in accordance with the ROUTE protocol.

ESG is an Electronic Service Guide and guidance information such as program listings.

NRTcontent is non-real-time content.

As described earlier, NRT content includes, for example, various applications executed on the browser of the reception apparatus 30, a client, and data files such as videos and still images, and so on.

Video/Audio/CC is actual data to be reproduced such as video, audio, and so on delivered in accordance with the DASH standard.

(6) Application layer (Applications (HTML5)) is an application layer that handles not only creation or analysis of data to be transported in accordance with the ROUTE protocol but also various other data output control tasks, and performs, for example, HTML5-based data creation, analysis, and output processes.

On the other hand, the protocol stack for (b) unicast (broadband) communication (e.g., HTTP-type P2P communication) on the right in FIG. 3 has the following layers in order from the bottom layer:
(1) Broadband physical layer (Broadband PHY)
(2) IP unicast layer (IP Unicast)
(3) TCP layer
(4) HTTP layer
(5) ESG, Signaling, NRTcontent, and DASH (ISO BMFF) and Video/Audio/CC
(6) Application layer (Applications (HTML5))

(1) Broadband physical layer (Broadband PHY) is a physical layer that includes, for example, a communication control section such as device driver that carries out broadband communication.

(2) IP unicast layer (IP Unicast) is a layer that carries out IP unicast transmission and reception processes.

(3) HTTP layer is a layer that handles HTTP packet creation and analysis processes.

These upper layers are the same as in the stack configuration for (a) broadcast communication (e.g., broadcast-type data delivery) on the left in FIG. 3.

It should be noted that the transmission apparatus (server) 20 and the reception apparatus (client) 30 perform processes in accordance with at least one of the two processing systems depicted in FIG. 3, namely, the following two communication protocol stacks:

(a) Broadcast communication (e.g., broadcast-type data delivery)
(b) Unicast (broadband) communication (e.g., HTTP-type P2P communication).

In the protocol stacks depicted in FIG. 3, an attribute (including URL, a file identifier) of a group of files transported by multicast in accordance with ROUTE (FLUTE) can be described not only in a control file but also in signaling data (Signaling). Also, a further detailed attribute of a file transfer session (can also be used for presentation to end users) can be described in ESG.

As described earlier, the standardization of ATSC (Advanced Television Systems Committee) 3.0, a standard on data delivery systems via broadcasting wave and network, is underway at present.

In the standardization of IP based transport stack in ATSC 3.0, a method has been proposed to transport a file based on MPEG-DASH file format (ISO-BMFF file, MP4 file) by the ROUTE (Real-Time Object Delivery over Unidirectional Transport) protocol, an extension of FLUTE (File Delivery over Unidirectional Transport), and specified as a candidate for standard scheme.

Using the ROUTE protocol makes it possible to transport not only the fragmented MP4 file sequence of the DASH standard and the MPD (Media Presentation Description), a metafile that stores control information (signaling data) of the DASH standard but also USBD/USD and S-TSID (Service based Transport Session Description), signaling data for broadcasting delivery, and so on.

As described earlier, the ROUTE protocol is a protocol based on FLUTE. A metadata file that describes transport control parameters in FLUTE is called an FDT (File Delivery Table), and a metadata file that describes transport control parameters in ROUTE is called an S-TSID (Service based Transport Session Description). S-TSID is a superset of FDT and includes FDT.

USBD/USD, S-TSID, MPD, and so on proposed as signaling data (SLS: Service Layer Signaling) of the ATSC 3.0 service layer are all transported by ROUTE session.

[4. Example of Data Output on the Reception Apparatus]

A description will be given next of a data output example in the reception apparatus (client) 30 that receives data from the transmission apparatus 20 such as the broadcasting server 21 or the advertisement server 22 and outputs the data.

FIG. 5 is a diagram describing a data output example in the reception apparatus (client) 30.

Movies, news, and other broadcasting programs (main content) and advertisements, for example, are output alternately on the reception apparatus 30 in accordance with the time line (time axis (t)) depicted at the bottom in FIG. 5.

Assuming that the program of a channel selected by the user starts at time t0, broadcasting programs and advertisements are output alternately as depicted below as time passes.

Time t0 to t1: Advertisement
Time t1 to t2: Broadcasting program
Time t2 to t3: Advertisement
Time t3 to t4: Broadcasting program
Time t4 to t5: Advertisement
Time t5 to after Time t5: Broadcasting program Here, the advertisements output on the reception apparatus 30 are advertisements selected from among a number of pieces of advertisement content to match the viewing user of the reception apparatus 30.

Best suited advertisements for the user are selected and output by controlling the application based on user (viewer) information set in the reception apparatus 30.

User information includes a variety of information such as user (viewer) age, sex, address, and hobby and preference.

As these pieces of user information, information registered in advance in the storage section of the reception apparatus is used.

Alternatively, a configuration may be used in which the user (viewer) is requested to enter user information when the program starts so that the entered information is used.

Still alternatively, a configuration may be used in which advertisements to be output can be selected freely in response to user input to the reception apparatus 30.

There are numerous variations in user information setting and manner of use. For example, a variety of configurations are possible, including a configuration in which the user is requested to specify user information for each program, a configuration in which information is specified for each channel, and a configuration in which common user information is specified for all channels.

These pieces of user information are stored in the storage section of the reception apparatus and used as necessary.

A specific configuration for selecting advertisement using user information will be described later.

It should be noted that the selection of advertisements most suited to the user is handled by the application that is executed in the application control section. Therefore, user information may be acquired by the application. Alternatively, the application itself can display questions to the user about the sex, age, and so on and inquire the user depending on user response and so on.

A description will be given of an example of selecting an advertisement to be output using various user information with reference to FIG. 6.

FIG. 6 illustrates the following three types of specific examples:

(A) Example of advertisement setting by age
(B) Example of advertisement setting by residence
(C) Example of advertisement setting by age and residence The following example is depicted as an (A) example of advertisement setting by age:

Age of user (viewer)=20 or older→An advertisement of an alcoholic beverage (liquor) is selected and output.

Age of user (viewer)=15 or younger→An advertisement of a toy is selected and output.

This example is an example in which the user is requested to register his or her age as user information registered on the side of the reception apparatus 30 and an advertisement that matches the user's age is output on the reception apparatus 30 of that user based on the registered user information (viewer's age).

The following example is depicted as a (B) example of advertisement setting by residence:

Location of user (viewer)=Alaska→An advertisement of a heating appliance is selected and output.

Location of user (viewer)=Hawaii→An advertisement of an air-conditioning appliance is selected and output.

This example is an example in which the user is requested to register his or her location as user information registered on the side of the reception apparatus 30 and an advertisement that matches the user's age is output on the reception apparatus 30 of that user based on the registered user information (viewer's location).

The following example is depicted as (C) example of advertisement setting by age and residence:

Age of user (viewer)=18 or older, and
Location of user (viewer)=New York

When these two conditions are met, an advertisement of a restaurant in New York is selected and output.

Age of user (viewer)=15 or younger, and
Location of user (viewer)=California

When these two conditions are met, an advertisement of a toy store in California is selected and output.

This example is an example in which the user is requested to register his or her age and location as user information registered on the side of the reception apparatus 30 and an advertisement that matches the user's age and location is output on the reception apparatus 30 of that user based on the registered user information (viewer's age and location).

Thus, the processes of the present invention realize a configuration in which an application executed in the application control section selects and outputs an advertisement best suited for a user (viewer), i.e., an advertisement deemed to achieve a much advertising effect, to match various user information specified on the side of the reception apparatus 30.

[5. Configuration Example and Processing Example of the Reception Apparatus]

A description will be given below of a configuration example and a processing example of the reception apparatus with reference to FIG. 7 onward.

It should be noted that the reception apparatus 30 includes the TV 31, the PC 32, and the mobile terminal 33, or various other pieces of equipment such as smartphone, tablet terminal, smartwatch, wearable device, and so on as described earlier with reference to FIG. 1.

The reception apparatus 30 depicted in FIG. 7 receives transmission data from the transmission apparatus 20 such as broadcasting server and advertisement server, i.e., the signaling data 50, the AV segment 60, and the other data (e.g., ESG, NRT content) 70, described earlier with reference to FIG. 2 and processes these pieces of data.

The reception apparatus 30 includes an application control section 110, a reproduction control section (Embeded Media Player) 120, and a base system 130 as illustrated in FIG. 7.

The application control section 110 includes an application execution section 111 and executes an application sent from the transmission apparatus 20 such as broadcasting station, an application stored in advance in the reception apparatus 30, and so on.

The reproduction control section 120 carries out a data reproduction process by reproducing a program and executing an application.

The base system 130 includes a cache control section 131, a cache section 132, a first communication section (tuner) 133, a second communication section (network I/F) 134, an output control section 135 and carries out a process of receiving data from the transmission apparatus 20 and storing the data and further a process of controlling data output to the display section, the speaker, and so on.

The first communication section (tuner) 133 carries out a broadcasting wave reception process. The second communication section (network I/F) 134 carries out data communication via a network such as the Internet.

The reproduction control section (Embeded Media Player) 120 controls reproduction of content sent, for example, in accordance with the DASH (MPEG-DASH) standard.

As described earlier, the MPEG-DASH standard includes the following two standards:
(a) Standard on manifest file for describing metadata, video and audio file management data (MPD: Media Presentation Description)
(b) Standard on file format for transporting video content (segment format).

Content delivery from the transmission apparatus 20 to the reception apparatus 30 takes place in accordance with the above MPEG-DASH standard.

Content is sent as a segment (e.g., AV segment), a given unit of divided data, for example, in accordance with the MP4 file format defined in MPEG. The reproduction control section 120 carries out a process of acquiring a segment storing content to be reproduced and so on by referring to the manifest file (MPD).

It should be noted that the reproduction control section 120 and the application control section 110 refer to signaling data sent from the transmission apparatus 20 (e.g., broadcasting server 21, advertisement server 22), acquire necessary data from the cache section 132 in accordance with information described in signaling data, and carries out reproduction control and application control in accordance with information described in signaling data.

It should be noted that data received via broadcasting wave or networks and so on is stored in the cache section 132.

As described earlier with reference to FIG. 2, the signaling data 50 includes not only program schedule information such as program listings and address information (e.g., URL (Uniform Resource Locator)) required to acquire programs but also further various control information including guidance information made up of information required for content reproduction process such as codec information (e.g., coding scheme) and application control information.

The reproduction control section 120 and the application control section 110 acquire signaling data (SLS: Service Layer Signaling) and carry out a data acquisition process, a data reproduction process, an application control process, and so on based on the acquired signaling data.

The reproduction control section 120 and the application control section 110 acquire and use various signaling data such as USBD/USD, Application Information Table (AIT), S-TSID, and MPD as signaling data that contains a record of content reproduction, application control, and other information.

Signaling data includes, for example, AV segment required for program reproduction and address information (URL) for acquiring various data files (resources) necessary to execute an application.

Figure 8:
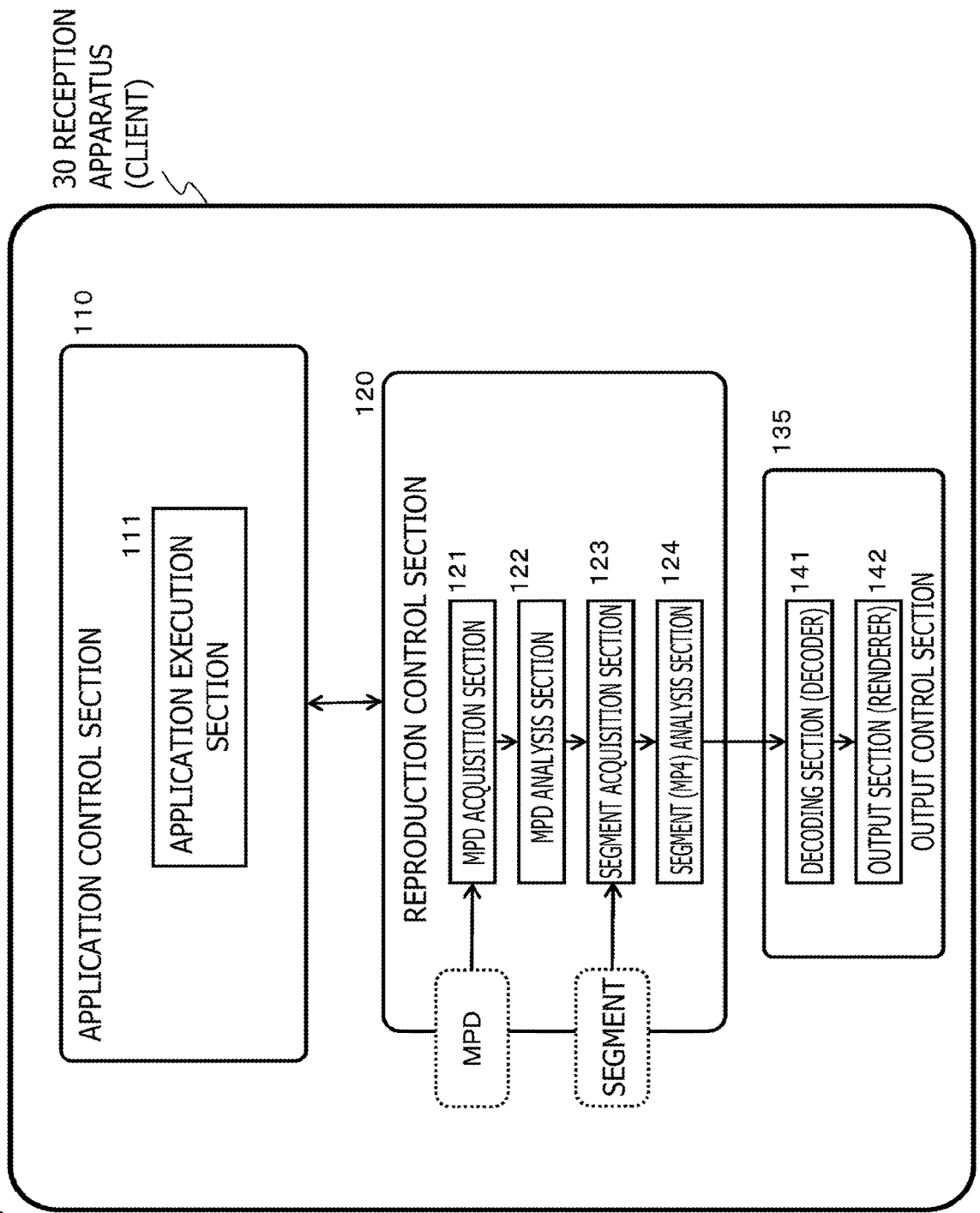
FIG. 8 is a diagram describing a configuration example of a reception apparatus.

FIG. 8 is a diagram illustrating a detailed configuration of the reproduction control section 120 and the output control section 135 of the reception apparatus (client) 30.

The reproduction control section 120 of the reception apparatus (client) 30 includes an MPD acquisition section 121, an MPD analysis section 122, a segment acquisition section 123, and a segment (MP4) analysis section 124.

The reproduction control section 120 controls reproduction of content sent in accordance with the DASH (MPEG-DASH) standard as described earlier.

The MPD acquisition section 121 acquires a manifest file (MPD: Media Presentation Description), a file that describes management information of video and audio files.

The MPD is provided by the transmission apparatus 20 such as the broadcasting server 21 or the advertisement server 22, is stored in the cache section 132 first, and then acquired by the reproduction control section 120.

The MPD analysis section 122 analyzes details of the description in the MPD acquired by the MPD acquisition section 121 and provides information necessary to acquire the segment for data to be reproduced and so on to the segment acquisition section.

The segment acquisition section 123 acquires the segment for data to be reproduced in accordance with MPD analysis results of the MPD analysis section 122.

Segment is a given unit of data set in accordance with the file format (segment format) for transporting content that includes AV data.

The segment (MP4) analysis section 124 acquires encoded video data, encoded audio data and so on from the segment acquired by the segment acquisition section 123, and outputs the data to a decoding section (decoder) 141 of the output control section 135.

The output control section 135 of the reception apparatus (client) 30 includes the decoding section (decoder) 141 and an output section (renderer) 142.

The decoding section (decoder) 141 performs a process of decoding the encoded video data and encoded audio data provided by the segment analysis section 124.

The output section 142 outputs the decoded video data and audio data to an output section (display and speaker).

The reproduction control section 120 of the reception apparatus (client) 30 is a section that executes the ATSC 3.0 client application (3.0 DASH Client).

The 3.0 DASH Client is executed on the browser implemented on the ATSC 3.0 broadcasting reception client device. Alternatively, the 3.0 DASH Client may be executed as a native application rather than as a browser application.

[6. Period-by-Period Signaling Data Using MPD]

As described earlier with reference to FIG. 2, the transmission apparatus 20 provides the reception apparatus 30 with the signaling data 50 that includes various control information.

As described earlier, there are various types of signaling data to suit information. Specifically, for example, USD (User Service Description) is available as service-by-service signaling data.

USD includes a variety of types of control information. Typical among such control information is MPD (Media Presentation Description), signaling data including a manifest file that stores various guidance information and control information for content (AV segment).

MPD (Media Presentation Description), one of signaling data defined in the DASH standard, can provide various control data to the reception apparatus (client) 30 on a period-by-period basis, with a period being, for example, a fragmented time interval of broadcasting time of a program.

Figure 9:
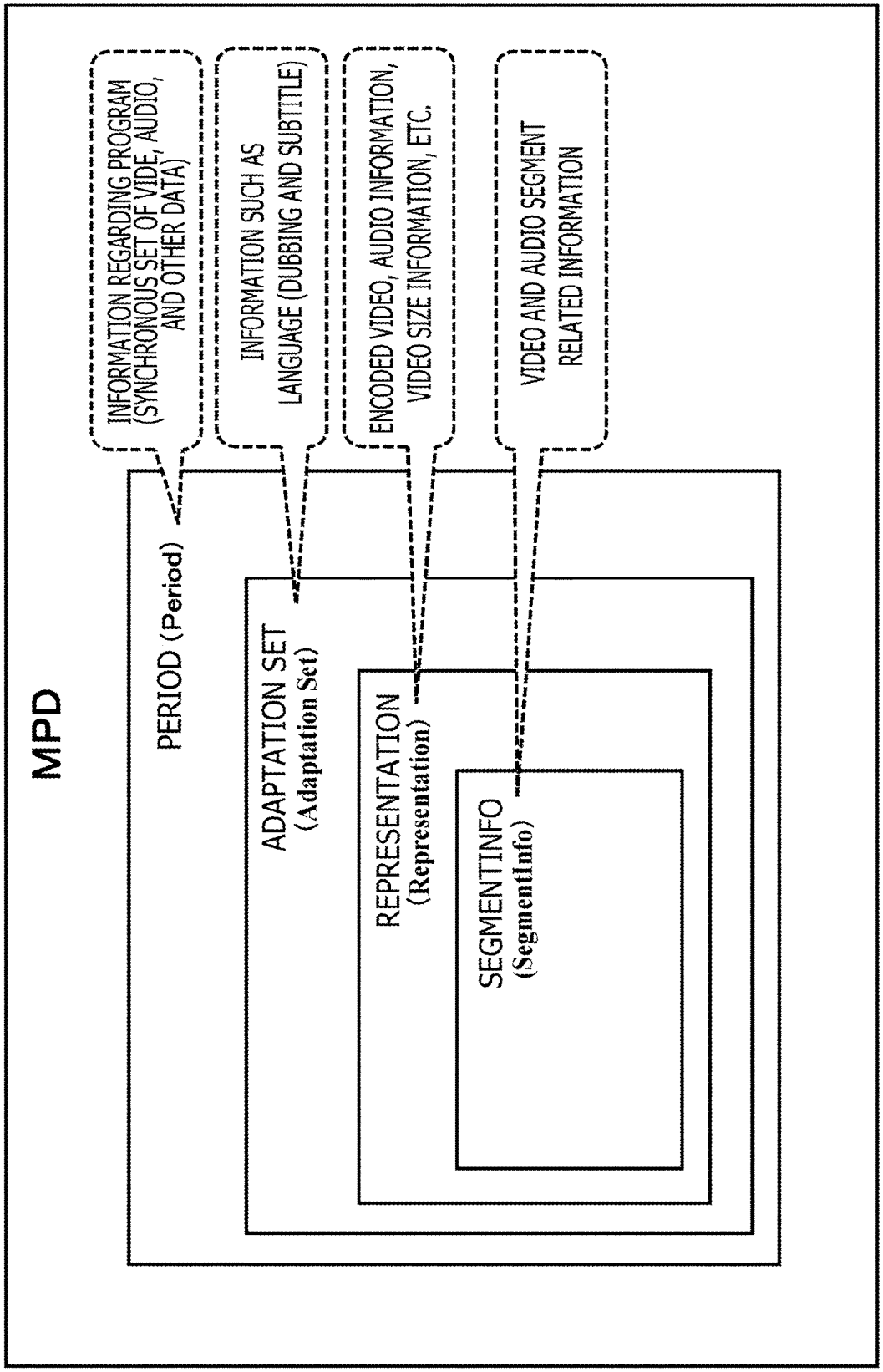
FIG. 9 is a diagram describing a configuration example of an MPD.

FIG. 9 is a diagram illustrating an example of an MPD format.

Figure 10:
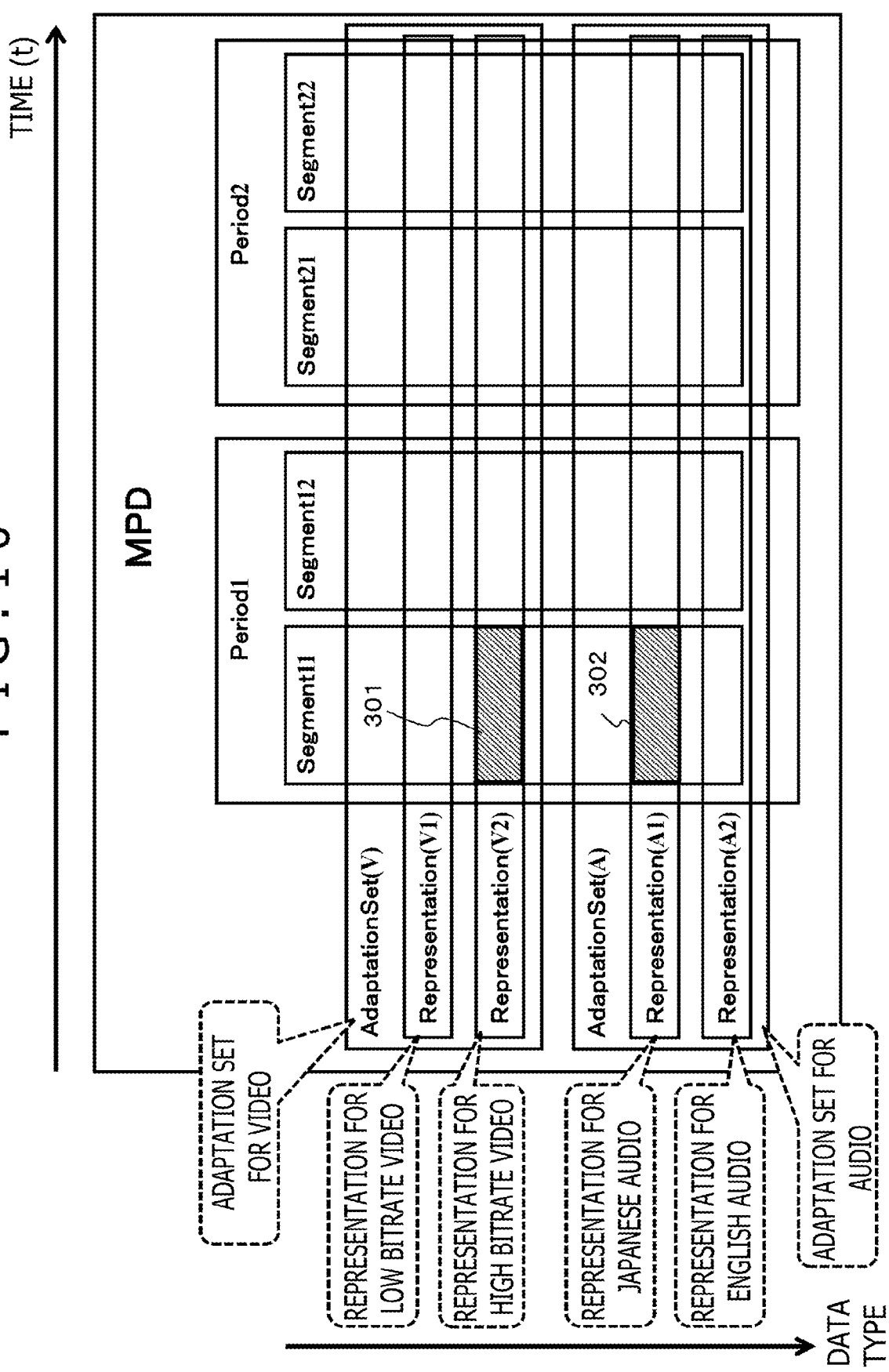
FIG. 10 is a diagram describing a configuration example of an MPD.

MPD can describe attribute and other information and control information in relation each of the following various provisions for each of video and audio streams:

(1) Period that defines an interval on the time axis (Period)
(2) Adaptation that defines video, audio, and other data types and so on
(3) Representation that defines video, audio, and other types
(4) SegmentInfo that serves as a video/audio-segment-(AV segment)-by-segment information recording area FIG. 10 is a diagram illustrating chronological development of information (e.g., control information, management information, attribute information) for an AV segment recorded in an MPD.

We assume that time passes from left to right. This time axis corresponds, for example, to AV content reproduction time on the reception apparatus.

Various information for an AV segment is recorded. It should be noted that various information for AV segment is recorded in the MPD. It should be noted that the MPD is part of signaling data and is, for example, sent ahead of the AV segment.

The MPD can record information in the following units of data as described with reference to FIG. 9:
(1) Period that defines an interval on the time axis (Period)
(2) Adaptation that defines video, audio, and other data types and so on
(3) Representation that defines video, audio, and other types
(4) SegmentInfo that serves as a video/audio-segment-(AV segment)-by-segment information recording area FIG. 10 is a diagram illustrating development of these data areas by the time axis and by data types.

FIG. 10 illustrates the following two adaptations:
(V) Adaptation (V), an information recording area for video
(A) Adaptation (A), an information recording area for audio (V) Adaptation (V), an information recording area for video, has the following two representations as stream-by-stream information recording areas having different attributes.

(V1) Representation (V1), an information recording area for low bitrate video
(V2) Representation (V2), an information recording area for high bitrate video Similarly, (A) Adaptation (A), an information recording area for audio image, has the following two representations as stream-by-stream information recording areas having different attributes.

(A1) Representation (A1), an information recording area for Japanese audio
(A2) Representation (A2), an information recording area for English audio Further, each representation is configured to record information in units of a period for reproduction time axis, and further in units of a segment.

For example, when segment (11) of period 1 is reproduced, the reception apparatus (client) that selects high bitrate video and Japanese audio selects and acquires information about the high bitrate video and Japanese audio to be reproduced from the MPD.

Information recorded in the MPD from which the selection is made is information in a segment area 301 and a segment area 302.

Thus, the reception apparatus selects only information for the data (segment) to be reproduced by the reception apparatus from the MPD sent from the transmission apparatus as signaling data and refers to that information.

Thus, an MPD can record data-type-by-data-type and time-by-time information for segment.

As described earlier with reference to FIG. 5, when a content output process is performed that alternately outputs a broadcasting program and an advertisement, the transmission apparatus can control, for the reception apparatus, time-by-time content (broadcasting programs, advertisements) by using an MPD that contains a record of given-time (period)-by-given time control information described above. Specifically, it is possible to realize a process for providing user-tailored advertisements described earlier with reference to FIG. 5.

Figure 11:
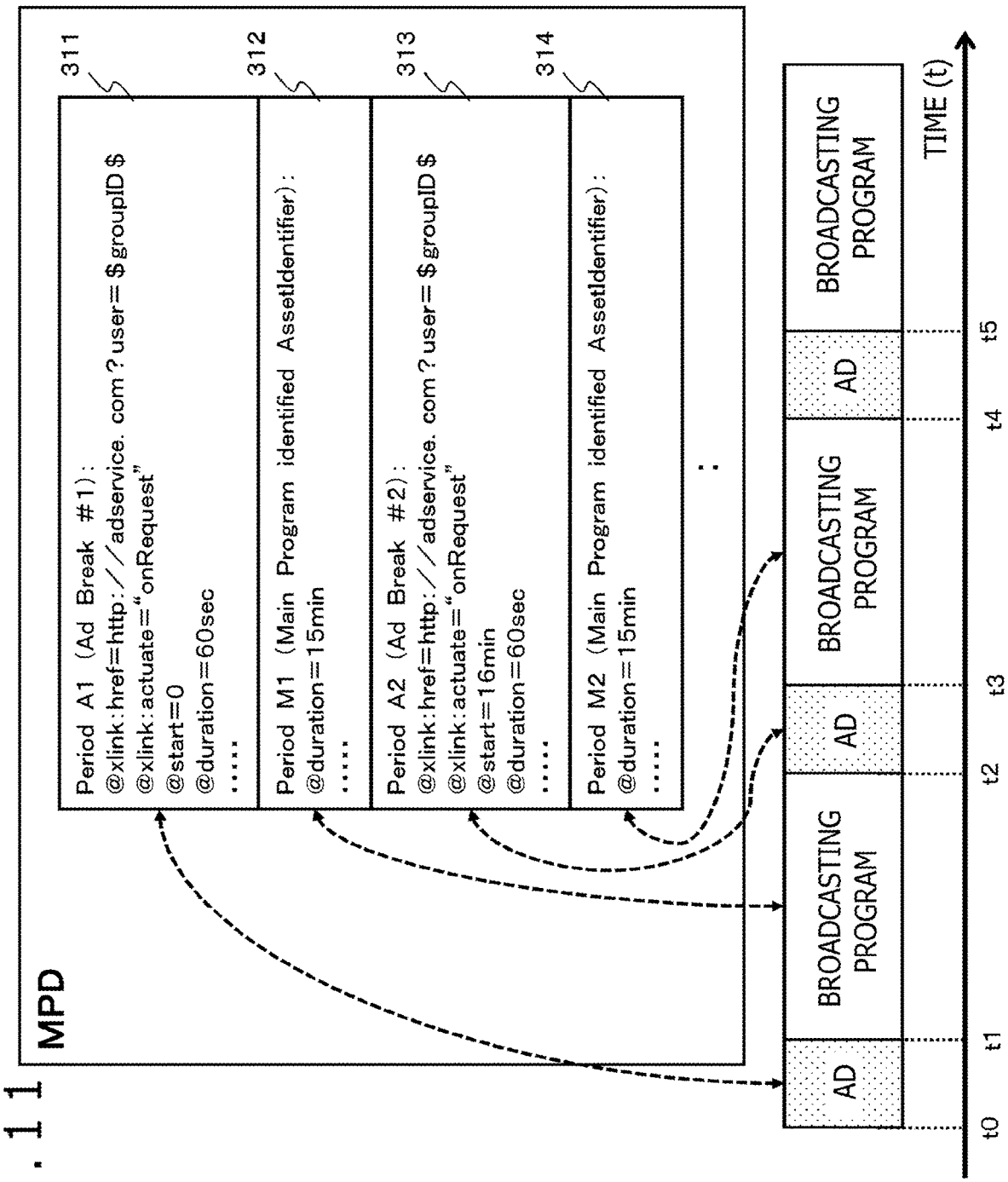
FIG. 11 is a diagram describing a configuration example of an MPD.

FIG. 11 is a diagram illustrating a configuration example of an MPD, control information description data (signaling data) for a content output process that alternately outputs a broadcasting program and advertisements described earlier with reference to FIG. 5.

MPD is classified into advertisement-by-advertisement and broadcasting program-by-broadcasting program period information 311 to 314 that corresponds to output content for a given time interval.

The period information 311 is control information (signaling data) for an advertisement output on the reception apparatus from time t0 to t1.

The period information 312 is control information (signaling data) for a broadcasting program output on the reception apparatus from time t1 to t2.

The period information 313 is control information (signaling data) for an advertisement output on the reception apparatus from time t2 to t3.

The period information 314 is control information (signaling data) for a broadcasting program output on the reception apparatus from time t3 to t4.

Period information contains a record of information required to acquire data (content) to be output to the reception apparatus such as access information (URLs) of broadcasting programs and advertisements sent from the transmission apparatus and a variety of information required to acquire and output content on the reception apparatus such as decoding method (codec).

The transmission apparatus sends the MPD depicted in the figure to the reception apparatus before time to.

The reception apparatus acquires advertisements and broadcasting programs via broadcasting wave or networks by referring to this MPD, performs decoding and other processes using the specified codec, and outputs the advertisements and broadcasting programs to the display section, the speaker, and so on.

Figure 12:
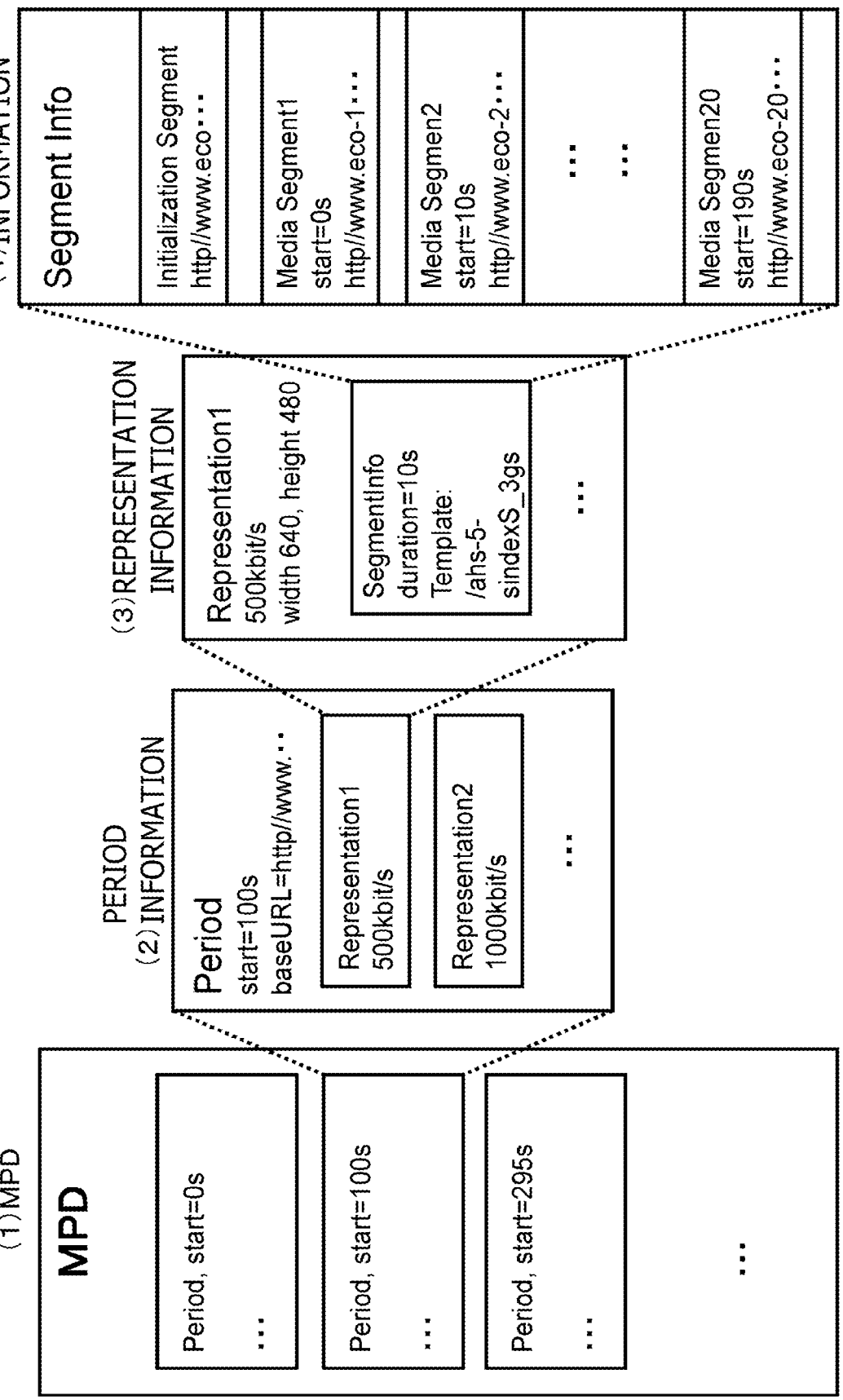
FIG. 12 is a diagram describing an example of MPD usage sequence.

FIG. 12 is a diagram describing a procedure for an MPD analysis process (parsing) carried out by the reception apparatus.

FIG. 12 illustrates each of the following figures:
(1) MPD
(2) Period information
(3) Representation information
(4) Segment information The reception apparatus (client) that receives an AV segment and carries out an AV content reproduction process acquires an MPD included in signaling data that is received ahead of the AV segment and acquires information for data to be reproduced by itself from the MPD.

First, the reception apparatus selects (2) period information that contains a record of information of the specific period (time interval) that corresponds to the AV segment reproduction time from (1) MPD depicted in FIG. 10. Further, the reception apparatus selects (3) representation information for the type of data to be reproduced by itself (client), and further selects (4) segment information for the segment to be reproduced.

It is possible to acquire an AV segment to be reproduced and various information required to reproduction the AV segment by referring to the data recorded in this (4) segment information.

[7. Specific Configuration Example for Carrying Out an Advertisement Provision Process to Match User Information]

A description will be given next of a specific configuration example for carrying out an advertisement provision process tailored to user information.

The configuration of the period information 311, one of the MPDs depicted in FIG. 11, will be described with reference to FIG. 13.

As can be understood from FIG. 11, the period information 311 is period information which is control information for the advertisements output on the reception apparatus from time t0 to t1.

Figure 13:
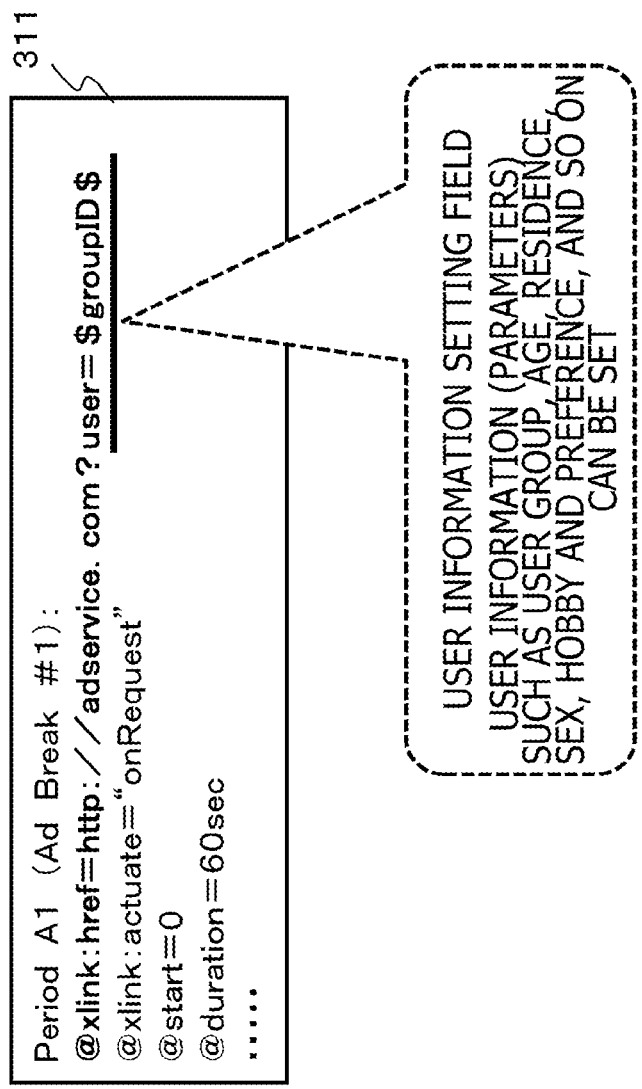
FIG. 13 is a diagram describing a configuration example of advertisement-associated period information in an MPD.

As illustrated in FIG. 13, the period information 311 for advertisements has the following description data:
Period A1 (Ad Break #1):
@xlink:href=http://adservice.com?user=$groupID$
@xlink:actuate="onRequest"
@start=0
@duration=60 sec
...

The period information 311 for advertisements contains a record of link information (xlink) that serves as access information for omitting specific data descriptions of adaptation, representation, and segmentinfo explained earlier with reference to FIGS. 10 and 12 and acquiring period information that has specific descriptions thereof.

"@xlink:href=http://adservice.com?user=$groupID$"

This information recording field is a link (xlink) information recording field.

It should be noted that "@xlink:href=" indicates that it is a URL setting field.

A process of selecting and acquiring a period element tailored to user information is carried out, for example, by an application (link resolving app) provided from the transmission apparatus based on this xlinkURL (=access information of the period element tailored to user information).

The link resolving app is executed in the application control section 110 of the reception apparatus 30.

The application control section 110 carries out a link resolution process by executing the link resolving app.

Figure 14:
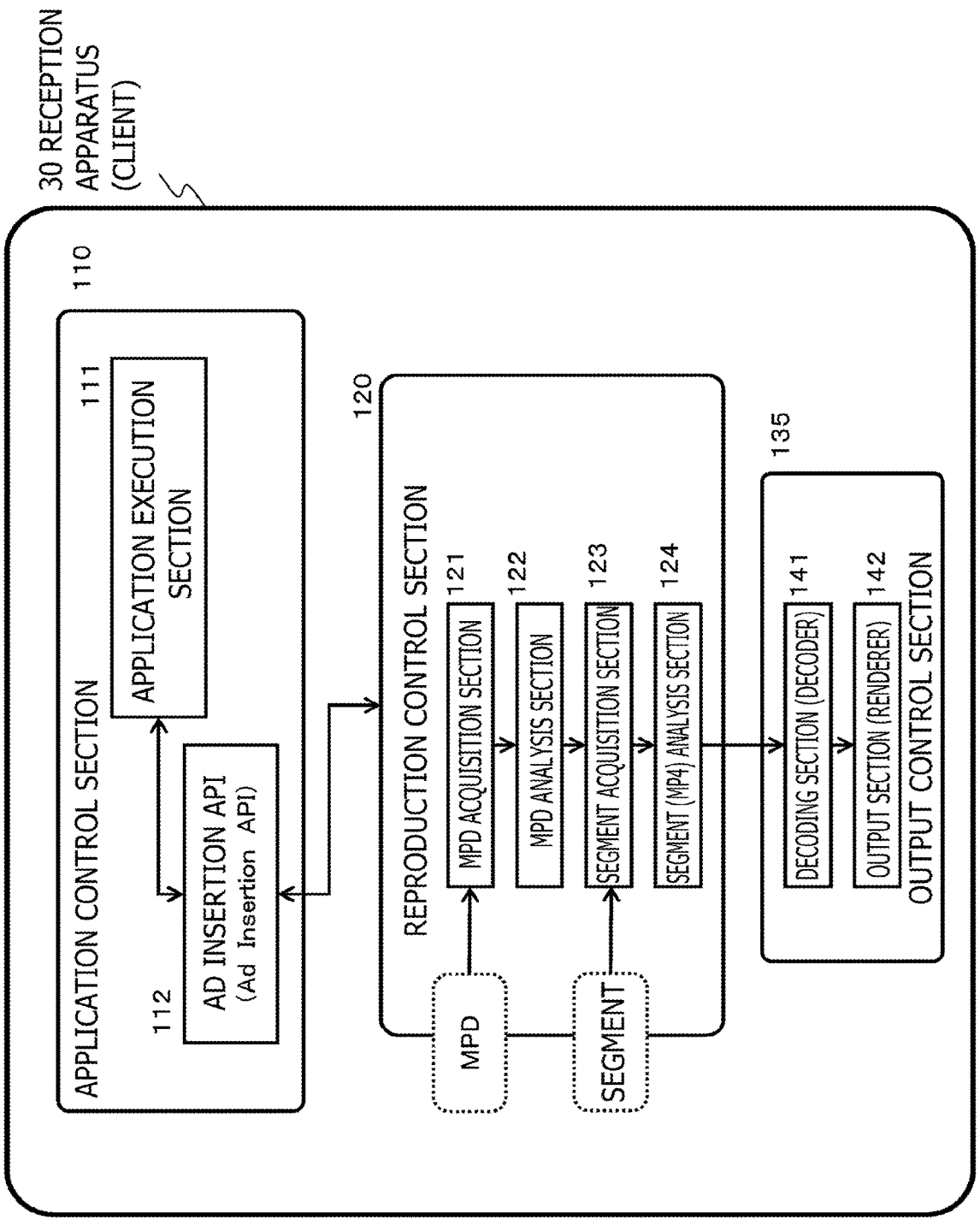
FIG. 14 is a diagram describing a processing example using an application in a reception apparatus.

A description will be given of a period element selection process tailored to user information carried out for the advertisement (Ad) output process tailored to user information with reference to FIG. 14.

The application execution section 111 of the application control section 110, for example, executes an application provided by the transmission apparatus 20 such as broadcasting station.

The application execution section 111 carries out a process that applies an API (advertisement insertion API 112) for handling a link resolution process.

That is, the application execution section 111 notifies the application that is executing Xlink URL by using the advertisement insertion API 112, and the application performs a link resolution (xlink Resolver) process for selecting advertisement content to be inserted during an advertisement insertion period from Xlink URL and user information and selects the period element tailored to that advertisement content.

Because of the process using the advertisement insertion API 112, the application execution section 111 returns, to the reproduction control section 120 of the reception apparatus 30, the period element including the URL of the advertisement segment storing the advertisement tailored to selected user information and so on.

The reproduction control section 120 of the reception apparatus 30 carries out a process of acquiring the advertisement segment using the advertisement segment URL recorded in the period element and reproduces the advertisement.

That is, during an advertisement insertion period, the period element specified by the application, i.e., advertisement content, is reproduced rather than the original period element described in the MPD.

It should be noted that the application executed in the application execution section 111 of the application control section 110 of the reception apparatus 30 controls the acquisition of various advertisement content sent from the transmission apparatus 20 such as broadcasting station and the caching process.

It should be noted that the application is started in accordance with data described in an AIT (Application Information Table), signaling data delivered by broadcasting when broadcasting is received. When broadcasting is not received such as late at night, for example, the application startup time can be scheduled in the ESG.

For example, various advertisement content tailored to user information is sent separately as an NRT (Non-Real-Time) content file from delivery of broadcasting programs.

The reception apparatus 30 acquires delivery information and access information of an NRT content file storing advertisement data based, for example, on not only an ESG (Electronic Service Guide) acquired in advance but also signaling data such as FDT and acquires advertisement data using these pieces of content.

Figure 15:
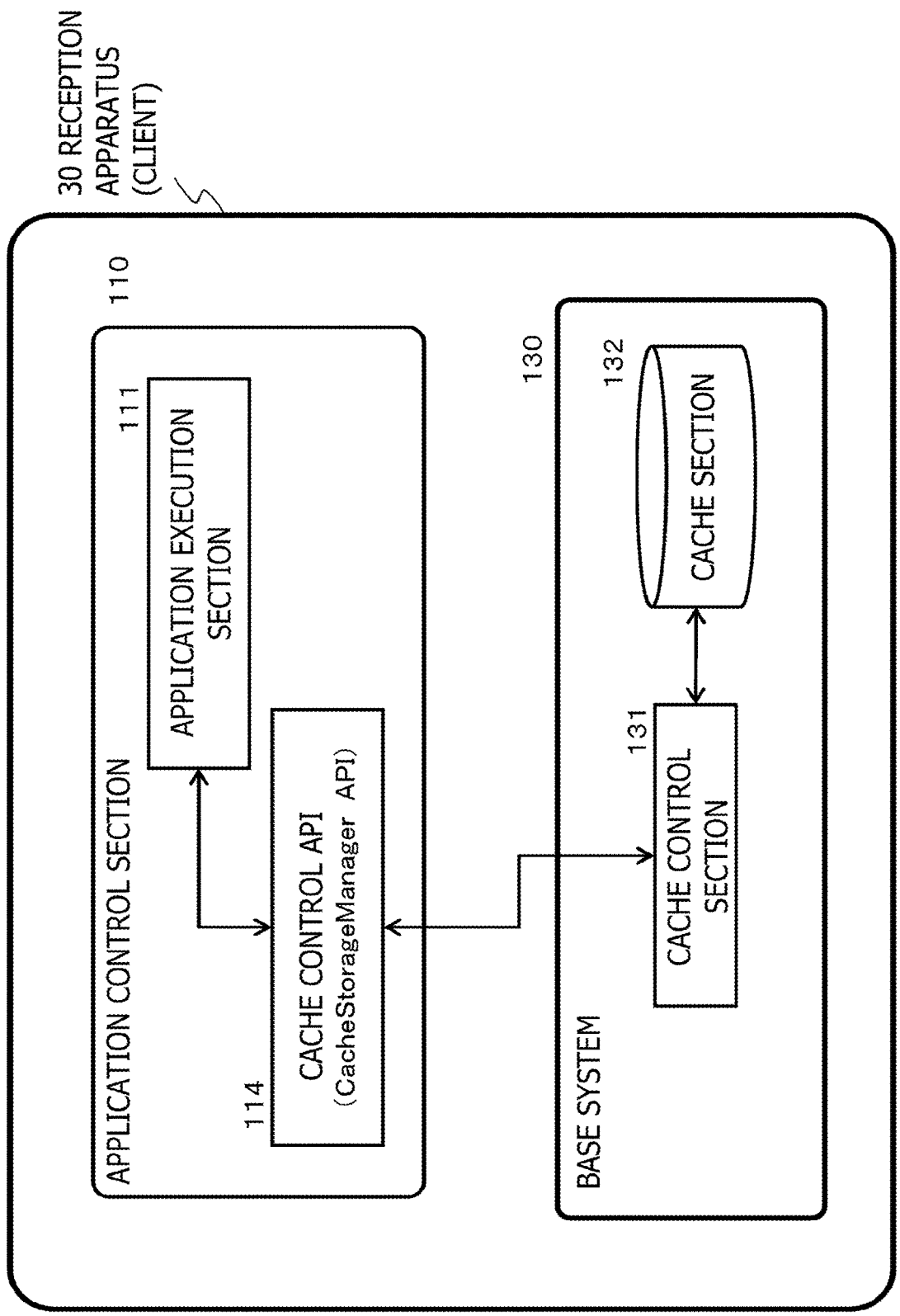
FIG. 15 is a diagram describing a processing example using an application in a reception apparatus.

A description will be given of an advertisement data acquisition process carried out by the reception apparatus 30 with reference to FIG. 15.

The application execution section 111 of the application control section 110 of the reception apparatus 30 executes, for example, an application provided from the transmission apparatus 20 such as broadcasting station.

The application executed in the application execution section 111 performs cache control that applies a cache control API (CacheStorageManager) 114 for performing advertisement data cache control.

The application executed in the application execution section 111 controls the cache control section 131 in the base system 130 of the reception apparatus 30 by applying the cache control API (CacheStorageManager) 114 and causes the cache control section 131 to acquire an advertisement data file (NRT content file) sent from the transmission apparatus 20 and to further perform a process of storing the file in the cache section 132.

A description will be given of this series of processing sequence steps, i.e., acquisition of an advertisement data file (NRT content file) sent from the transmission apparatus 20, a caching process, and further, a process of outputting the cached advertisement data, with reference to FIG. 16.

Figure 16:
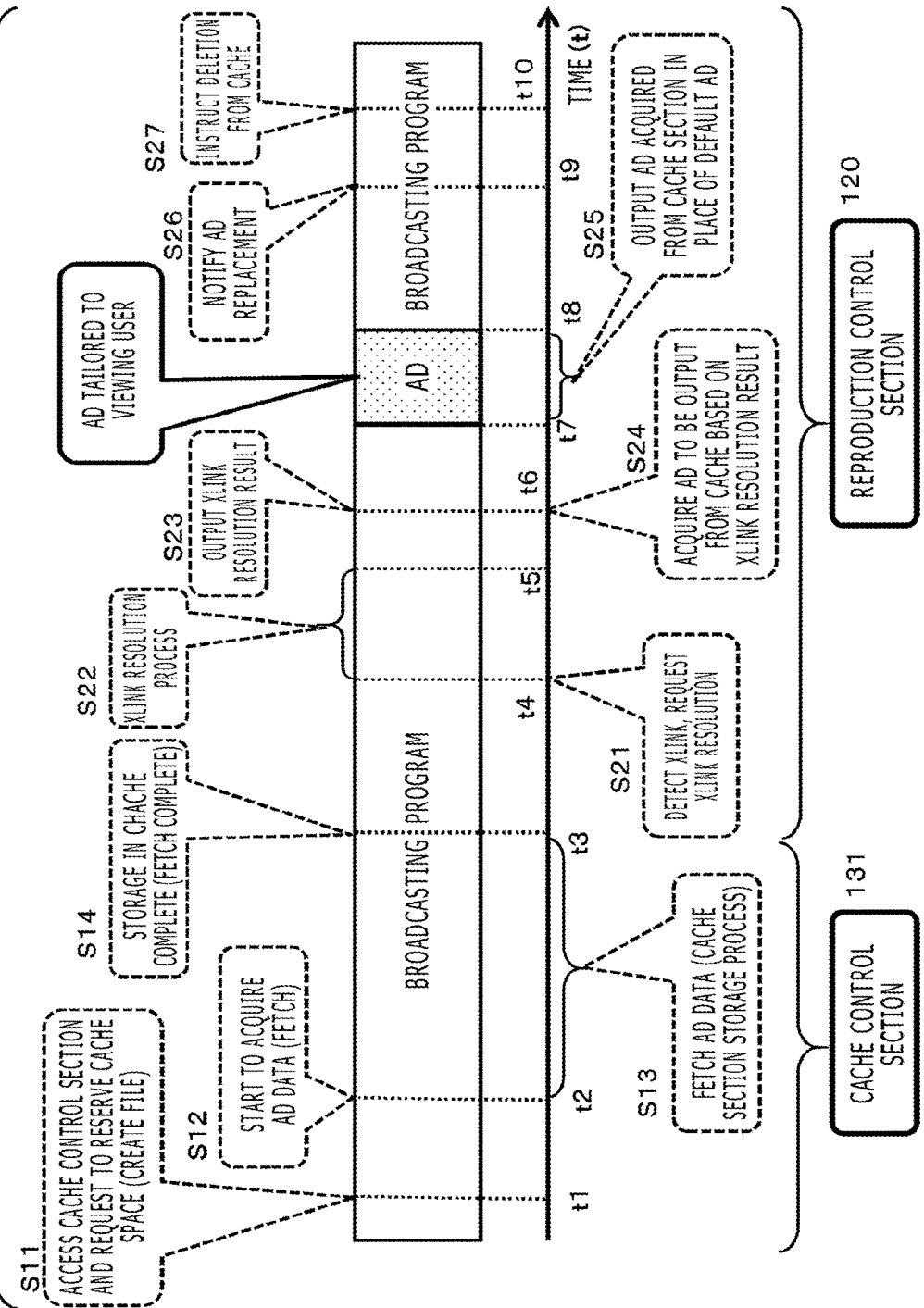
FIG. 16 is a diagram describing a processing example using an application in a reception apparatus.

FIG. 16 is a diagram describing processes that are in line with a time (t) axis from left to right.

The processes carried out by the reception process 30 are depicted as processes from step S11 to S26 at each of timings from time t1 to t9 depicted on the time axis.

The processes above the time axis depicted in FIG. 16 are those performed by the application executed in the application control section 110 of the reception apparatus 30.

On the other hand, the processes below the time axis depicted in FIG. 16 are those performed by the cache control section 131 and the reproduction control section 120 of the reception apparatus 30.

A description will be given below of the process in each step depicted in FIG. 16 sequentially.

(Step S11)

First, in step S11, the application executed in the application control section 110 accesses the cache control section 131 and makes a request to reserve a cache space for storing advertisement data (creates a file).

This process is carried out by applying the cache control API 114 described earlier with reference to FIG. 15.

(Step S12)

Next, in step S12, the application being executed by the application control section 110 instructs the cache control section to start the advertisement acquisition process by applying the cache control API 114.

This acquisition process is carried out that reception apparatus 30 refers to the ESG (Electronic Service Guide) acquired in advance. The ESG contains a record of a delivery schedule of an NRT content file that stores advertisement data and access information, and advertisement data is acquired using these pieces of data.

(Steps S13 and S14)

In step S13, the cache control section 131 performs a process (fetch) of storing advertisement data, acquired by the application, in the cache section 132.

In step S14, the caching is complete.

(Step S21)

The processes from step S21 onward are those for reading advertisement data (NRT content file) stored in the cache section 132 and outputting the data.

It should be noted that content delivered from a broadcasting station is content having an advertisement prescribed in advance (default advertisement) set between given broadcasting programs (time t7 to t8) as depicted in FIG. 16.

Therefore, unless a process is performed on the side of the reception apparatus 30 to replace the advertisement, this prescribed advertisement (default advertisement) will be output.

In the processes which will be described below, an application selects an advertisement tailored to the user selected based on user information by using link (xlink) information recorded in period information for advertisement in an MPD described earlier with reference to FIGS. 11 and 13 and issues an instruction to the reproduction control section. The reproduction control section acquires the specified advertisement content from the cache section 132, replaces the prescribed advertisement (default advertisement) with the specified content, and outputs the specified content.

In step S21, the reproduction control section 120 of the reception apparatus 30 performs the MPD analysis process and detects link (xlink) information recorded in period information for advertisement in the MPD.

The reproduction control section 120 makes a link (xlink) resolution request to the application being executed in the application control section 110 in response to the detection of the link (xlink) information recorded in the period information.

(Steps S22 and S23)

The application being executed in the application control section 110 carries out the link resolution process in response to input of a link resolution request from the reproduction control process.

This process is a process to which the advertisement insertion API 112 described earlier with reference to FIG. 14 is applied. The application control section 110 performs the link resolution (xlink Resolver) process for selecting a period element tailored to user information based on the xlink URL by applying the advertisement insertion API 112.

Specifically, the application control section 110 selects a period element tailored to user information and returns, to the reproduction control section 120 of the reception apparatus 30, the period element including the URL of the advertisement segment storing the advertisement tailored to selected user information and so on.
(Steps S24 and S25)

Next, in step S24, the reproduction control section 120 of the reception apparatus 30 carries out a process of acquiring the advertisement segment from the cache section 132 using the advertisement segment URL recorded in the period element and reproduces the advertisement in step S25.

That is, from time t7 to t8, the reproduction control section 120 performs a process of replacing the prescribed advertisement (default advertisement), scheduled to be reproduced without a pause after a broadcasting program, with the content acquired from the cache section and reproducing the content.

As a result of this process, the advertisement selected in accordance with user information is reproduced.
(Step S26)

When the advertisement reproduction is complete, the reproduction control section 120 notifies the application that the specified advertisement content has reproduced by applying the advertisement insertion API 112 of the application control section 110.
(Step S27)

The application instructs the cache control section to delete the advertisement content file by applying the advertisement insertion API 112, and the cache control section 131 performs a process of deleting the specified file.

Thus, the reception apparatus 30 carries out various advertisement content acquisition, selection, and reproduction processes under control of the application executed in the application control section 110.

[8. Configuration for Controlling the Delivery Order of Advertisement Content]

A description will be given next of a configuration for controlling the delivery order of advertisement content.

As can be understood from the above description, the transmission apparatus 20 such as broadcasting station provides, to the reception apparatus 30, a number of different pieces of advertisement content as advertisements that can be output during each advertisement reproduction time.

The reception apparatus 30 selects one advertisement from among a number of pieces of advertisement content sent from the transmission apparatus 20 and reproduces the advertisement.

That is, of the plurality of pieces of advertisement content provided by the transmission apparatus 20, only one piece of the advertisement content is reproduced by the reception apparatus.

The advertisement selection process in the reception apparatus 30 is required to be performed before the advertisement reproduction time.

Before a preset advertisement output time, the reception apparatus 30 carries out a process of storing, in the cache section 132, a plurality of advertisements for that advertisement reproduction time, selects a piece of content to be reproduced, and outputs the content.

However, the plurality of pieces of content stored in the cache section include those that are highly likely to be selected by a number of users (viewers) and those that are unlikely to be selected by a number of users.

For example, when a program with a set advertisement is baseball relay broadcasting, it is probable that the viewers of the program will likely be male baseball fans. As advertisements for such a program, the following plurality of different pieces of advertisement content are sent:
(Advertisement 1) Advertisement content 1 for children
(Advertisement 2) Advertisement content 2 for adult males
(Advertisement 3) Advertisement content 3 for females When advertisement content targeted for different user groups is sent, it is probable that "(advertisement 2) advertisement content 2 for adult males" will be likely selected by the reception apparatus 30.

Thus, if it is assumed in advance that one advertisement is highly likely to be selected in a broadcast region and another is unlikely to be selected in the region, control is performed to ensure a higher likelihood for acquisition by reception apparatuses and a higher audience rating by controlling the delivery order of the plurality of these pieces of advertisement content.

A description will be given of a configuration for controlling the delivery order of advertisement content with reference to FIG. 17. FIG. 17 depicts the following diagrams:
(a) Advertisement-by-advertisement user viewing distribution estimation data
(b) Transmission order of advertisements and example of delivery priority information (Delivery Priority) setting (a) Advertisement-by-advertisement user viewing distribution estimation data is data held by the transmission apparatus 20 such as broadcasting station that delivers advertisements. For example, this data is a result of analysis based on past advertisement viewing history data and so on.

(b) Transmission order of advertisements and example of delivery priority information (Delivery Priority) setting depict an example of advertisement delivery in accordance with the transmission order of advertisements set based on (a) advertisement-by-advertisement user viewing distribution estimation data.

The following data sent by the transmission apparatus 20 is depicted in (b):
(b1) Broadcasting AV segment
(b2) NRT content file When the reproduction process is performed using (b1) Broadcasting AV segment sent by the transmission apparatus 20, the reception apparatus outputs a broadcasting program and advertisement 1 (Ad1) as an advertisement prescribed in advance.

The (b2) NRT content file sent by the transmission apparatus 2 depicts an example of delivery of an advertisement content file (NRT content file) that can replace advertisement 1, the prescribed advertisement (default advertisement), during an advertisement reproduction time from time ta to tb.

The reception apparatus 30 can store advertisements 2 (Ad2) to 4 (Ad4), sent as a (b2) NRT content file, in the cache section, select one of these advertisements, replace advertisement 1 (Ad1) with the selected advertisement, and output the selected advertisement.

As illustrated in (a) Advertisement-by-advertisement user viewing distribution estimation data, advertisement-by-advertisement viewing estimation data is set up as follows:

Advertisement 1 (Ad1)=55%
Advertisement 2 (Ad2)=25°
Advertisement 3 (Ad3)=15%

This is viewing ratio estimation data for four kinds of advertisement content (Ad1 to Ad4) that can be selected and output from time ta to tb during a program reproduced based on the broadcasting AV segment depicted in FIG. 17 (b1).

That is, this is data that depicts the distribution of viewing ratios of the respective advertisements, i.e., advertisement 1 (Ad1) to advertisement 4 (Ad4), assuming that the total number of users viewing an advertisement from time ta to tb is 100%.

When the broadcasting station acquires this viewing estimation data in advance, we assume that the prescribed advertisement (default advertisement) delivered together with the program is the advertisement most likely to be viewed (advertisement 1 (Ad1)).

Further, we assume that the advertisement next likely to be viewed (advertisement 2 (Ad2)) is set up to be sent immediately prior to the advertisement reproduction time ta.

For example, advertisement 2 (Ad2) is sent from the transmission apparatus 20 to the reception apparatus 30 from time t3 to t4.

Still further, we assume that the advertisement next likely to be viewed (advertisement 33 (Ad3)) is set up to be sent prior to the delivery of advertisement 2 (Ad2).

For example, advertisement 2 (Ad2) is sent from the transmission apparatus 20 to the reception apparatus 30 from time t2 to t3.

Still further, we assume that the advertisement next likely to be viewed (advertisement 4 (Ad4)) is set up to be sent prior to the delivery of advertisement 3 (Ad3).

For example, advertisement 3 (Ad3) is sent from the transmission apparatus 20 to the reception apparatus 30 from time t1 to t2.

Thus, an advertisement highly likely to be viewed is arranged to be sent at the time (t3) closest to the advertisement reproduction start time (ta). The advertisement least likely to be viewed begins to be sent at the time (t1) farthest from the advertisement reproduction start time (ta).

The broadcasting segment depicted in FIG. 17 (b1) is a program delivered from a broadcasting station, and it is data that is not received unless the reception apparatus 30 is tuned to that broadcasting station (unless the reception apparatus 30 is set to the channel of the broadcasting station).

The NTT content file depicted in FIG. 17 (b2) is also data that can be received only by the reception apparatuses 30 that are tuned to that broadcasting station (that are set to the channel of that broadcasting station).

The reception apparatus 30 are turned ON or OFF at arbitrary timings and switched to a different channel at arbitrary timings by the users (viewers).

The users (viewers) who view any of advertisement 1 (Ad1) to advertisement 4 (Ad4) are those whose reception apparatuses 30 are ON and which are set to the channel that delivers this advertisement.

For example, we assume that the channel that delivers the data depicted in FIG. 17(*b*) is channel A.

The users of the reception apparatuses 30 set the reception apparatuses 30 to channel A at a variety of timings.

Figure 18:
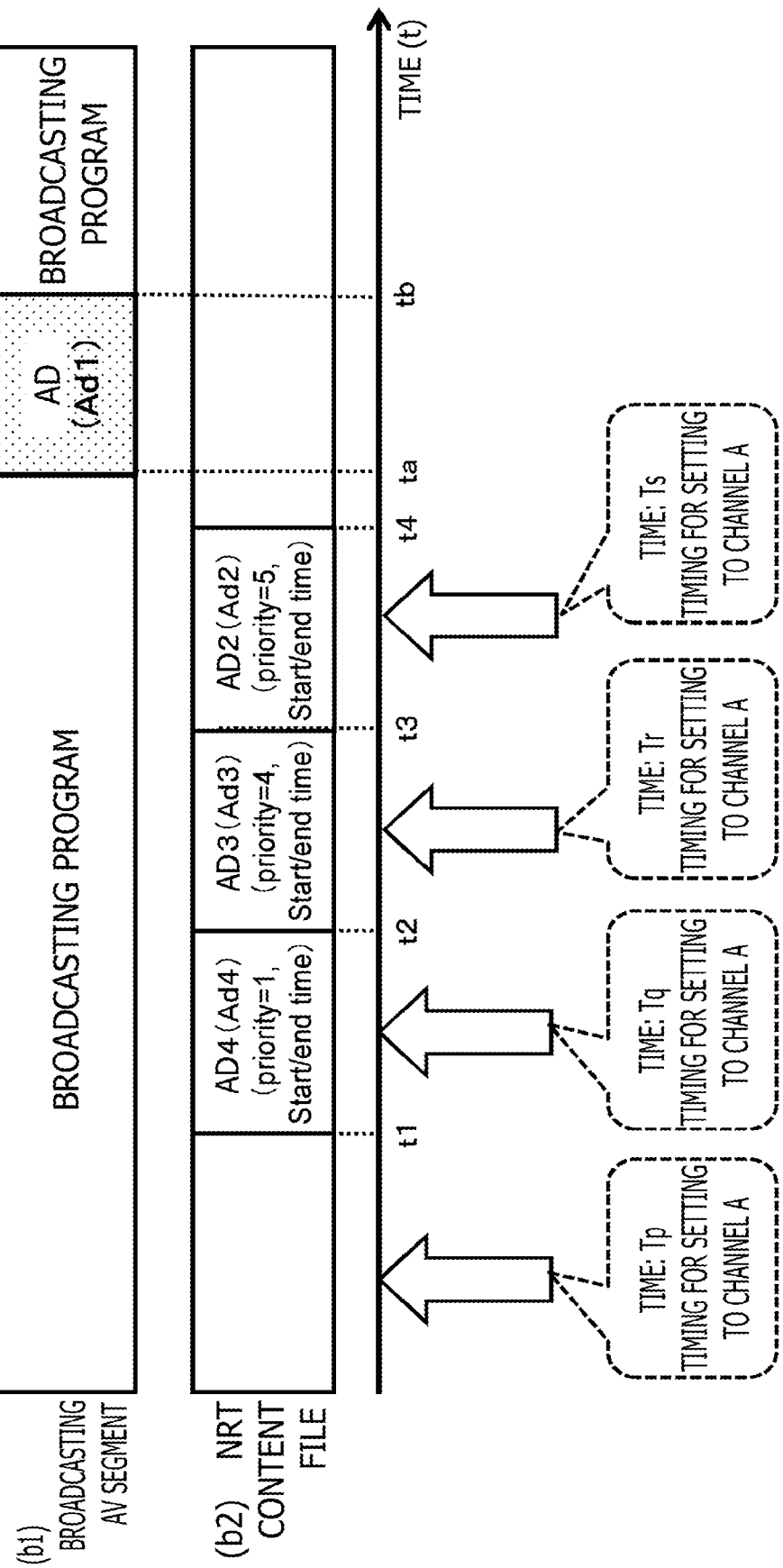
FIG. 18 is a diagram describing an example of setting a delivery order of a plurality of advertisements and advertisements that can be reproduced.

FIG. 18 illustrates a plurality of examples of timings for channel setting in the reception apparatus 30.

For example, when the reception apparatus 30 is set to channel A at time Tp, the reception apparatus 30 can acquire all three pieces of advertisement content (advertisements 2 to 4) sent from the transmission apparatus 20 as an NRT content file, store them in the cache section, select one of the three pieces of advertisement content, and output the content.

Also, when the reception apparatus 30 is set to channel A at time Tq, the reception apparatus 30 cannot acquire advertisement 4 (Ad4) of the three pieces of advertisement content (advertisements 2 to 4) sent from the transmission apparatus 20 as an NRT content file, and as a result, can acquire only advertisements 2 and 3, store them in the cache section, select one of the two pieces of advertisement content, and output the content.

Also, when the reception apparatus 30 is set to channel A at time Tr, the reception apparatus 30 cannot acquire advertisement 3 (Ad3) and advertisement 4 (Ad4) of the three pieces of advertisement content (advertisements 2 to 4) sent from the transmission apparatus 20 as an NRT content file, and as a result, can acquire only advertisement 2, store it in the cache section, select advertisement 2 (Ad2), and output the content.

Also, when the reception apparatus 30 is set to channel A at time Ts, the reception apparatus 30 cannot acquire any of the three pieces of advertisement content (advertisements 2 to 4) sent from the transmission apparatus 20 as an NRT content file. In this case, the reception apparatus 30 can reproduction only the prescribed advertisement (Ad1) sent together with the broadcasting program.

It should be noted that even when the reception apparatus 30 is set to channel A from time Tp to Ts, but if the reception apparatus 30 is switched to other channel prior to the advertisement reproduction start time ta, none of advertisements 1 to 4 will be viewed.

In order to view one of advertisements 1 to 4, it is necessary for the reception apparatus 30 to be set to channel A at the advertisement output time ta.

The advertisements that can be output by the reception apparatus 30 at the advertisement output time ta are set up as follows in accordance with the time when the reception apparatus 30 is set to channel A:

(1) Time for setting to channel A=Before Tp to ta: Advertisement 1 (Ad1) to advertisement 4 (Ad4)
(2) Time for setting to channel A=Tq to ta: Advertisement 1 (Ad1) to advertisement 3 (Ad3)
(3) Time for setting to channel A=Tr to ta: Advertisement 1 (Ad1) and advertisement 2 (Ad2)
(4) Time for setting to channel A=Ts to ta: Advertisement 1 (Ad1)

That is, the channel setting times that allow reproduction of each of the advertisements are as follows:
(1) Advertisement 1 (Ad1)=Tp, Tq, Tr, Ts
(2) Advertisement 2 (Ad2)=Tp, Tq, Tr
(3) Advertisement 3 (Ad3)=Tp, Tq
(4) Advertisement 4 (Ad4)=Tp As a result, advertisement 1 (Ad1) is most likely to be reproduced, and advertisement 4 (Ad4) is least likely to be reproduced.

It can be concluded, from the result of this examination, that when advertisements that can replace the prescribed advertisement (default advertisement (Ad1)) are sent as an NRT content file, the likelihood of reception and reproduction by the reception apparatus 30 can be increased by sending the advertisements immediately before the reproduction start time ta.

That is, it is possible to increase the likelihood for user selection on the reception apparatus 30 and reception and reproduction of advertisements selected in accordance with user information by setting a transmission order such that advertisement content more likely to be viewed is sent immediately prior to the advertisement reproduction start time (ta) and advertisement content unlikely to be viewed is sent before that.

The transmission apparatus 20 sets the order of sending advertisement content sent as an NRT content file based on this examination result and sends the content.

Figure 19:
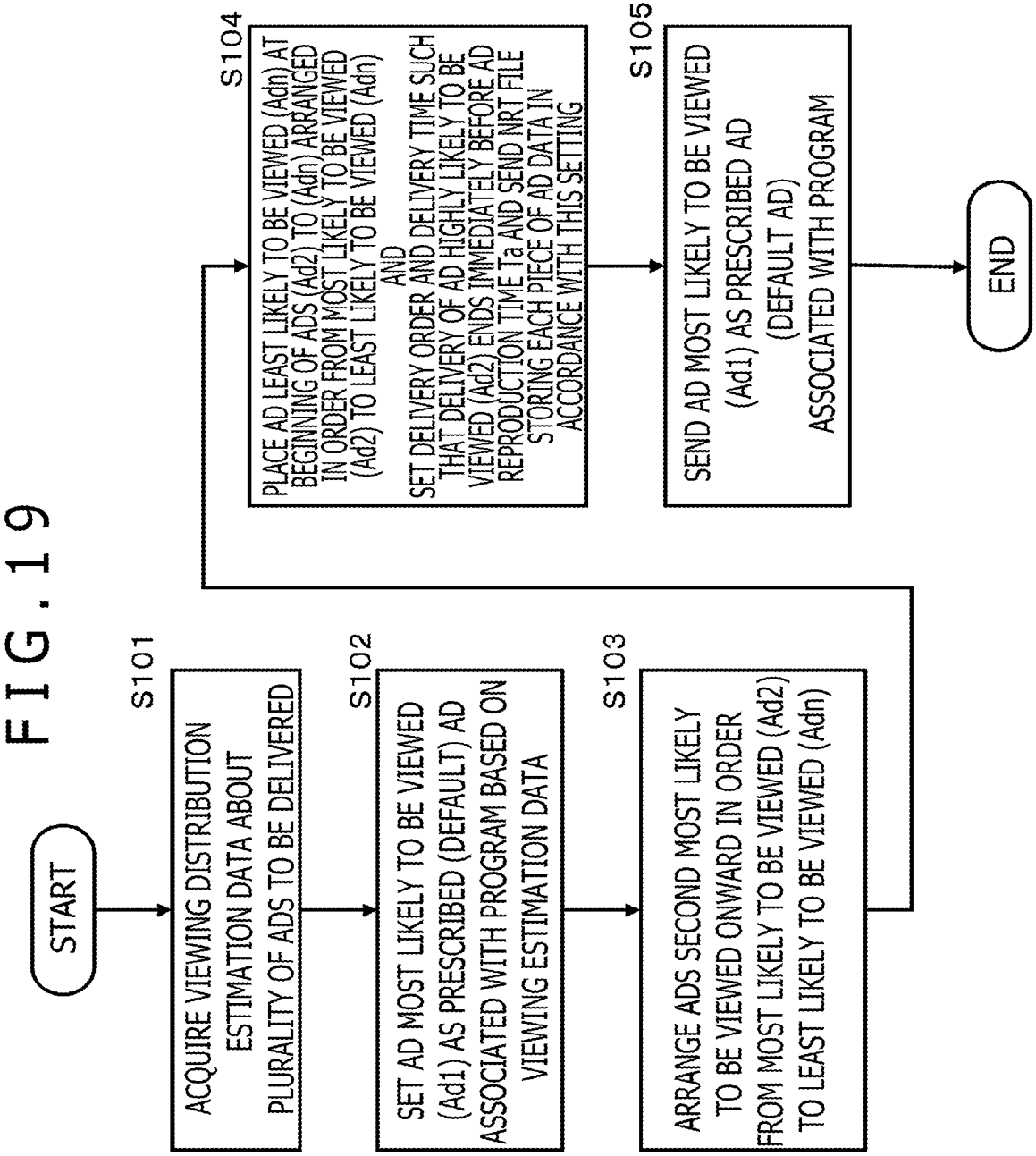
FIG. 19 is a diagram illustrating a flowchart describing a processing sequence carried out by a transmission apparatus.

A description will be given of the sequence for controlling the delivery of advertisement content carried out by the transmission apparatus 20 with reference to the flowchart depicted in FIG. 19.

(Step S101)

First in step S101, the data processing section of the transmission apparatus acquires viewing distribution estimation data about a plurality of advertisements to be delivered.

That is, it is advertisement-by-advertisement user viewing distribution estimation data as depicted in FIG. 17(a). For example, advertisement-by-advertisement viewing estimation data has the following settings:

Advertisement 1 (Ad1)=55%
Advertisement 2 (Ad2)=25%
Advertisement 3 (Ad3)=15%
Advertisement 4 (Ad4)=5%

This is viewing ratio estimation data for four kinds of advertisement content (Ad1 to Ad4) that can be selected and output from time ta to tb during a program reproduced based on the broadcasting AV segment depicted in FIG. 17 (b1).

That is, this is data that depicts the distribution of viewing ratios of the respective advertisements, i.e., advertisement 1 (Ad1) to advertisement 4 (Ad4), assuming that the total number of users viewing an advertisement from time ta to tb is 100%.

(Step S102)

Next, in step S102, the transmission apparatus sets the advertisement most likely to be viewed (Ad1) as a prescribed advertisement (default advertisement) that comes with the program.

(Step S103)

Next, in step S103, the transmission apparatus arranges the advertisements second and less likely to be viewed (Ad2) to (Adn) in order from high likelihood for viewing based on viewing estimation data.

(Step S104)

Next, in step S104, the transmission apparatus determines a delivery order and a delivery time such that, of the advertisements (Ad2) to (Adn) arranged in order from high likelihood for viewing, the advertisement (Adn) least likely to be viewed is to be sent first and that the delivery of the advertisement (Ad2) highly likely to be viewed is complete immediately prior to the advertisement reproduction time ta, and sends the NRT content file storing each piece of advertisement data in accordance with the determined delivery order and delivery time.

(Step S105)

Next, in step S105, the transmission apparatus sends the advertisement most likely to be viewed (Ad1) as a prescribed advertisement (default advertisement) that comes with the program.

Thus, the transmission apparatus 20 determines the transmission order of advertisements based, for example, on advertisement-by-advertisement user viewing distribution estimation data depicted in FIG. 17 and sends advertisements. That is, the transmission apparatus 20 carries out a transmission order determination process that arranges the transmission time of content highly likely to be viewed closest to the content output time and arranges the transmission time of content unlikely to be viewed before the transmission time of content highly likely to be viewed.

For example, the advertisement-by-advertisement user viewing distribution estimation data depicted in FIG. 17 may be updated successively. For example, the transmission apparatus 20 may be configured to carry out a process of acquiring audience rating information of advertisement content that has output previously, updating the advertisement-by-advertisement user viewing distribution estimation data depicted in FIG. 17 successively based on the acquired audience rating information, and determining the delivery order using the updated data.

The audience rating of an advertisement that has output earlier is accomplished as the reception apparatus or the application executed in the application control section notifies the broadcasting station of the advertisement output result using a communication circuit such as the Internet.

Figure 20:
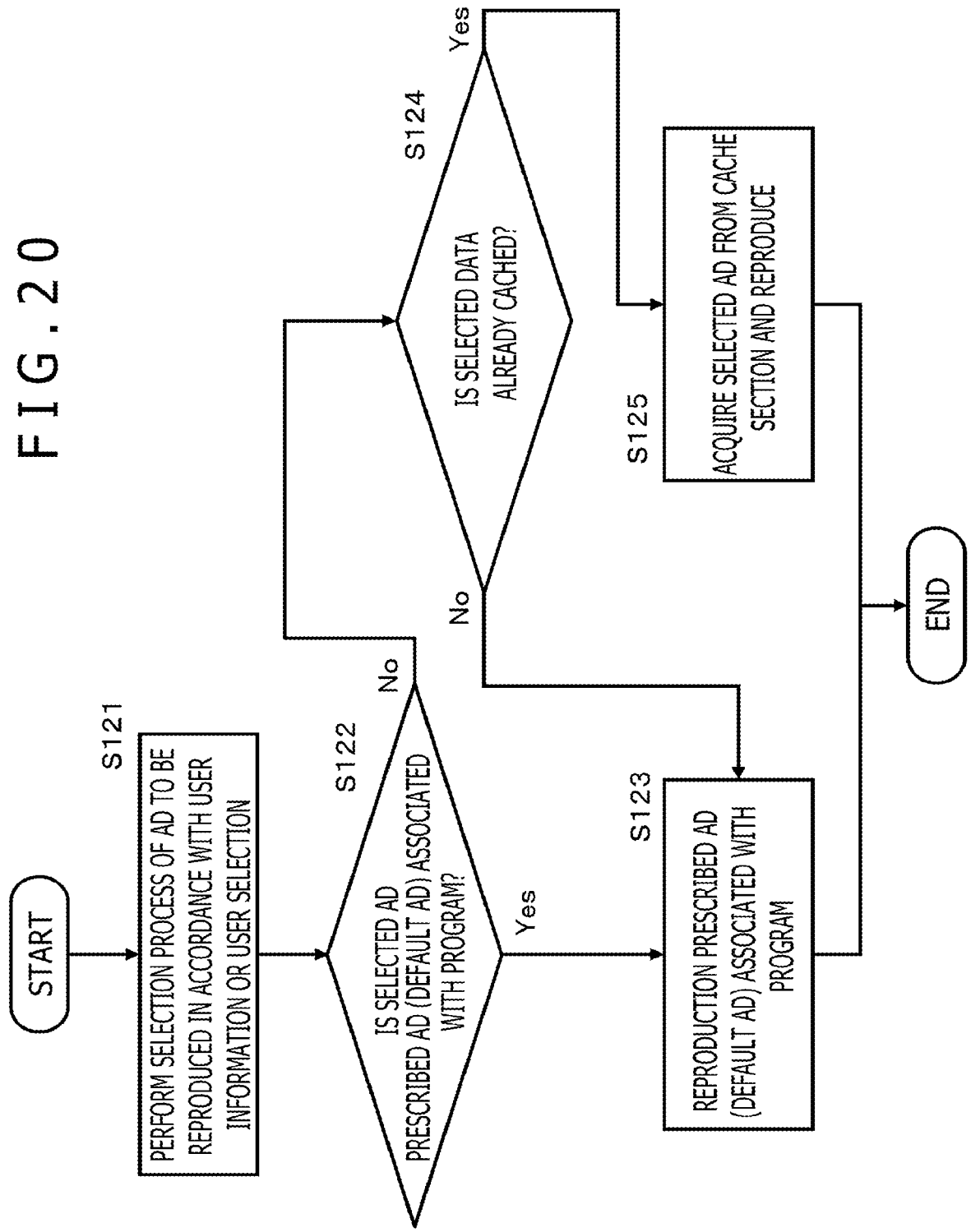
FIG. 20 is a diagram illustrating a flowchart describing a processing sequence carried out by a reception apparatus.

A description will be given next of an example of a processing sequence carried out by the reception apparatus 30 with reference to the flowchart depicted in FIG. 20.

(Step S121)

First, in step S121, the data processing section of the reception apparatus carries out a process of selecting an advertisement to be reproduced in accordance with user information or user selection.

This is an advertisement selection process based on link information (xlink) having user information set therein described earlier with reference to FIG. 13 and so on or an advertisement selection process based on user input to the reception apparatus.

(Step S122)

Next, in step S122, the reception apparatus decides whether the selected advertisement is the prescribed advertisement (default advertisement) that comes with the program.

When the selected advertisement is the prescribed advertisement (default advertisement) that comes with the program, the reception apparatus proceeds to step S123.

When the selected advertisement is not the prescribed advertisement (default advertisement) that comes with the program, the reception apparatus proceeds to step S124.

(Step S123)

When the selected advertisement is the prescribed advertisement (default advertisement) that comes with the program, the reception apparatus reproduces the prescribed advertisement (default advertisement) that comes with the program.

(Step S124)

On the other hand, when the selected advertisement is not the prescribed advertisement (default advertisement) that comes with the program, the reception apparatus proceeds to step S124 and further confirms whether the selected advertisement has already been cached.

When the selected advertisement has already been cached, the reception apparatus proceeds to step S125.

On the other hand, when the selected advertisement has yet to be cached, the reception apparatus proceeds to step S123 and reproduces the prescribed advertisement (default advertisement) that comes with the program.

(Step S125)

When the selected advertisement has already been cached in step S124, the reception apparatus proceeds to step S125 and acquires the selected advertisement from the cache section and reproduces the advertisement in step S125.

[9. Processing Example Based on Delivery Priority Information (Delivery Priority)]

A priority can be specified, as a decision criterion to decide whether reception and caching is necessary on each of the reception apparatuses 30, for each piece of advertisement content sent from the transmission apparatus 20 as NRT content for a replacement process.

This priority is called delivery priority information (Delivery Priority).

Delivery priority information (Delivery Priority) can be specified for advertisement content itself to be sent as an NRT content file and can also be recorded in data (e.g., signaling data such as FDT, and ESG) to be sent before the delivery of advertisement content and provided to the reception apparatus in advance.

A description will be given below of a processing example using this delivery priority information (Delivery Priority).

Figure 21:
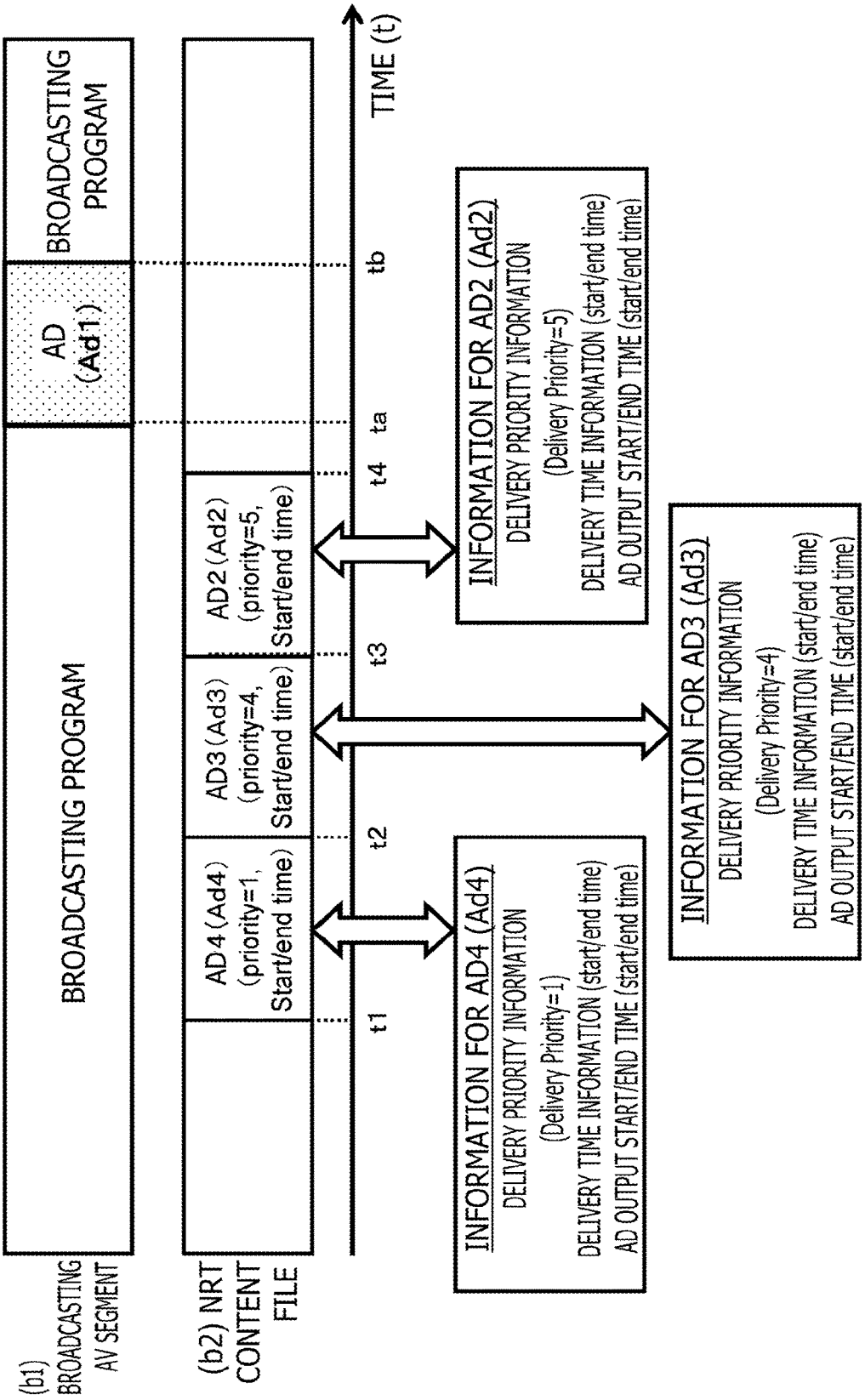
FIG. 21 is a diagram describing an example of specifying delivery priority information (Delivery Priority) in advertisement content to be sent by a transmission apparatus.

FIG. 21 illustrates an example of recorded data of information (e.g., signaling data such as FDT and ESG) linked to each piece of advertisement content (Ad2 to Ad4) to be replaced as an NRT content file to be sent by the transmission apparatus 20 for replacement.

The following attribute data about each advertisement is recorded in information linked to each piece of advertisement content (Ad2 to Ad4):
(a) Delivery priority information (Delivery Priority)
(b) Delivery time information (start/end time)
(c) Advertisement output start/end time (start/end time)

(a) Delivery priority information (Delivery Priority) is a priority that serves as a decision criterion to decide whether reception and caching is necessary on each of the reception apparatuses 30, for each advertisement, and this information can be specified freely on the side of the transmission apparatus 20.

In the example depicted in the figure, the following priority information is specified:
Delivery priority information of advertisement 2 (Ad2)=5
Delivery priority information of advertisement 3 (Ad3)=4
Delivery priority information of advertisement 4 (Ad4)=1

As a result, advertisement 2 (Ad2) has the highest delivery priority information setting.

For example, the reception apparatus 30 can, by using a prescribed value prescribed in advance in the reception apparatus 30 that serves as a decision criterion, perform a process of preferentially selecting and receiving advertisement data with a delivery priority setting equal to or larger than the prescribed value and caching the received data.

The transmission apparatus 20 specifies delivery priority information (Delivery Priority) for each of a plurality of pieces of advertisement content to be sent to the reception apparatus 30 and sends the delivery priority information (Delivery Priority) to the reception apparatus 30.

It should be noted that delivery priority information (Delivery Priority) is specified, for example, such that it is proportional to the likelihood for viewing.

(b) Delivery time information (start/end time) is information regarding advertisement delivery time, and delivery start time and delivery end time are recorded.

(c) Advertisement output start/end time (start/end time) is a recording area of output start time and output end time of that advertisement on the reception apparatus.

It should be noted that an example of recording signaling information such as FDT and ESG will be described later.

Figure 22:
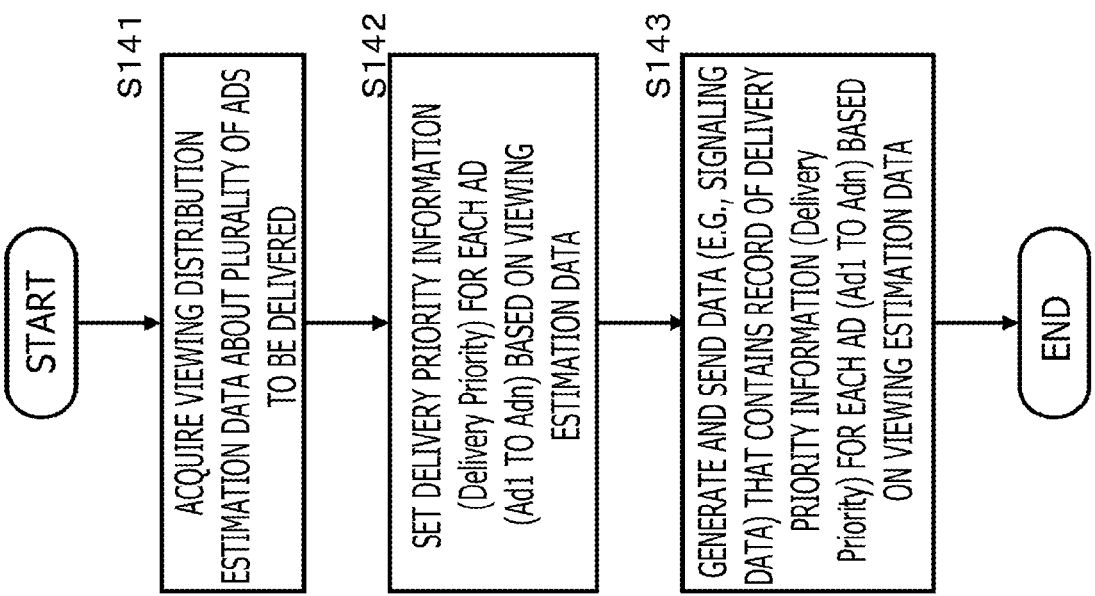
FIG. 22 is a diagram illustrating a flowchart describing a processing sequence carried out by a transmission apparatus that performs a delivery priority information (Delivery Priority) transmission process.

A description will be given of a sequence for generating and sending delivery priority information (Delivery Priority) for advertisements performed by the transmission apparatus 20 with reference to the flowchart depicted in FIG. 22.
(Step S141)

First, in step S141, the data processing section of the transmission apparatus acquires viewing distribution estimation data about a plurality of advertisements to be delivered.

That is, it is advertisement-by-advertisement user viewing distribution estimation data as depicted in FIG. 17(a). For example, advertisement-by-advertisement viewing estimation data has the following settings:
Advertisement 1 (Ad1)=55°
Advertisement 2 (Ad2)=25%
Advertisement 3 (Ad3)=15%
Advertisement 4 (Ad4)=5%

This is viewing ratio estimation data for four kinds of advertisement content (Ad1 to Ad4) that can be selected and output from time ta to tb during a program reproduced based on the broadcasting AV segment depicted in FIG. 17 (b1).

That is, this is data that depicts the distribution of viewing ratios of the respective advertisements, i.e., advertisement 1 (Ad1) to advertisement 4 (Ad4), assuming that the total number of users viewing an advertisement from time ta to tb is 100%.
(Step S142)

Next, in step S142, the transmission apparatus specifies delivery priority information (Delivery Priority) for each of the advertisements (Ad1 to Adn) based on the viewing estimation data.

For example, the following priority information described with reference to FIG. 21 is specified:
Delivery priority information of advertisement 2 (Ad2)=5
Delivery priority information of advertisement 3 (Ad3)=4
Delivery priority information of advertisement 4 (Ad4)=1
(Step S143)

Next, in step S143, the transmission apparatus generates data such as signaling data that contains a record of delivery priority information (Delivery Priority) for each of the advertisements (Ad1 to Adn) based on the viewing estimation data and sends the data.

It should be noted that signaling data and so on generated here contains a record of not only delivery priority information (Delivery Priority) but also various other information linked to advertisements. At least, the following pieces of data are recorded as described earlier with reference to FIG. 21:
(a) Delivery priority information (Delivery Priority)
(b) Delivery time information (start/end time)
(c) Advertisement output start/end time (start/end time)

Figure 23:
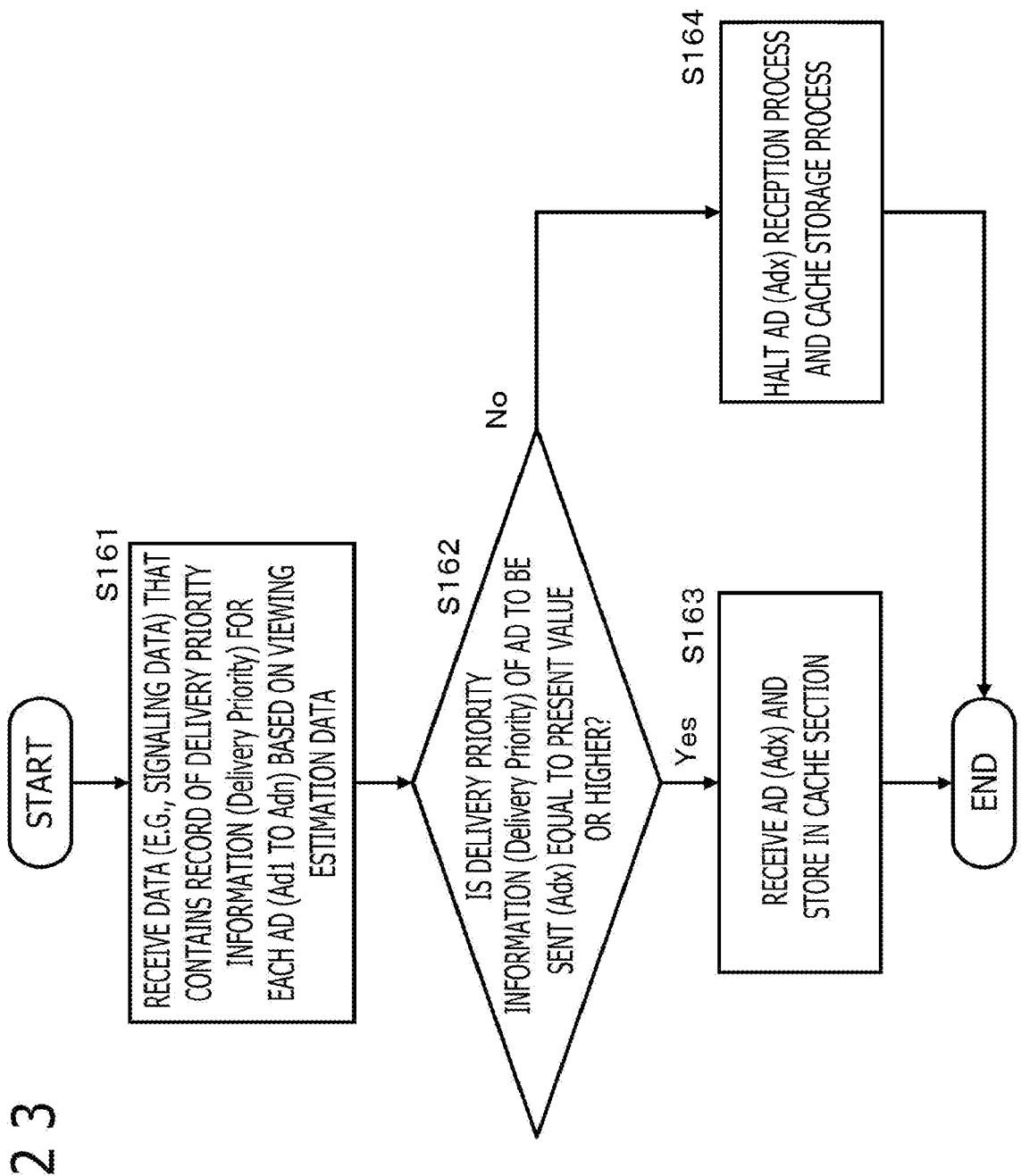
FIG. 23 is a diagram illustrating a flowchart describing a processing sequence carried out by a reception apparatus that performs a delivery priority information (Delivery Priority) reception process.

A description will be given next of an example of a processing sequence based on delivery priority information (Delivery Priority) performed by the reception apparatus 30 with reference to the flowchart depicted in FIG. 23.
(Step S161)

First, in step S161, the data processing section of the reception apparatus receives data such as signaling data that contains a record of delivery priority information (Delivery Priority) for each of the advertisements (Ad1 to Adn) based on the viewing estimation data.

It should be noted that the received signaling data contains a record of the following pieces of data as described earlier with reference to FIG. 21:
(a) Delivery priority information (Delivery Priority)
(b) Delivery time information (start/end time)
(c) Advertisement output start/end time (start/end time)
(Step S162)

Next, in step S162, the reception apparatus confirms the delivery priority information (Delivery Priority) setting for each of the advertisements (Adx) sent from the transmission apparatus and decides whether the delivery priority information (Delivery Priority) is equal to or larger than the preset prescribed value.

When the delivery priority information (Delivery Priority) of the sent advertisement (Adx) is equal to or larger than the preset prescribed value, the reception apparatus proceeds to step S163.

When the delivery priority information (Delivery Priority) of the sent advertisement (Adx) is not equal to or larger than the preset prescribed value, the reception apparatus proceeds to step S164.
(Step S163)

When the delivery priority information (Delivery Priority) of the sent advertisement (Adx) is equal to or larger than the preset prescribed value, the reception apparatus proceeds to step S163 and performs a process of receiving the sent advertisement (Adx) and storing it in the cache section.
(Step S164)

On the other hand, when the delivery priority information (Delivery Priority) of the sent advertisement (Adx) is not equal to or larger than the preset prescribed value, the reception apparatus proceeds to step S164 and halts the process of receiving the sent advertisement (Adx) and storing the advertisement in the cache section.

Thus, the reception apparatus decides whether a caching process is required based on delivery priority information (Delivery Priority) for each of the advertisements, making it possible to store advertisements with high priorities in the cache section and reproduction these advertisements.

As a result, although the application normally controls whether to store delivered NRT content in the cache, the cache control section or the data processing section of the reception apparatus that controls the cache control section can decide whether to perform caching based on delivery priority information (Delivery Priority) even in the absence of a request from the application.

[10. Processes to Which Service Selection Priority Information (Service Selection Priority) Is Applied]

A description will be given next of processes when there is a conflict between deliveries of advertisements from a plurality of different channels.

Specifically, a description will be given of the processes to which service selection priority information (Service Selection Priority) is applied.

There are a number of broadcasting stations that deliver advertisements, and the plurality of transmission apparatuses 20 of each of the broadcasting stations and so on deliver a variety of advertisements at a variety of times.

When the user of the reception apparatus 30 is viewing the specific broadcasting station 20 (when the reception apparatus 30 is tuned to the specific broadcasting station 20), the reception apparatus 30 receives the program content of the selected channel and NRT content that comes with the program such as an NRT content file that stores advertisement content for replacement.

However, there is a case in which the transmission apparatus 20 sends a variety of data files while the reception apparatus 30 is not receiving the broadcasting of a specific channel such as while the reception apparatus is set to standby mode late at night.

The reception apparatus 30 can find out about the delivery schedule of various pieces of content based on signaling data such as ESG (Electronic Service Guide) that has already been received and can receive data delivered late at night and so on and store the data in the cache section.

For example, ESG and signaling data such as FDT contain a record of access information and delivery timing information of data to be delivered, and the reception apparatus 30 can, in standby mode, automatically perform tuning (channel setting) to receive delivered data and store the data in the cache section.

However, if, for example, different pieces of data such as different advertisements, e.g., advertisement 1 (Ad1) and advertisement 2 (Ad2), are sent from different broadcasting stations at the same time, the reception apparatus 30 can perform a process of receiving only one of the advertisements.

That is, if such a conflict occurs between pieces of data delivered, it is necessary for the reception apparatus 30 to perform a process of selecting data to be received in accordance with an algorithm of some kind.

Figure 24:
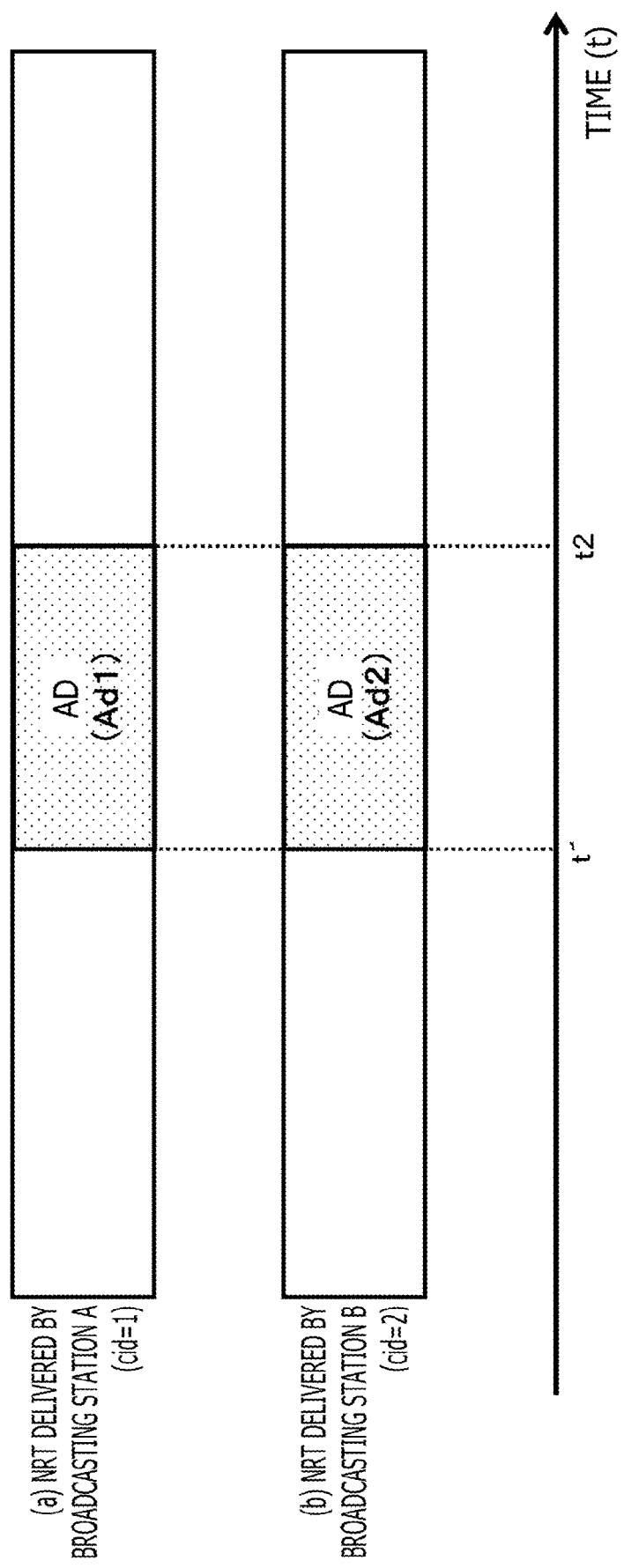
FIG. 24 is a diagram describing an example in which delivery times of advertisement content sent via different channels overlap.

FIG. 24 illustrates a transmission sequence for sending different advertisements, e.g., advertisement 1 (Ad1) and advertisement 2 (Ad2), from different broadcasting stations (broadcasting stations A and B) at the same time.

Broadcasting station A (cid=1) sends advertisement (Ad1) from time t1 to t2 as an NRT content file.

Broadcasting station B (cid=2) sends advertisement 2 (Ad2) from time t1 to t2 as an NRT content file.

If such a conflict occurs between pieces of data delivered, it is necessary for the reception apparatus 30 to perform a process of selecting data to be received in accordance with an algorithm of some kind.

A description will be given below of a configuration for the reception apparatus 30 to select one of the advertisements in such a case. Priority information for making a decision as to selection and acquisition is specified, for example, for data sent from the transmission apparatus 20 to the reception apparatus 30 before the advertisement delivery process including ESG and signaling data such as FDT, and the advertisement to be selected and acquired is determined based on this priority information.

It should be noted that priority information applied to this advertisement selection is referred to as service selection priority information (Service Selection Priority).

A description will be given of a process of sending and using signaling data that contains a record of service selection priority information (Service Selection Priority) with reference to FIGS. 25 and 26.

Figure 25:
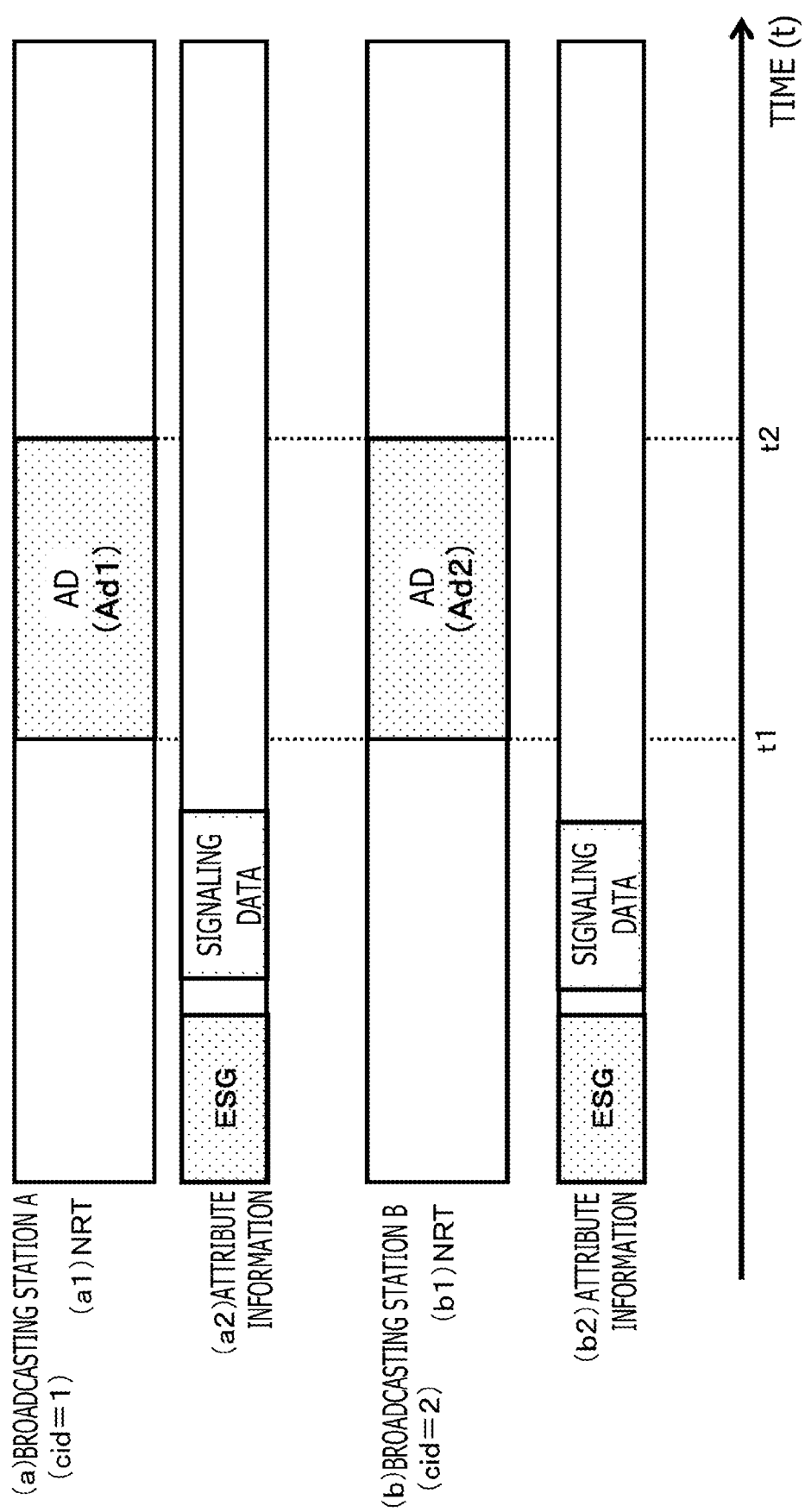
FIG. 25 is a diagram describing a configuration example that allows for selection of data received by a reception apparatus when delivery times of advertisement content sent via different channels overlap.

FIG. 25 illustrates an example of a process of sending advertisement data (NRT content file) sent from each of broadcasting station A (cid=1) and broadcasting station B (cid=2) and attribute information for advertisement such as ESG and signaling data. The attribute information for advertisement depicted in the figure is ESG that contains a record of attribute information and control information about advertisement 1 (Ad1) or advertisement 2 (Ad2) provided by each broadcasting station or signaling data such as FDT.

Service selection priority information (Service Selection Priority) is recorded in ESG or signaling data such as FDT.

This service selection priority information (Service Selection Priority) is applied to content selection and determination process for selectively receiving and caching a piece of content when delivery times of content to be delivered such as advertisements overlap.

A description will be given of a process of selecting content to be acquired using service selection priority information (Service Selection Priority) performed by the reception apparatus with reference to FIG. 26.

First, the reception apparatus receives, as depicted in step A, data acquired in advance that contains a record of access information such as delivery time information about advertisements including, for example, ESG and FDT, signaling data, and confirms the delivery time of each advertisement.

We assume here that, as depicted in step B, it has been confirmed that the delivery times of a plurality of different advertisements overlap (there is a conflict between the delivery times thereof).

In this case, the reception apparatus 30 refers to the ESG or signaling data such as FDT sent from each broadcasting station and refers to the service selection priority information (Service Selection Priority) associated with each of the advertisements delivered.

It should be noted that one of the following data can be used as recorded data of service selection priority information (Service Selection Priority):
(a) ESG (Electronic Service Guide), an electronic service guide including program listings and so on
(b) FDT (File Delivery Table) containing a record of metadata of each of transmission files
(c) CRT (Conflict Resolution Table), dedicated data for recording service selection priority information (Service Selection Priority)

Figure 30:
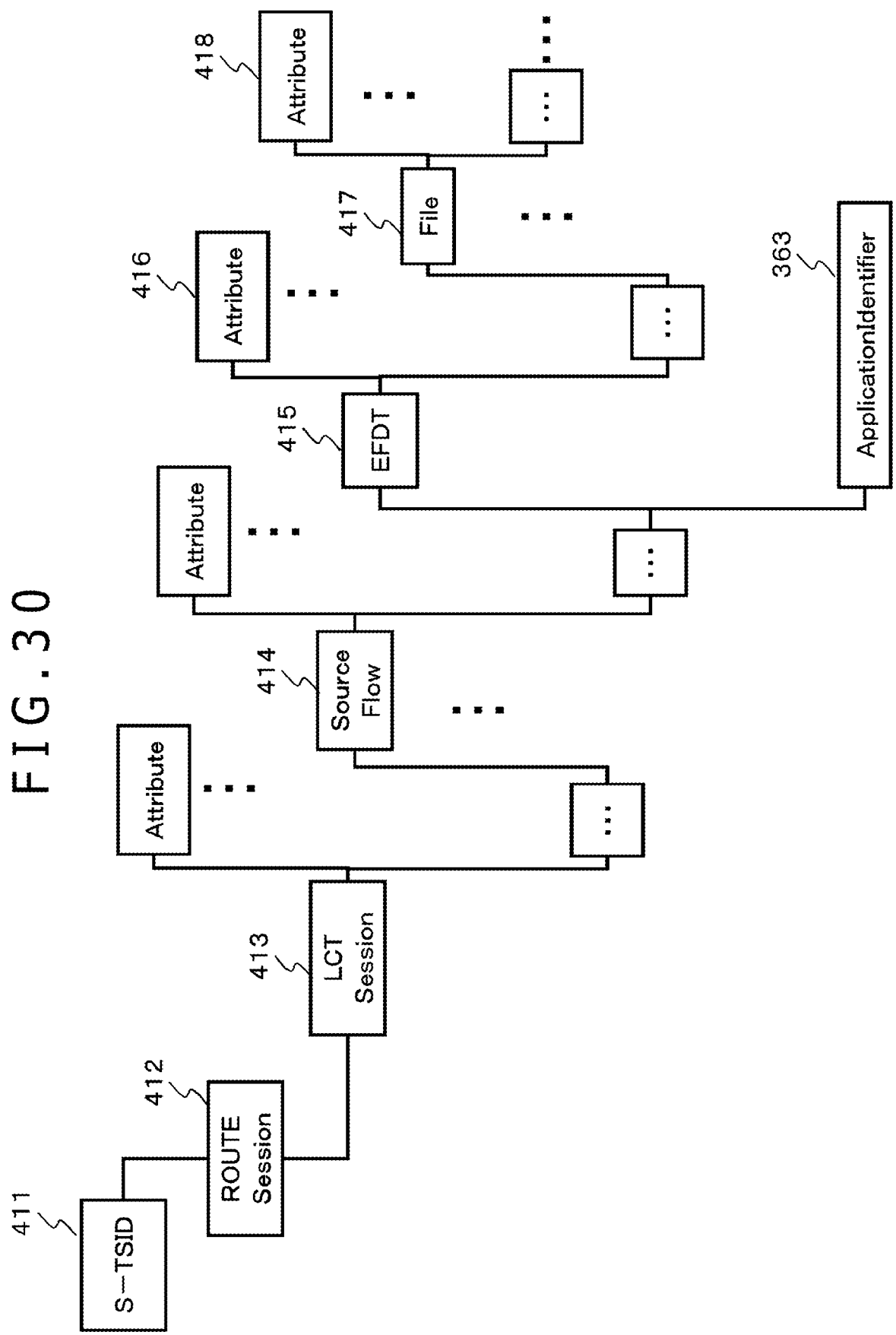
FIG. 30 is a diagram describing an example of a configuration for recording priority information.

Next, the reception apparatus 30 compares, in step C depicted in FIG. 30, the service selection priority information (Service Selection Priority), associated with the respective advertisements to be delivered and selects the advertisement with a higher priority information setting as data to be received and cached.

Figure 26:
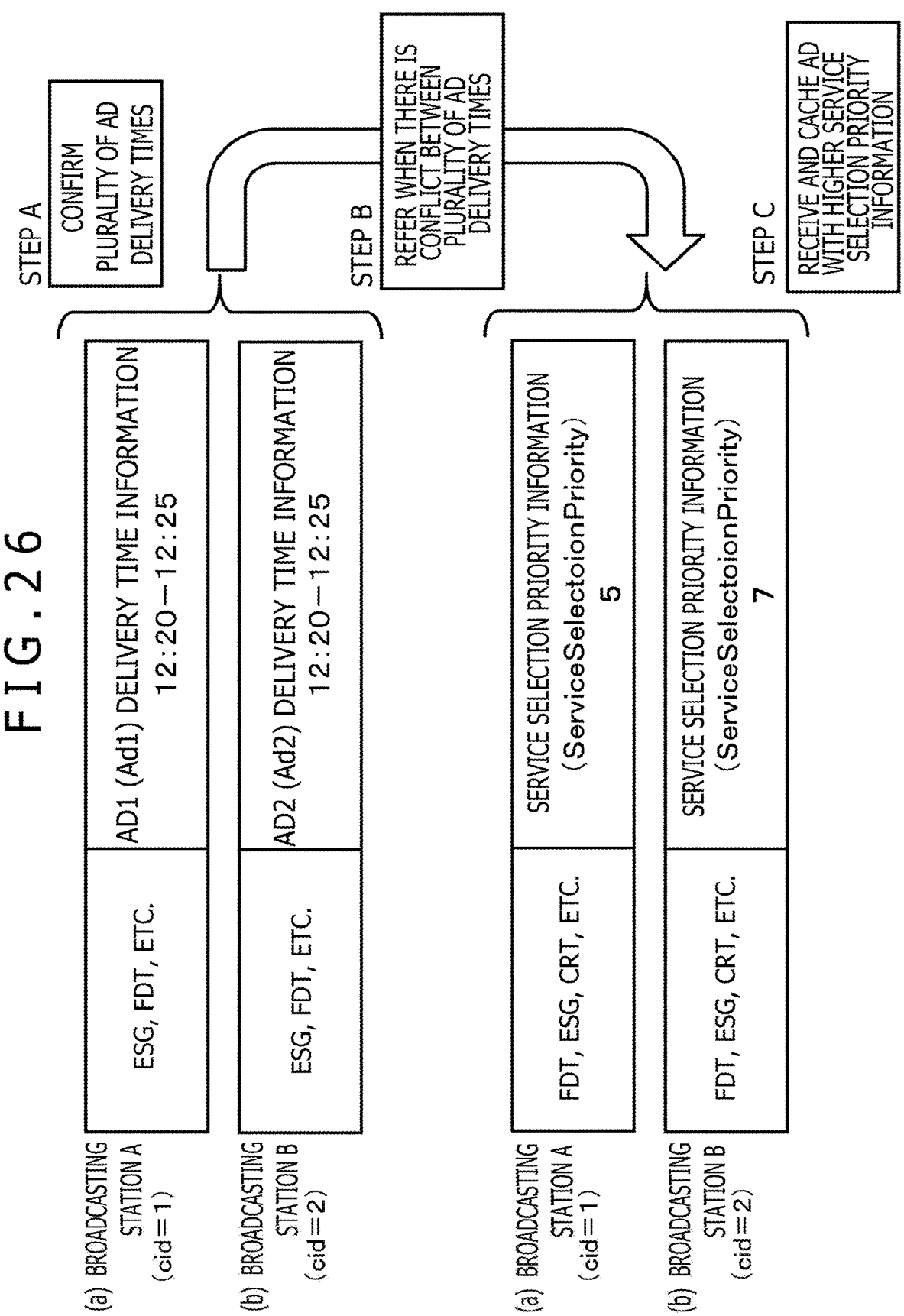
FIG. 26 is a diagram describing a configuration example that allows for selection of data received by a reception apparatus when delivery times of advertisement content sent via different channels overlap.

In the example depicted in FIG. 26, the service selection priority information (Service Selection Priority) associated with advertisement 1 (Ad1) sent from broadcasting station A (cid=1) is "5."

On the other hand, the service selection priority information (Service Selection Priority) associated with advertisement 2 (Ad2) sent from broadcasting station B (cid=2) is "7."

In this case, the reception apparatus 30 selects and receives advertisement 2 (Ad2) sent from broadcasting station B (cid=2) and performs a caching process.

By performing such a process, the reception apparatus 30 can reliably select and acquire one piece of content even when delivery times of a plurality of pieces of content (e.g., advertisements) overlap.

It should be noted that, in order to receive content delivered by each broadcasting station, an application for the broadcasting station to perform a process of receiving content to be received is started to perform the reception process.

That is, the reception apparatus 30 compares service selection priority information (Service Selection Priority), associated with the respective advertisements to be delivered, determines the reception of the advertisement with a higher priority information setting, starts the application to receive the advertisement, and perform the advertisement reception and caching process.

Figure 27:
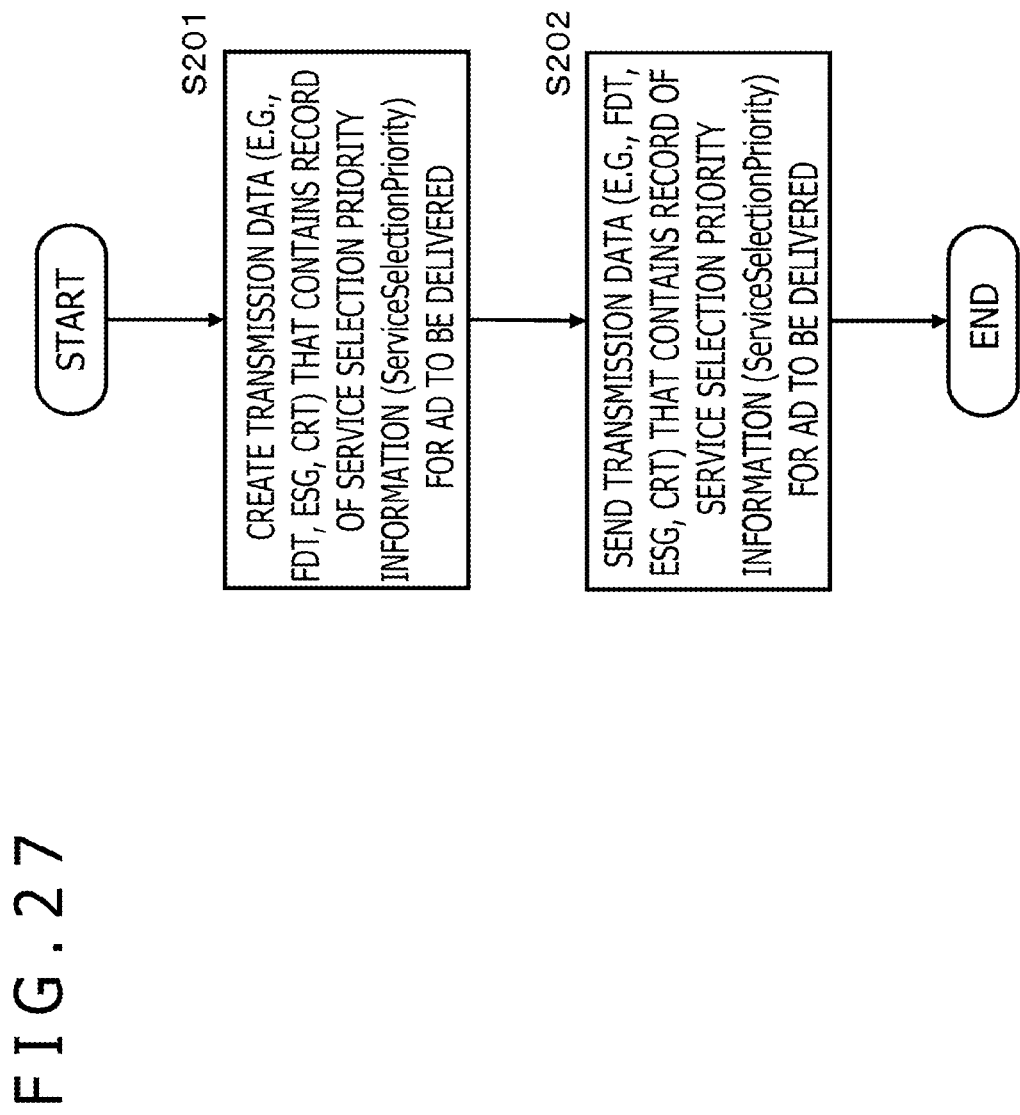
FIG. 27 is a diagram illustrating a flowchart describing a processing sequence carried out by a transmission apparatus that performs a service selection priority information (Service Selection Priority) transmission process.

A description will be given of a sequence for generating and sending service selection priority information (Service Selection Priority) performed by the transmission apparatus 20 with reference to the flowchart depicted in FIG. 27.
(Step S201)
First, in step S201, the data processing section of the transmission apparatus generates transmission data (e.g., FDT, ESG, CRT) that contains a record of service selection priority information (Service Selection Priority) for advertisements to be delivered.

As described earlier, service selection priority information (Service Selection Priority) is recorded, for example, in one of the following data:
(a) ESG (Electronic Service Guide), an electronic service guide including program listings and so on
(b) FDT (File Delivery Table) containing a record of metadata of each of transmission files
(c) CRT (Conflict Resolution Table), dedicated data for recording service selection priority information (Service Selection Priority)
(Step S202)
Next, in step S202, the transmission apparatus sends transmission data (e.g., FDT, ESG, CRT) that contains a record of service selection priority information (Service Selection Priority) for advertisements.

Figure 28:
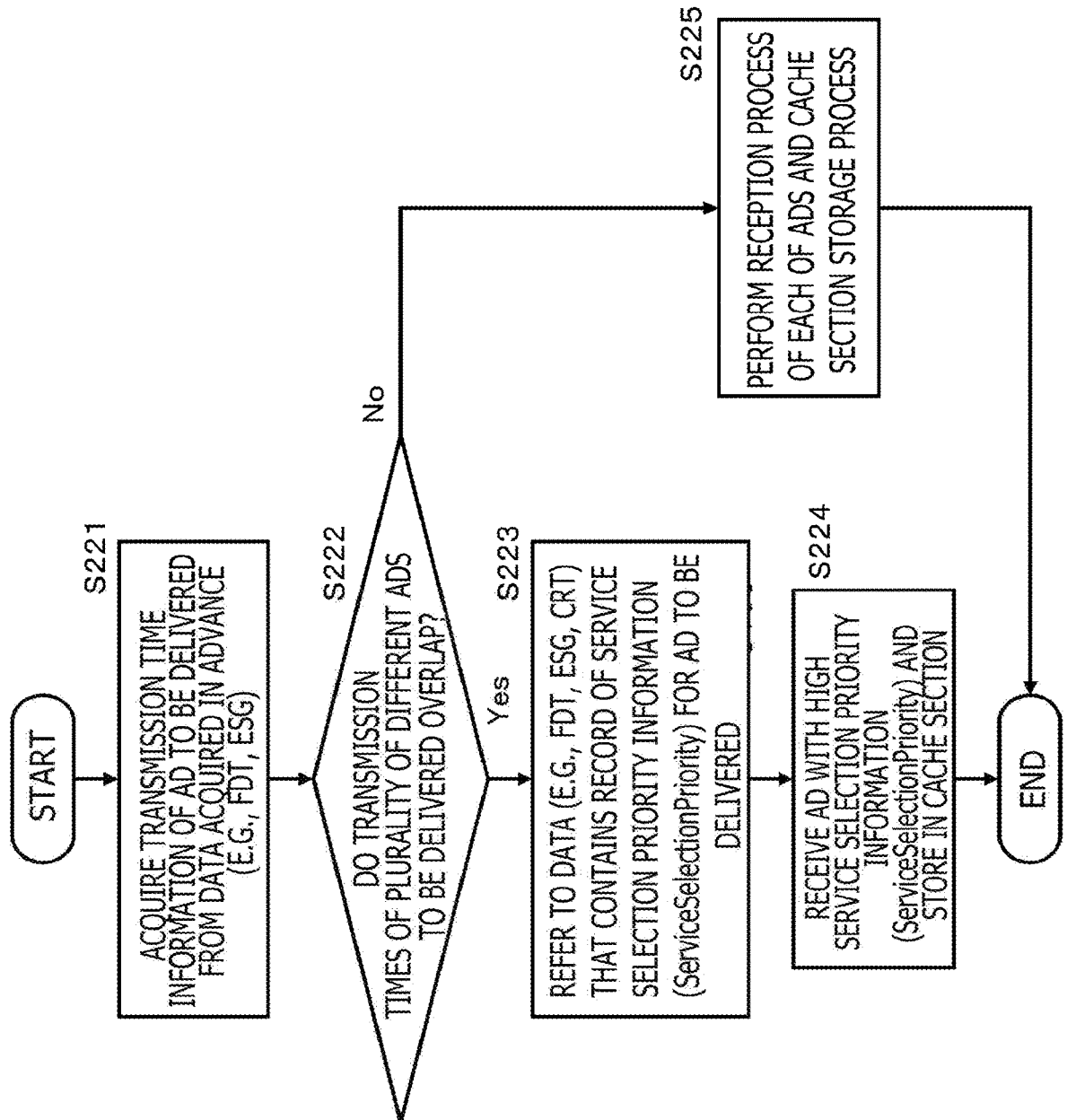
FIG. 28 is a diagram illustrating a flowchart describing a processing sequence carried out by a reception apparatus that performs a service selection priority information (Service Selection Priority) reception process.

A description will be given next of an example of a processing sequence based on service selection priority information (Service Selection Priority) performed by the reception apparatus 30 with reference to the flowchart depicted in FIG. 28.
(Step S221)
First, in step S221, the data processing section of the reception apparatus acquires transmission time information of advertisements to be delivered from data acquired in advance such as ESG and FDT.
(Step S222)
Next, in step S222, the reception apparatus decides whether transmission times of a plurality of different advertisements to be delivered overlap.

When it is confirmed that there is an overlap, the reception apparatus proceeds to step S223.

When it is confirmed that there is no overlap, the reception apparatus proceeds to step S225.
(Step S223)
When it is confirmed that there is an overlap between transmission times of a plurality of different advertisements to be delivered, the reception apparatus proceeds to step S223 and refers to data (FDT, ESG, CRT or the like) that contains a record of service selection priority information (Service Selection Priority) for advertisements.
(Step S224)
Next, in step S224, the reception apparatus selects the advertisement with higher service selection priority information as an advertisement to be received and cached, receives the selected advertisement, and stores it in the cache section on the basis of the service selection priority information (Service Selection Priority) referenced in step S223.

It should be noted that, in order to perform the advertisement reception and caching process under application control, it is necessary to start an application applicable to the process of receiving a target advertisement to be received and caching the advertisement, and that the reception apparatus 30 starts the application that performs the process for the selected advertisement and carries out the advertisement reception and caching process.
(Step S225)
On the other hand, at the decision process in step S222, when it is confirmed that there is no overlap between transmission times of a plurality of different advertisements to be delivered, the reception apparatus proceeds to step S225 and performs a process of sequentially receiving delivered advertisements and storing them in the cache section.

Thus, the reception apparatus 30 can select, receive, and cache a piece of content when there is a conflict between delivery times of a plurality of different pieces of content such as advertisements.

In the embodiment described above, an application has started, and the cashing process has performed under control of the application. However, if the application instructs in advance that an NRT file be acquired by a cache API, the data reception section can perform the process of storing NRT content in the cache by deciding from the ESG delivery time without starting the application.

[11. Configuration Example for Recording Each Piece of Priority Information]

In the above description, the following two pieces of priority information have been described as priority information that is applied to the decision as to preferential acquisition of content such as advertisements on the reception apparatus 30:

(1) Delivery priority information (Delivery Priority)
(2) Service selection priority information (Service Selection Priority)

(1) Delivery priority information (Delivery Priority) is priority information associated with each piece of advertisement content that can be output during an advertisement output time zone of a specific channel as described earlier with reference to FIGS. 21 to 23.

Delivery priority information (Delivery Priority) is priority information specified for each piece of a plurality of different pieces of content (e.g., different advertisements) delivered continuously via an NRT transmission channel.

The reception apparatus 30 can selectively receive and cache content (advertisement) with high delivery priority based on delivery priority information (Delivery Priority).

(2) Service selection priority information (Service Selection Priority) is priority information associated with each piece of advertisement content delivered via a plurality of different channels as described earlier with reference to FIGS. 24 to 28.

When transmission times of advertisement content delivered via a plurality of different channels overlap, the reception apparatus 30 can select, receive, and cache content (advertisement) with high service selection priority by referring to service selection priority information (Service Selection Priority) associated with each piece of advertisement content.

These two pieces of priority information can be sent together with advertisement content itself that is sent from the transmission apparatus 20 to the reception apparatus. Alternatively, these pieces of priority information can be recorded in ESG or signaling data such as FDT that is sent ahead of each piece of advertisement content and provided.

Although these two pieces of priority information can be directly recorded in an advertisement data file (NRT content file), they can be recorded in each piece of the following data, sent ahead of the advertisement data file, and sent from the transmission apparatus 20 to the reception apparatus 30:

(a) ESG (Electronic Service Guide), an electronic service guide including program listings and so on
(b) FDT (File Delivery Table) containing a record of metadata of each of transmission files
(c) CRT (Conflict Resolution Table), dedicated data for recording service selection priority information (Service Selection Priority)

For example, one of these pieces of data can be used.

Figure 29:
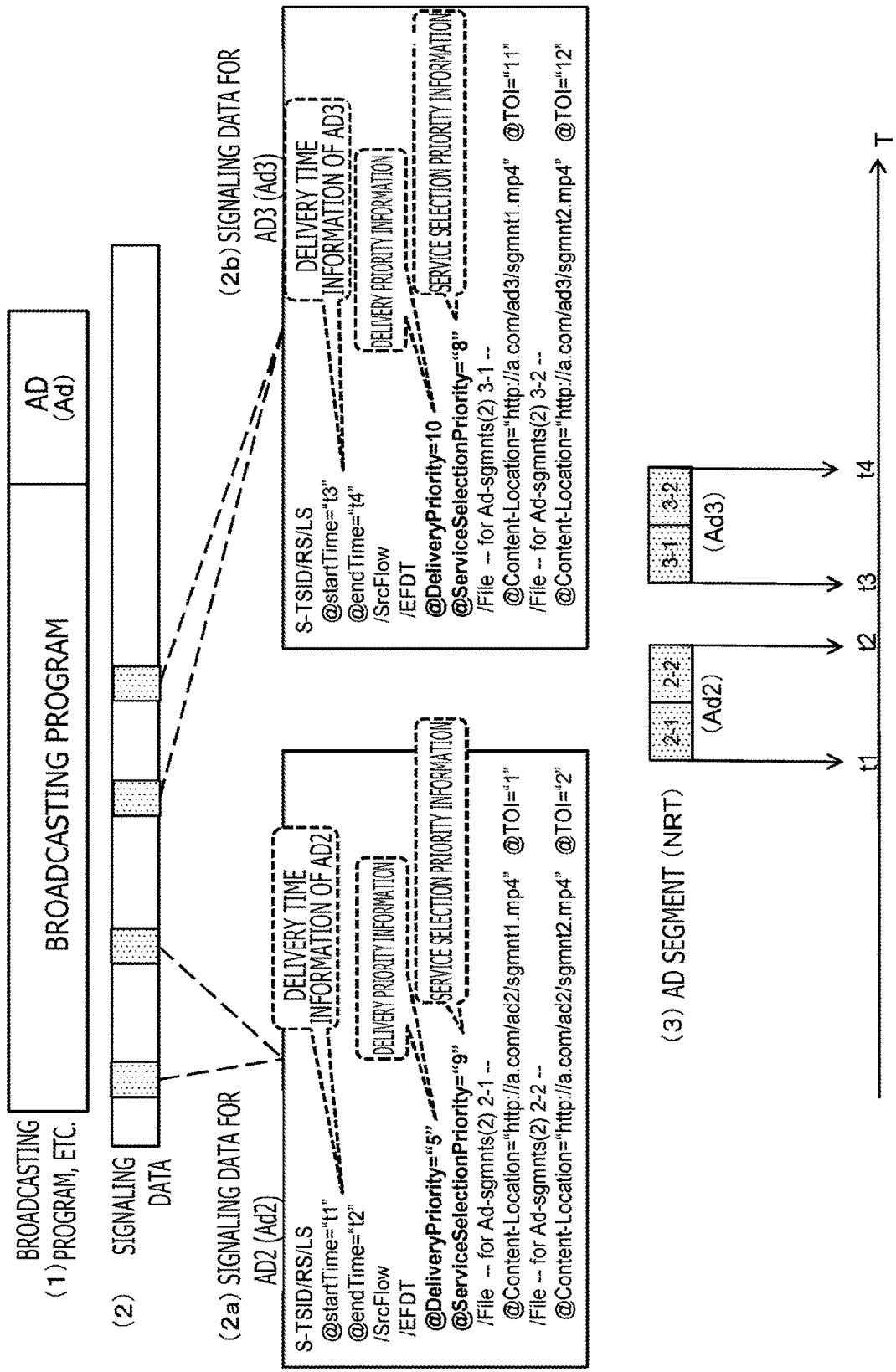
FIG. 29 is a diagram describing examples of priority information recording and transmission processes.

FIG. 29 illustrates an example in which the following two pieces of priority information are recorded in an FDT (File Delivery Table) that contains a record of metadata of each of transmission files:

(1) Delivery priority information (Delivery Priority)
(2) Service selection priority information (Service Selection Priority)

FIG. 29 illustrates an example of delivery of each of the following pieces of data:

(1) Delivered data of broadcasting program, etc.
(2) Signaling data
(3) Delivered data of advertisement segment (NRT)

Further, details of each of the following signaling data are depicted:

(2a) Signaling data for advertisement 2 (Ad2) (2b) Signaling data for advertisement 3 (Ad3)

The following priority information and further advertisement delivery time information and so on are recorded in each piece of signaling data:

(1) Delivery priority information (Delivery Priority)
(2) Service selection priority information (Service Selection Priority)

The reception apparatus receives this signaling data before the transmission of each advertisement from the transmission apparatus and conducts analysis of the signaling data.

Based on this analysis of signaling data, it is possible to acquire each of the following pieces of priority information about each advertisement scheduled to be sent, and, based on the acquired priority information, select advertisement content to be received and cached:

(1) Delivery priority information (Delivery Priority)
(2) Service selection priority information (Service Selection Priority)

A description will be given below of an example of recording position of each piece of priority information when the following two pieces of priority information are recorded in an FDT (File Delivery Table), signaling data containing a record of metadata of each of transmission files with reference to FIG. 30 onward:

(1) Delivery priority information (Delivery Priority)
(2) Service selection priority information (Service Selection Priority)

Figure 31:
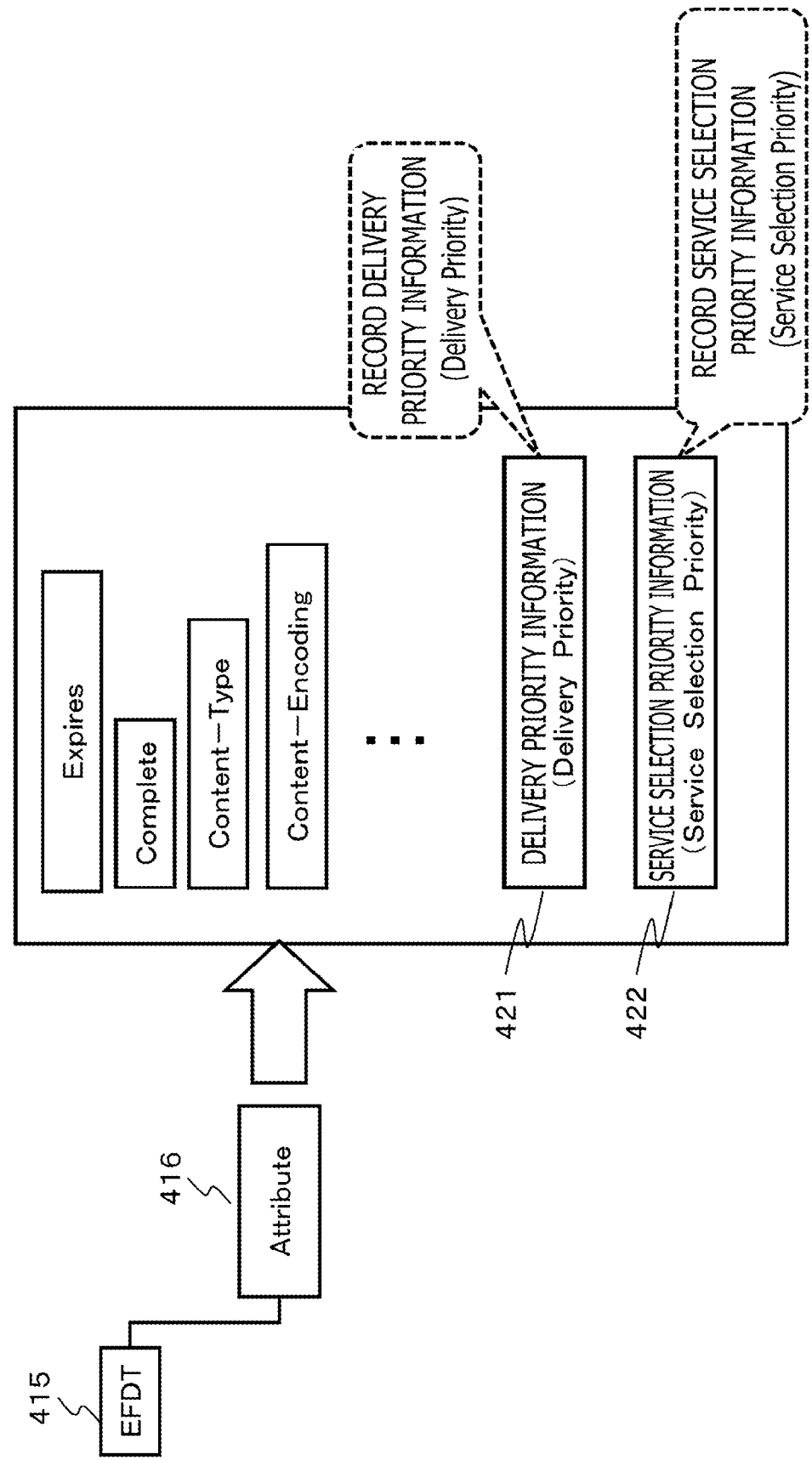
FIG. 31 is a diagram describing an example of a configuration for recording priority information.

The examples depicted in FIGS. 30 and 31 are those in which the following pieces of priority information are recorded in the attribute of the S-TSID/RS/LS/SrcFlow/ EFDT element of S-TSID, signaling data:

(1) Delivery priority information (Delivery Priority)
(2) Service selection priority information (Service Selection Priority)

FIG. 30 illustrates a configuration of S-TSID, signaling data defined in ROUTE. S-TSID has a hierarchical configuration including the following elements that are hierarchically set:

S-TSID element 411
ROUTE session (LCTSession) element 412
LCT session (LCTSession) element 413
Source flow (SourceFlow) element 414
EFDT element 415
File element 417

Priority information about each piece of advertisement data can be recorded in an attribute data element 416 for each EFDT element 415.

A detailed configuration thereof is depicted in FIG. 31.

An attribute recording area has not only a prescribed attribute information recording area but also a data recording field (any) where desired data can be stored.

The following pieces of priority information are recorded in this data recording field (any):

(1) Delivery priority information (Delivery Priority) 421
(2) Service selection priority information (Service Selection Priority) 422

It should be noted that the above two kinds of priority information for a plurality of advertisements can be specified and recorded in this attribute recording area for each advertisement as depicted in the figure.

Alternatively, the above two kinds of priority information for only a single advertisement may be specified and recorded.

Figure 32:
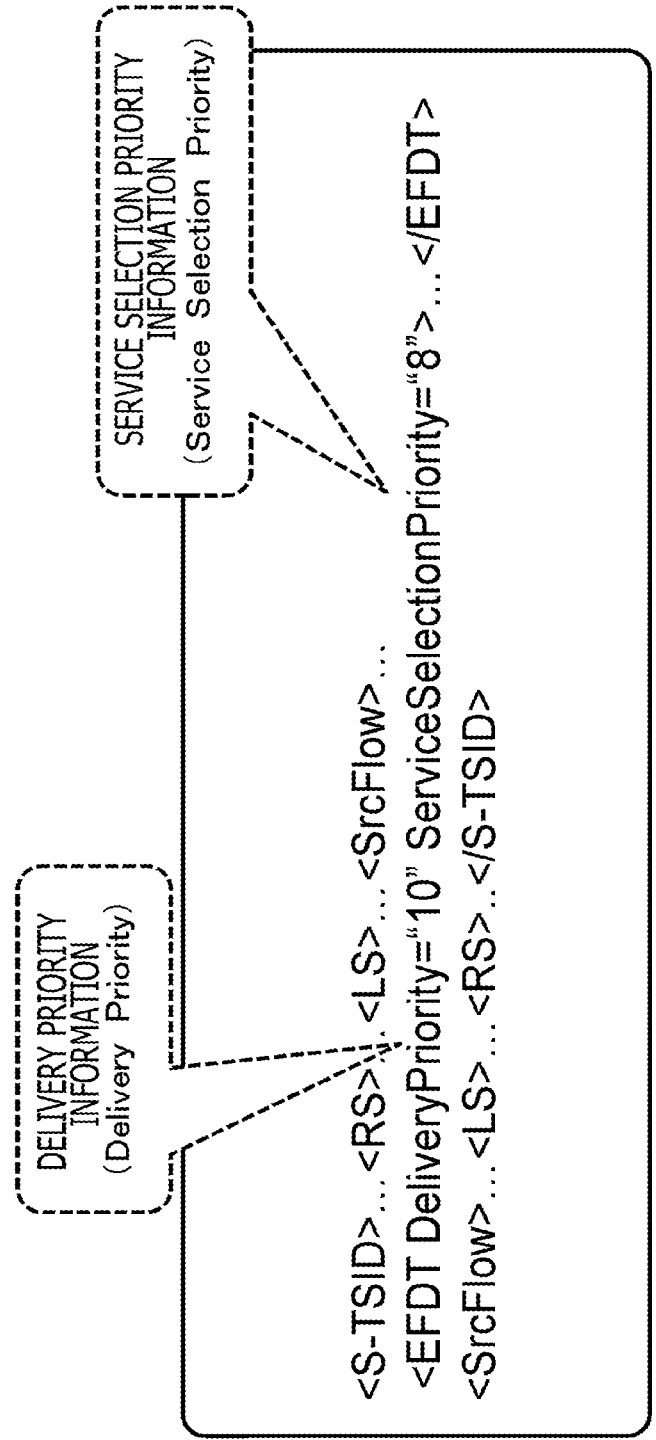
FIG. 32 is a diagram describing an example of a configuration for recording priority information.

A specific example of description of each piece of priority information (XML data) is depicted in FIG. 32 and below.
<S-TSID> . . . <RS> . . . <LS> . . . <SrcFlow> . . . <EFDT DeliveryPriority="10" ServiceSelectionPriority="8"> . . . </EFDT><SrcFlow> . . . <LS> . . . <RS>> . . . </S-TSID>

The above XML data is an example of data that contains a record of priority information with the following settings:
(1) Delivery priority information (Delivery Priority)=10
(2) Service selection priority information (Service Selection Priority)=8

The examples described with reference to FIGS. 30 to 32 are those in which two pieces of priority information are recorded as attributes of the EFDT element of S-TSID. However, two pieces of priority information can be recorded in an attribute element 418 of the file element 417 under the EFDT element 415 depicted in FIG. 30.

That is, the following priority information can be recorded as attributes of the S-TSID/RS/LS/SrcFlow/EFDT/File element:
(1) Delivery priority information (Delivery Priority)
(2) Service selection priority information (Service Selection Priority)

Attribute information for each NRT content file, an advertisement data transmission file, can be recorded in the attribute data element 418 for each file element 417.

Figure 33:
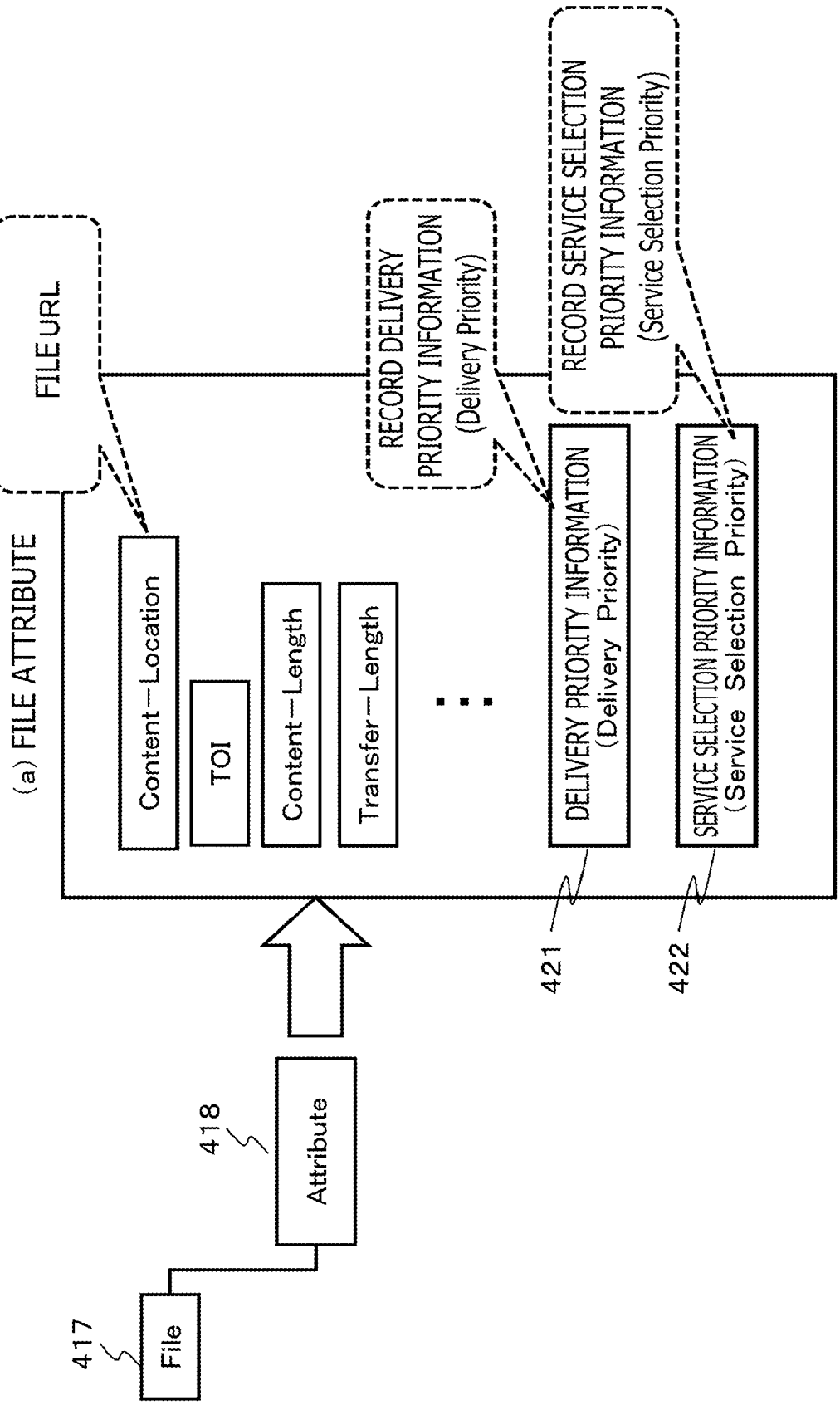
FIG. 33 is a diagram describing an example of a configuration for recording priority information.

A detailed configuration thereof is depicted in FIG. 33.

An attribute recording area has not only a prescribed attribute information recording area but also a data recording field (any) where desired data can be stored.

The following pieces of priority information are recorded in this data recording field (any):
(1) Delivery priority information (Delivery Priority) 421
(2) Service selection priority information (Service Selection Priority) 422

Further, a description will be given of a data recording example in which the following priority information is recorded in an ESG (Electronic Service Guide), an electronic service guide including program listings and so on with reference to FIG. 34:
(1) Delivery priority information (Delivery Priority)
(2) Service selection priority information (Service Selection Priority)

Figure 34:
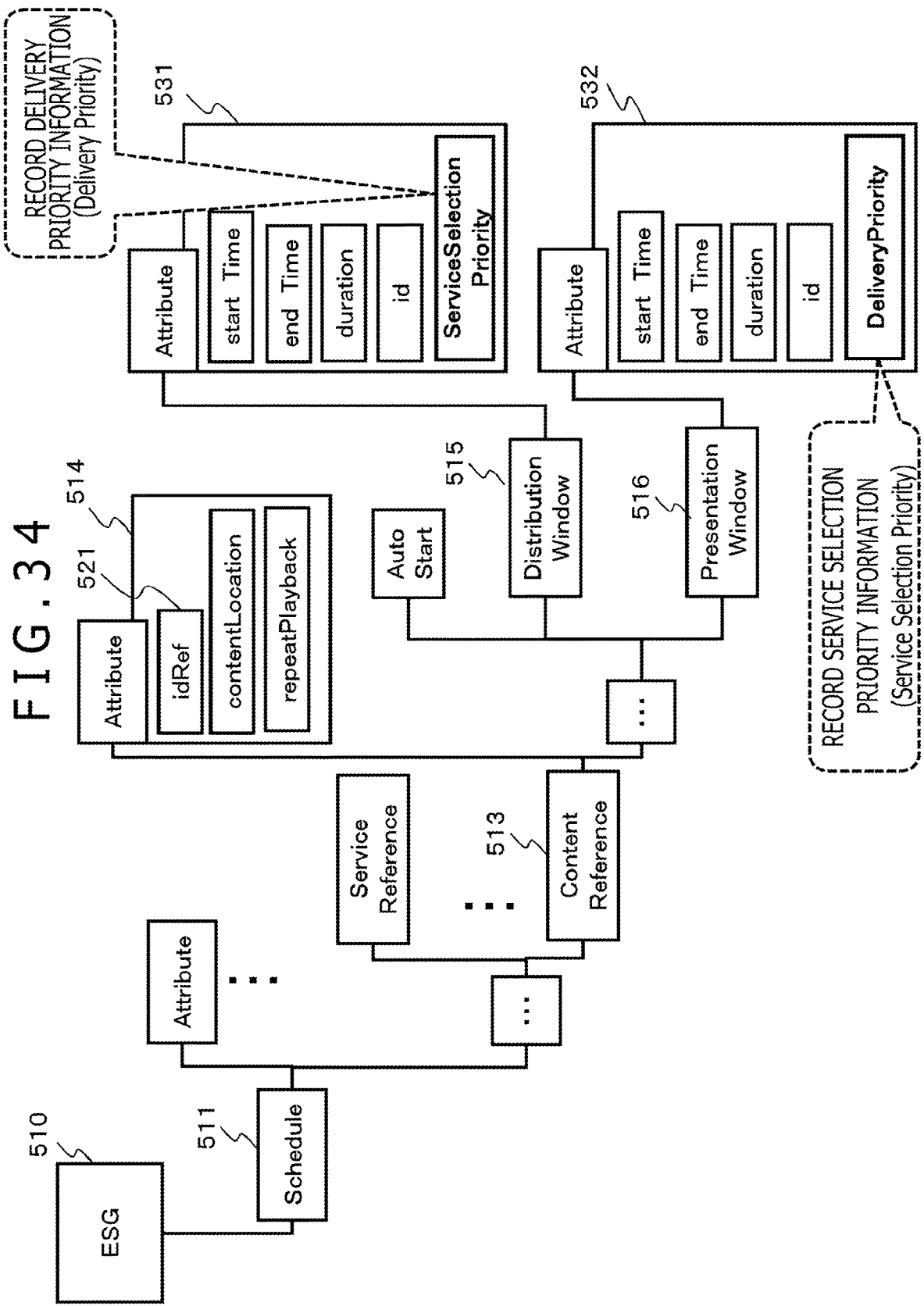
FIG. 34 is a diagram describing an example of a configuration for recording priority information.

FIG. 34 illustrates a configuration of an ESG (partial configuration).

A schedule (Schedule) element 511 is specified in an ESG 510.

Further, a content reference (ContentReference) element 513, a distribution window (DistributionWindow) element 515, and a presentation window (PresentationWindow) element 516 are arranged under the schedule (Schedule) element 511.

An attribute element is specified for each element, making it possible to record attribute information for each element.

idRef 521 is recorded in an attribute element 514 immediately under the content reference (ContentReference) element 513.

The idRef 521 is information that allows to identify for which content segment the information recorded in this schedule element as a whole is. For example, it is possible to identify for which piece of advertisement content the information recorded in this schedule element as a whole is.

"Delivery priority information (Delivery Priority)" is recorded in an attribute element 531 immediately under the distribution window (DistributionWindow) element 515.

Further, "Service selection priority information (Service Selection Priority)" is recorded in an attribute element 532 immediately under the presentation window (PresentationWindow) element 516.

Figure 35:
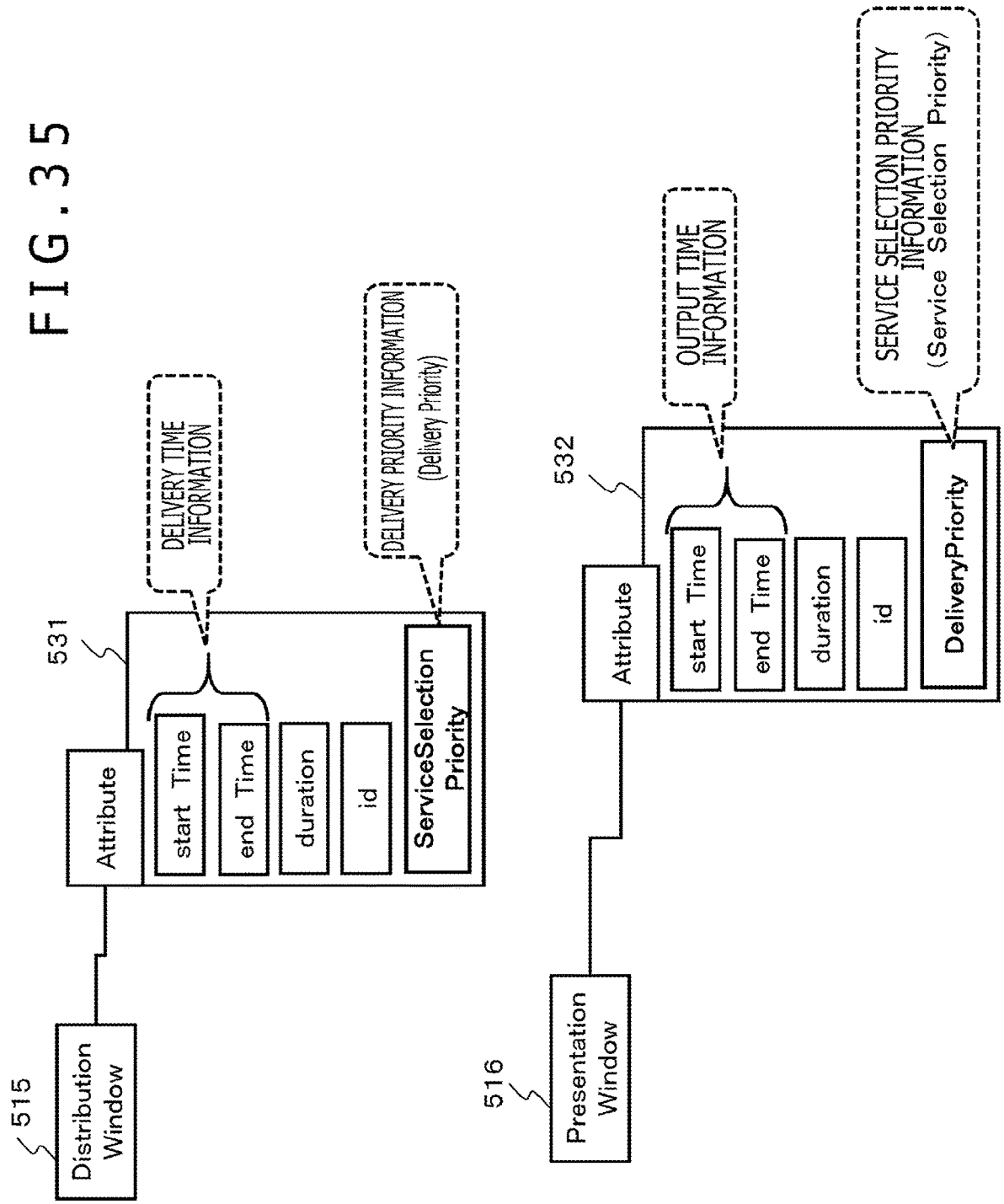
FIG. 35 is a diagram describing an example of a configuration for recording priority information.

FIG. 35 illustrates an example of information recorded in the attribute element 531 immediately under the distribution window (DistributionWindow) element 515 and an example of information recorded in the attribute element 532 immediately under the presentation window (PresentationWindow) element 516.

As depicted in the figure, delivery time information of advertisement content (NRT content file), i.e., delivery start time and end time of advertisement content (NRT content file), and further service selection priority information (Service Selection Priority), are recorded in the attribute element 531 immediately under the distribution window (DistributionWindow) element 515.

Also, output time information of advertisement content, i.e., advertisement output start time and end time on the reception apparatus, and further delivery priority information (Delivery Priority), are recorded in the attribute element 532 immediately under the presentation window (PresentationWindow) element 516.

The reception apparatus can receive an ESG before the delivery of a variety of pieces of advertisement content sent from each broadcasting station and can acquire the following pieces of priority information for each piece of advertisement content scheduled to be delivered by analyzing the received ESG, namely:
(1) Delivery priority information (Delivery Priority)
(2) Service selection priority information (Service Selection Priority)

The reception apparatus 30 can select advertisement content to be received and cached in accordance with acquired priority information.

[12. Configuration Examples of the Transmission and the Reception Apparatuses]

A description will be given next of configuration examples of the transmission apparatus (server) 20 and the reception apparatus (client) 30 with reference to FIGS. 36 and 37.

Figure 36:
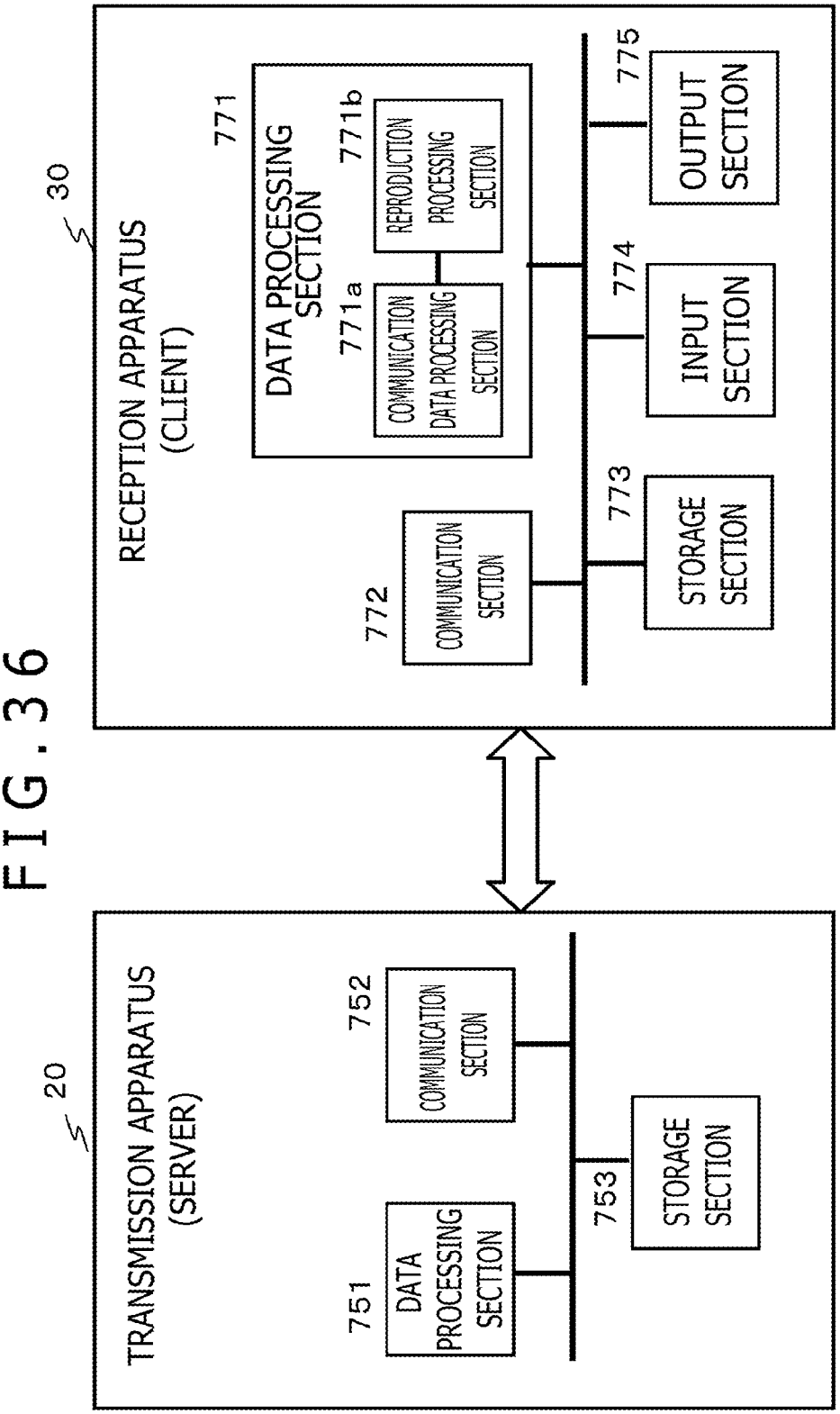
FIG. 36 is a diagram describing configuration examples of transmission and reception apparatuses, communication apparatuses.

FIG. 36 illustrates configuration examples of the transmission apparatus (server) 20 and the reception apparatus (client) 30.

The transmission apparatus (server) 20 includes a data processing section 751, a communication section 752, and a storage section 753.

The reception apparatus (client) 30 includes a data processing section 771, a communication section 772, a storage section 773, an input section 774, and an output section 775.

The data processing section 771 includes a communication data processing section 771a and a reproduction processing section 771b.

The data processing section 751 of the transmission apparatus (server) 20 handles a variety of data processing tasks to carry out data delivery services. For example, the data processing section 751 creates configuration data of data delivery services and controls data transmission. Further, the data processing section 751 creates applications, NRT content files, and various other data to be provided to the reception apparatus (client) 30 and creates and sends signaling data.

The communication section 752 handles communication processes such as delivery of not only AV segments but also applications, NRT content files, and various other data and signaling data.

The storage section 753 stores AV segments, NRT content files, applications, data used by applications, and signaling data, and so on.

Further, the storage section 753 is used as a work area for data processing handled by the data processing section 751 and used also as a storage area of various kinds of parameters.

On the other hand, the reception apparatus (client) 30 includes the data processing section 771, the communication section 772, the storage section 773, the input section 774, and the output section 775.

The communication section 772 receives data delivered from the transmission apparatus (server) 20 such as AV segments, applications, data used by applications, NRT content files, and signaling data.

The data processing section 771 includes a communication data processing section 771a and a reproduction processing section 771b and handles, for example, the processes that comply with the embodiment described earlier.

Specifically, the data processing section 771 handles data processing using applications.

Various user instruction commands such as channel selection, application startup, and installation are input via the input section 774.

Reproduction data is output on the output section 775 such as display section and speaker.

The storage section 775 stores AV segments, applications, data used by applications, NRT content files, signaling data, and so on.

Further, the storage section 773 is used as a work area for data processing handled by the data processing section 771 and used also as a storage area of various kinds of parameters.

FIG. 37 illustrates a hardware configuration example of a communication apparatus applicable as the transmission apparatus 20 and the reception apparatus 30.

A CPU (Central Processing Unit) 801 functions as a data processing section that performs various processes in accordance with programs stored in a ROM (Read Only Memory) 802 or a storage section 808. For example, the CPU 801 performs processes in accordance with the sequence described in the above embodiment. A RAM (Random Access Memory) 803 stores programs to be executed by the CPU 801 and data. The CPU 801, the ROM 802, and the RAM 803 are connected to each other by a bus 804.

The CPU 801 is connected to an I/O interface 805 via the bus 804, and an input section 806 and an output section 807 are connected to the I/O interface 805. The input section 806 includes various switches, a keyboard, a mouse, a microphone, and so on. The output section 807 includes a display, a speaker, and so on. The CPU 801 performs various processes in accordance with an instruction input from the input section 806 and outputs processing results, for example, to the output section 807.

The storage section 808 connected to the I/O interface 805 includes, for example, a hard disk and stores programs to be executed by the CPU 801 and various data. A communication section 809 functions as a transmission/reception section for communicating data via the Internet, local area networks, and other networks, and further as a broadcasting wave transmission/reception section to communicate with external apparatuses.

A drive 810 connected to the I/O interface 805 drives a removable medium 811 such as magnetic disk, optical disc, magneto-optical disk, or memory card and other semiconductor memory and drives the removable medium 811 to record or read data.

It should be noted that encoding or decoding of data can be carried out as a process of the CPU 801 that serves as a data processing section, a codec may be included as dedicated hardware to handle the encoding or decoding process.

[13. Conclusion of the Configuration of the Present Disclosure]

Thus, an embodiment of the present disclosure has been described in detail with reference to a specific embodiment. However, it is self-evident that a person skilled in the art can conceive of modifying or substituting the embodiment without departing from the gist of the present disclosure. That is, the present invention has been disclosed as illustration and should not be interpreted restrictively. The claim section should be taken into consideration to decide the gist of the present disclosure.

It should be noted that the technology disclosed in the present specification can have the following configurations:

(1) A transmission apparatus including:
a communication section adapted to send a plurality of pieces of content that can be selected and output during a content output time of a given duration on a reception apparatus; and
a data processing section adapted to determine a transmission order of the plurality of pieces of content, in which
the data processing section performs a transmission order determination process of arranging a transmission time of content highly likely to be viewed closest to the content output time and arranging a transmission time of content unlikely to be viewed before the transmission time of content highly likely to be viewed.

(2) The transmission apparatus of feature (1), in which
the data processing section determines a transmission order and a transmission time such that a plurality of pieces of content are arranged in order from high likelihood for viewing, that a piece of content least likely to be viewed is sent first, and that the transmission time of a piece of content most likely to be viewed is closest to the content output time.

(3) The transmission apparatus of feature (1) or (2), in which
the content is advertisement content.

(4) The transmission apparatus of any one of features (1) to (3), in which
the content is advertisement content selected and output on the reception apparatus in accordance with user (viewer) information.

(5) The transmission apparatus of any one of features (1) to (4), in which
the content is advertisement content output between broadcasting programs, in which
the data processing section is set up to send a piece of advertisement content most likely to be viewed together with a broadcasting program, and in which
the data processing section delivers, in parallel, a plurality of pieces of advertisement content second and less likely to be viewed in a delivery process separate from the broadcasting program delivery process.

(6) The transmission apparatus of feature (5), in which
the data processing section arranges and transmits a plurality of pieces of advertisement content second and less likely to be viewed in order from low likelihood for viewing as NRT (Non-Real-Time) content.

(7) The transmission apparatus of any one of features (1) to (6), in which
the data processing section determines the transmission order of the plurality of pieces of content based on viewing distribution estimation data acquired in advance.

(8) The transmission apparatus of feature (7), in which
the data processing section successively updates the viewing distribution estimation data based on audience rating data.

(9) The transmission apparatus of any one of features (1) to (8), in which
the data processing section specifies delivery priority information (Delivery Priority) for each of the plurality of pieces of content as a priority decision criterion about caching, and in which
the data processing section sends the delivery priority information (Delivery Priority) to the reception apparatus.

(10) The transmission apparatus of feature (9), in which
the data processing section specifies the delivery priority information (Delivery Priority) for each of the plurality of pieces of content to match a magnitude of likelihood for viewing.

(11) The transmission apparatus of feature (9) or (10), in which
the data processing section records the delivery priority information (Delivery Priority) in an electronic service guide (ESG) and sends the ESG.

(12) The transmission apparatus of any one of feature (9) or (10), in which
the data processing section records the delivery priority information (Delivery Priority) in signaling data and sends the signaling data.

(13) The transmission apparatus of feature (12), in which
the signaling data is an FDT (File Delivery Table).

(14) A reception apparatus including:
a data processing section adapted to receive a plurality of pieces of content that can be selected and output during a content output time of a given duration and store the pieces of content in a cache section, in which
the data processing section acquires delivery priority information (Delivery Priority) specified for each of the plurality of pieces of content, preferentially receives the pieces of content with high delivery priority information (Delivery Priority) settings in accordance with the acquired delivery priority information (Delivery Priority), and stores these pieces of content in the cache section.

(15) The reception apparatus of feature (14), in which
the content is advertisement content.

(16) The reception apparatus of feature (14) or (15), in which
the content is advertisement content selected and output on the reception apparatus in accordance with user (viewer) information.

(17) The reception apparatus of any one of features (14) to (16), in which
the data processing section acquires the delivery priority information (Delivery Priority) from an electronic service guide (ESG).

(18) The reception apparatus of any one of features (14) to (16), in which
the data processing section acquires the delivery priority information (Delivery Priority) from signaling data.

(19) A data processing method carried out by a transmission apparatus, the data processing method causing a data processing section to perform a process of determining a transmission order of a plurality of pieces of content that can be selected and output during a content output time of a given duration on a reception apparatus and sending the content, in which
the data processing section performs a transmission order determination process of arranging a transmission time of content highly likely to be viewed closest to the content output time and arranging a transmission time of content unlikely to be viewed before the transmission time of the content highly likely to be viewed.

(20) A data processing method carried out by a reception apparatus, the data processing method causing a data processing section to perform a process of receiving a plurality of pieces of content that can be selected and output during a content output time of a given duration and storing the pieces of content in a cache section, in which
the data processing section acquires delivery priority information (Delivery Priority) specified for each of the plurality of pieces of content, preferentially receives the pieces of content with high delivery priority information (Delivery Priority) settings in accordance with the acquired delivery priority information (Delivery Priority), and stores these pieces of content in a cache section.

The series of processes described in the specification can be performed by hardware, software, or a combination thereof. When the series of processes are performed by software, a program having a processing sequence recorded therein can be executed by installing the program to a memory of a computer built into dedicated hardware. Alternatively, the program can be executed by installing it to a general-purpose computer capable of performing various processing tasks. For example, the program can be recorded in advance in a recording medium. The program can be not only installed from the recording medium to the computer but also received via a network such as the Internet and installed to a built-in recording medium such as hard disk.

It should be noted that various processes described in the specification may be performed not only chronologically in accordance with the description but also in parallel or individually according to the processing capability of the apparatus that performs the processes or as necessary. On the other hand, the system in the present specification refers to a configuration of a logical set of a plurality of apparatuses and is not limited to apparatuses having respective configurations that are provided in the same housing.

INDUSTRIAL APPLICABILITY

As described above, according to an embodiment of the present disclosure, a configuration can be realized that ensures enhanced likelihood for reproduction of advertisement content by a specific user by allowing to control a transmission order of advertisements that can be selected and output, receive advertisements likely to be viewed, and store the advertisements in a cache on a reception apparatus even with a limited capacity of a cache storage section.

Specifically, a transmission apparatus determines a transmission order of a plurality of pieces of content that can be selected and output during a content output time of a given duration on the reception apparatus and sends the content. The transmission apparatus arranges a transmission time of content likely to be viewed closest to the content output time and arranges a transmission time of content unlikely to be viewed before the transmission time of content likely to be viewed and sends the content. Further, the transmission apparatus sends delivery priority information (Delivery Priority) for each piece of the advertisement content to the reception apparatus so that the reception apparatus can decide whether caching is necessary based on the priority information (Delivery Priority). The present configuration realizes a configuration that ensures enhanced likelihood for reproduction of advertisements by users in broadcast regions by controlling of a transmission order of advertisements that can be selected and output, receiving advertisements highly likely to be viewed on a reception apparatus, and storing the advertisements in a cache storage section.

REFERENCE SIGNS LIST

10 Communication system
20 Transmission apparatus
21 Broadcasting server
22 Advertisement server
23 Data delivery server
30 Reception apparatus
31 TV
32 PC
33 Mobile terminal
50 Signaling data
60 AV segment
70 Other data
110 Application control section
111 Application execution section
112 Advertisement insertion API
114 Cache control API
120 Reproduction control section
121 MPD acquisition section
122 MPD analysis section
123 Segment acquisition section
124 Segment analysis section
130 Base system
131 Cache control section
132 Cache section
133 First communication section (tuner)
134 Second communication section (network I/F)
133 Output control section
141 Decoding section
142 Output section
311 to 314 Period information
751 Data processing section
752 Communication section
753 Storage section
771 Data processing section
772 Communication section
773 Storage section
774 Input section
775 Output section
801 CPU
802 ROM
803 RAM
804 Bus
805 I/O interface
806 Input section
807 Output section
808 Storage section
809 Communication section
810 Drive
811 Removable medium

The invention claimed is:

1. A transmission apparatus comprising:
   circuitry configured to:
      determine a transmission order of a plurality of pieces of selectable advertisement content viewable at a content output time on a reception apparatus, the transmission order including
         one piece of the plurality of pieces of selectable advertisement content beginning to be sent at a first transmission time,
         another piece of the plurality of pieces of selectable advertisement content, which is less likely to be viewed than the one piece of the plurality of pieces of selectable advertisement content according to viewing likelihood levels of the plurality of pieces of selectable advertisement content, beginning to be sent at a second transmission time, and
         the first transmission time being arranged closer to the content output time than the second transmission time, and
         the viewing likelihood levels of the plurality of pieces of selectable advertisement content being determined based on user viewing distribution estimation data; and
      transmit the plurality of pieces of selectable advertisement content according to the determined transmission order.

2. The transmission apparatus of claim 1, wherein the circuitry is further configured to
   determine the transmission order of the plurality of pieces of selectable advertisement content according to a descending order of the viewing likelihood levels of the plurality of pieces of selectable advertisement content.

3. The transmission apparatus of claim 1, wherein the circuitry is further configured to:
   send a first piece of the plurality of pieces of selectable advertisement content that is most likely to be viewed at the content output time together with a broadcasting program via a broadcasting program delivery process; and
   deliver other pieces of the plurality of pieces of selectable advertisement content that are less likely to be viewed at the content output time via a delivery process separate from the broadcasting program delivery process.

4. The transmission apparatus of claim 3, wherein the circuitry is further configured to
   arrange and transmit the other pieces of the plurality of pieces of selectable advertisement content as NRT (Non-Real-Time) content according to a descending order of the viewing likelihood levels of the plurality of pieces of selectable advertisement content.

5. The transmission apparatus of claim 1, wherein
   the user viewing distribution estimation data is acquired in advance.

6. The transmission apparatus of claim 5, wherein the circuitry is further configured to
   successively update the user viewing distribution estimation data based on audience rating data.

7. The transmission apparatus of claim 1, wherein the circuitry is further configured to
   specify delivery priority information for each of the plurality of pieces of selectable advertisement content as a priority decision criterion about caching, and send the delivery priority information to the reception apparatus.

8. The transmission apparatus of claim 7, wherein the circuitry is further configured to
   specify the delivery priority information for each of the plurality of pieces of selectable advertisement content to match the viewing likelihood levels of the plurality of pieces of selectable advertisement content.

9. The transmission apparatus of claim 7, wherein the circuitry is further configured to record the delivery priority information in an electronic service guide (ESG) and send the ESG to the reception apparatus.

10. The transmission apparatus of claim 7, wherein the circuitry is further configured to
record the delivery priority information in signaling data and send the signaling data to the reception apparatus.

11. The transmission apparatus of claim 10, wherein the signaling data is an FDT (File Delivery Table).

12. A reception apparatus comprising:
circuitry configured to:
receive a plurality of pieces of selectable advertisement content viewable at a content output time;
acquire delivery priority information specified for each of the plurality of pieces of selectable advertisement content,
the delivery priority information indicating a transmission order including
one piece of the plurality of pieces of selectable advertisement content beginning to be sent at a first transmission time,
another piece of the plurality of pieces of selectable advertisement content, which is less likely to be viewed than the one piece of the plurality of pieces of selectable advertisement content according to viewing likelihood levels of the plurality of pieces of selectable advertisement content, beginning to be sent at a second transmission time, and
the first transmission time being arranged closer to the content output time than the second transmission time, and
the viewing likelihood levels of the plurality of pieces of selectable advertisement content being determined based on user viewing distribution estimation data; and
store at least a portion of the plurality of pieces of selectable advertisement content in a cache memory according to the acquired delivery priority information.

13. The reception apparatus of claim 12, wherein the circuitry is further configured to output a selected one of the plurality of pieces of selectable advertisement content on the reception apparatus in accordance with user information.

14. The reception apparatus of claim 12, wherein the circuitry is further configured to
acquire the delivery priority information from an electronic service guide (ESG).

15. The reception apparatus of claim 12, wherein the circuitry is further configured to
acquire the delivery priority information from signaling data.

16. A data processing method carried out by a transmission apparatus, the data processing method comprising:

determining, by circuitry of the transmission apparatus, a transmission order of a plurality of pieces of selectable advertisement content viewable at a content output time on a reception apparatus,
the transmission order including
one piece of the plurality of pieces of selectable advertisement content beginning to be sent at a first transmission time,
another piece of the plurality of pieces of selectable advertisement content, which is less likely to be viewed than the one piece of the plurality of pieces of selectable advertisement content according to viewing likelihood levels of the plurality of pieces of selectable advertisement content, beginning to be sent at a second transmission time, and
the first transmission time being arranged closer to the content output time than the second transmission time, and
the viewing likelihood levels of the plurality of pieces of selectable advertisement content being determined based on user viewing distribution estimation data; and
transmitting the plurality of pieces of selectable advertisement content according to the determined transmission order.

17. A data processing method carried out by a reception apparatus, the data processing method comprising;
receiving a plurality of pieces of selectable advertisement content viewable at a content output time;
acquiring delivery priority information specified for each of the plurality of pieces of selectable advertisement content,
the delivery priority information indicating a transmission order including
one piece of the plurality of pieces of selectable advertisement content beginning to be sent at a first transmission time,
another piece of the plurality of pieces of selectable advertisement content, which is less likely to be viewed than the one piece of the plurality of pieces of selectable advertisement content according to viewing likelihood levels of the plurality of pieces of selectable advertisement content, beginning to be sent at a second transmission time, and
the first transmission time being arranged closer to the content output time than the second transmission time, and
the viewing likelihood levels of the plurality of pieces of selectable advertisement content being determined based on user viewing distribution estimation data; and
storing, by circuitry of the reception apparatus, at least a portion of the plurality of pieces of selectable advertisement content in a cache memory according to the acquired delivery priority information.

\* \* \* \* \*